(12) United States Patent
Brockman et al.

(10) Patent No.: US 10,475,138 B2
(45) Date of Patent: Nov. 12, 2019

(54) SYSTEMS AND METHODS FOR ADVANCED ENERGY NETWORK

(71) Applicant: Causam Energy, Inc., Raleigh, NC (US)

(72) Inventors: Nathaniel Taylor Brockman, Mt. Pleasant, SC (US); Joseph W. Forbes, Jr., Raleigh, NC (US)

(73) Assignee: CAUSAM ENERGY, INC., Raleigh, NC (US)

( * ) Notice: Subject to any disclaimer, the term of this patent is extended or adjusted under 35 U.S.C. 154(b) by 470 days.

(21) Appl. No.: 15/273,088

(22) Filed: Sep. 22, 2016

(65) Prior Publication Data

US 2017/0083989 A1    Mar. 23, 2017

Related U.S. Application Data

(60) Provisional application No. 62/222,470, filed on Sep. 23, 2015.

(51) Int. Cl.
| | |
|---|---|
| *G06Q 50/06* | (2012.01) |
| *G06Q 20/14* | (2012.01) |
| *G07F 15/00* | (2006.01) |

(52) U.S. Cl.
CPC .......... *G06Q 50/06* (2013.01); *G06Q 20/145* (2013.01); *G07F 15/008* (2013.01)

(58) Field of Classification Search
CPC ..... G06Q 50/06; G06Q 20/145; G07F 15/008
USPC ....................................................... 705/40
See application file for complete search history.

(56) References Cited

U.S. PATENT DOCUMENTS

| | | | |
|---|---|---|---|
| 6,900,556 | B2 | 5/2005 | Provanzana et al. |
| 6,978,931 | B2 | 12/2005 | Brobeck |
| 7,274,975 | B2 | 9/2007 | Miller |
| 7,890,436 | B2 | 2/2011 | Kremen |
| 2003/0074244 | A1 | 4/2003 | Braxton |

(Continued)

OTHER PUBLICATIONS

"Aman Saima, Simmhan Yogesh, Prasanna Viktor, Energy Management Systems: State of the Art and Emerging Trends, Jan. 2013, IEEE Communications Magazine" (Year: 2013).*

(Continued)

*Primary Examiner* — Eric T Wong
*Assistant Examiner* — Kevin T Poe
(74) *Attorney, Agent, or Firm* — NEO IP

(57) ABSTRACT

A multiplicity of participants comprising utility operators, distributed energy resource (DER) providers, vendors/aggregators, energy customers, and utility financial officers, are communicatively connected to a platform. The platform provides interactive interfaces for each type of participant to access the platform over communication network. Utility operators are enabled to view and control DER in a certain area via an interface for utility operators. DER providers are enabled to interconnect DER packages to a utility grid via an interface for DER providers. Vendors/aggregators are enabled to view and manage their portfolios via an interface for vendors/aggregators. Energy customers are enabled to view energy information, shop for new products or services, and manage rate plans via an interface for marketplace. Utility financial officers are enabled to view revenue streams from the platform to a utility via an interface for financial settlement.

20 Claims, 71 Drawing Sheets

(56) References Cited

U.S. PATENT DOCUMENTS

| | | |
|---|---|---|
| 2006/0276938 A1 | 12/2006 | Miller |
| 2007/0276547 A1 | 11/2007 | Miller |
| 2008/0091580 A1 | 4/2008 | Kremen |
| 2008/0091581 A1 | 4/2008 | Kremen |
| 2008/0091590 A1 | 4/2008 | Kremen |
| 2008/0091625 A1 | 4/2008 | Kremen |
| 2008/0091626 A1 | 4/2008 | Kremen |
| 2008/0177678 A1 | 7/2008 | Martini et al. |
| 2009/0177548 A1 | 7/2009 | Eisenlohr |
| 2011/0040666 A1 | 2/2011 | Crabtree et al. |
| 2011/0137763 A1* | 6/2011 | Aguilar ............... G06Q 30/018 705/30 |
| 2011/0208365 A1 | 8/2011 | Miller |
| 2014/0222698 A1 | 8/2014 | Potdar et al. |
| 2014/0278851 A1* | 9/2014 | Kopanati ............... G06Q 50/01 705/14.11 |
| 2014/0279711 A1 | 9/2014 | Angelis et al. |

OTHER PUBLICATIONS

"Molderink Albert, Bakker Vincent, Bosman Maurice, Hurink Johann, Smith Gerard, Sep. 2010, IEEE Transactions on Smart Grid vol. 1 No. 2" (Year: 2010).*

"Adika Christopher, Wang Lingfend, Autonomous Appliance Scheduoing for Household Energy Management, Mar. 2014, IEEE Transactions on Smart Grid, vol. 1 No. 5" (Year: 2014).*

\* cited by examiner

FIG. 25

□ SPEND MAP  ✓ SHARE ELECTRICITY DATA  GFR107@GMAIL.COM  SIGN OUT

Utility Bill Verification

Thanks for submitting your utility bill, shown on the left.

Please verify the following information we've extracted from your bill.

Electric Provider

[                                                                 ]

Service Address Select or enter an address below

[ 107 Doric Ct, Cary NC                                           ]

Building Type

[ Residential                                                   ♦ ]

Bill Date

[ March 14, 2016                                                  ]

Current Charges

[ 11.13                                                           ]

Press  when all fields are correct.

✓ SHARE ELECTRICITY DATA   GFB107@GMAIL.COM   SIGN OUT

Utility Bill Verification

Thanks for submitting your utility bill, shown on the left.

Please verify the following information we've extracted from your bill.

Electric Provider

South Carolina Electric & Gas (SCE&G)

Service Address

1007 Johnnie Dodds Blvd, Mount Pleasant SC

Building Type

Residential

Bill Date

Apr 7 2016

Current Charges

1496.40

Press  when all fields are correct.

FIG. 55B

SYSTEMS AND METHODS FOR ADVANCED ENERGY NETWORK

CROSS-REFERENCES TO RELATED APPLICATIONS

The present invention is related to and claims priority from the following U.S. patent documents: this application claims priority from U.S. Provisional Patent Application No. 62/222,470, filed Sep. 23, 2015, which is incorporated herein by reference in its entirety.

BACKGROUND OF THE INVENTION

1. Field of the Invention

The present invention relates to electric power messaging and settlements, and more particularly, to advanced energy settlements, messaging, and applications for electric power supply, load, and/or curtailment and data analytics associated with the same.

2. Description of the Prior Art

Generally, it is known in the prior art to provide electric power systems management, including financial settlements and messaging. However, limited information is available to electric power consumers regarding their past, present, and future projected use of power with sufficient details to make informed choices about types of power supply and pricing alternatives. Furthermore, retail electric providers (REPs) in prior art systems and methods do not have access to data and analytics to provide optimal pricing for power supplied to business and/or residential electricity customers, and do not have the ability to provide advanced energy settlements to provide the lowest pricing for power supplied at predetermined times, due at least in part to costs associated with obtaining power agreements without visibility to the data and analytics that provide a reduced risk of capital and performance associated with the supply and demand sides. Thus, there remains a need for improved information, controls, real-time or near-real-time data on power consumption and production for electric power market participants, REPs, customers, data centers, and microgrid owners, and messaging and management of financial settlement therefor.

SUMMARY OF THE INVENTION

The present invention relates to electric power messaging and settlements, and more particularly, to advanced energy settlements, messaging, and applications for electric power supply, load, and/or curtailment and data analytics associated with the same. Systems and methods for data analytics and customer or consumer guidance and controls are provided, and coupled with graphical user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kits, application web-based storefronts, and combinations thereof.

The present invention provides for systems, methods, and graphical user interface (GUI) embodiments for providing electric power usage (past, current, and/or future projected) information, management, financial settlements, and messaging, and applications as described herein.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 25 is a screenshot of an interconnection processing interface displaying pre-approved production packages and listing interconnects in progress.

FIG. 54A and FIG. 54B are screenshots of a utility bill verification for an electric bill. FIG. 54A is the left side of the screen and FIG. 54B is the right side of the screen.

FIG. 55A and FIG. 55B are screenshots of a utility bill verification for an electric and gas bill. FIG. 55A is the left side of the screen and FIG. 55B is the right side of the screen.

DETAILED DESCRIPTION

Figure 1:
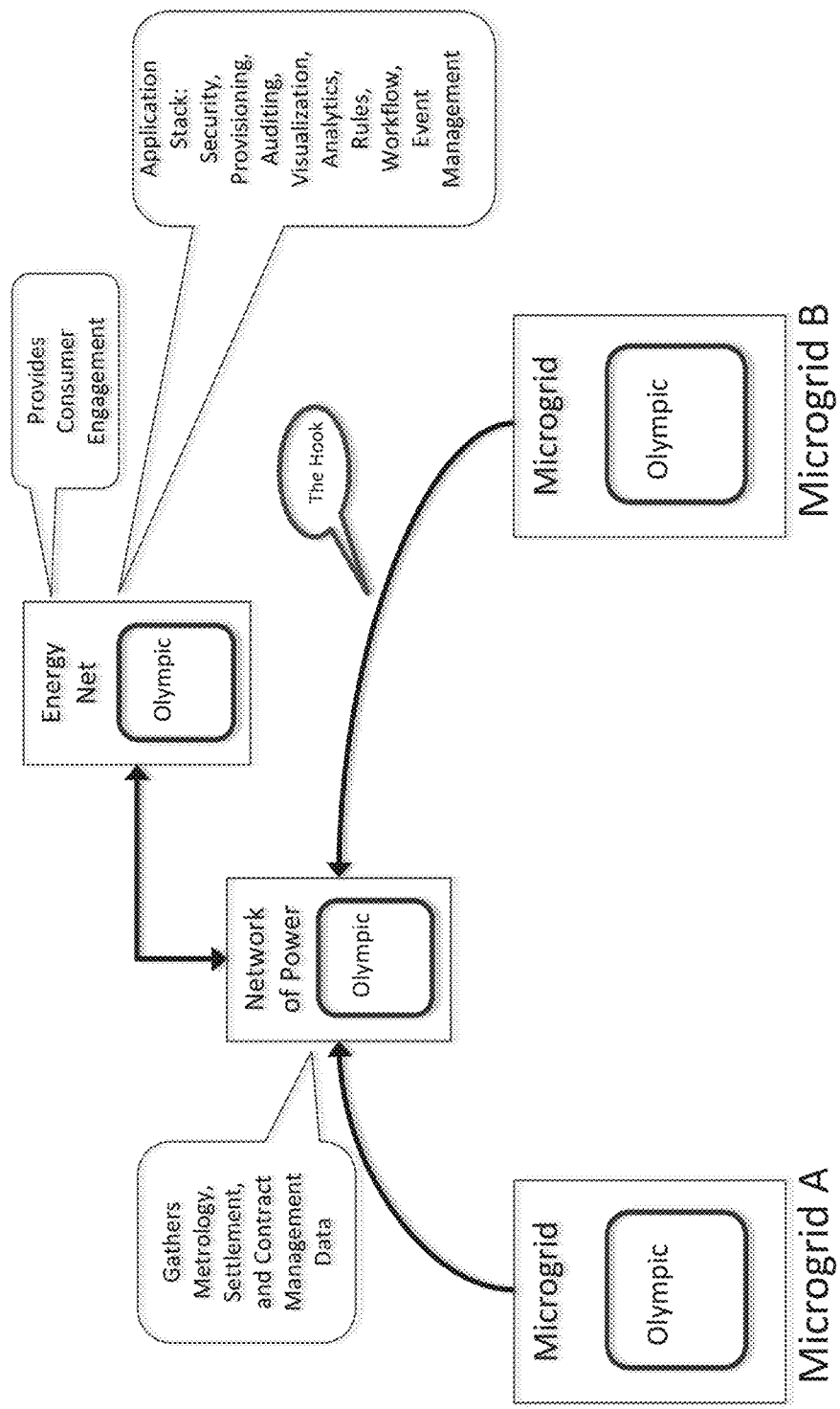
FIG. 1 illustrates an embodiment of a network of microgrids integrated with an EnergyNet platform.

Referring now to the drawings in general, the illustrations are for the purpose of describing preferred embodiment(s) of the invention at this time, and are not intended to limit the invention thereto. Any and all text associated with the figures as illustrated is hereby incorporated by reference in this detailed description.

The present invention provides systems and methods for data analysis, messaging, advanced energy settlements, command and control and management of electric power supply, demand, and/or curtailment including graphical user interfaces for consumers, including consumer profiles and alternative pricing programs and/or settlement programs for business and residential applications, including but not limited to graphical user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kits, application web-based storefronts, and combinations thereof. Apparatus embodiments are also provided in accordance with the systems and methods described herein.

Furthermore, novel methods of the present invention provide for consumer guidance and controls that are coupled with graphical user interfaces for mobile applications, websites, and computer displays that provide improved information and controls for consumers for electric power consumption and management of financial settlement therefor. Preferably, the customer sets their preferences through the user interfaces and then the customer's own data, including whether the customer has opted in for direct response participation, is used to make recommendations for grid elements, services, etc., to the end users, and inputs or opt in/out relating to permissions of data use (e.g., meter data aggregator usage).

In the description of the present invention, it will be understood that all EnergyNet embodiments and AES systems and methods descriptions include and incorporate by this reference without regard to individual, specific recitation for each example described, real-time and/or near-real-time data, including revenue grade metrology used for AES financial settlements. Revenue grade metrology data, which a generic computer is incapable of using, is generated by active grid elements in the power grid; measured data is then transformed into settlement grade data for market financial settlement for load and supply. Additionally and similarly, real-time communication, messaging, and data packet transfer is provided over at least one network associated with the systems and methods of the present invention. This requires physical devices, including at least one client device and at least one server, communicating and interacting over the network. The present invention is necessarily rooted in computer technology in order to overcome a problem specifically arising in the realm of computer networks, more specifically, advanced energy settlements, messaging, and applications for electric power supply, load, and/or curtailment and data analytics associated with the same.

This detailed description of the present invention includes energy financial settlements and messaging and/or data packet transfer or transmission, including the following issued patents and/or copending applications by common inventor and/or assignee Causam Energy, Inc.: U.S. Pat. Nos. 8,849,715, 8,583,520, 8,595,094, 8,719,125, 8,706,583, 8,706,584, 8,775,283, 8,768,799, 8,588,991, and 8,761,952, each of which is incorporated by reference in its entirety herein; US Patent Publication Nos. 2014/0180884, 2014/0279326, 2014/0277788, 2014/0039701, 2014/0277786, and 2014/0277787, each of which is incorporated by reference in its entirety herein; and WIPO Publication Nos. WO2014/066087, 2014/0039699, and WO2014/022596, each of which is incorporated by reference in its entirety herein.

The systems and methods of the present invention also provide support and functionality for at least one distribution service provider through the market-based platform to allow communities, municipalities, cooperative power groups, and/or other combinations of persons or entities to be aggregated to form at least one distribution service provider, which may exist within another distribution service provider, transmission/distribution service provider (TDSP), and/or utility. Additionally, a meter data aggregator (MDA) is provided to interface with the distribution service provider and power marketer and/or utility.

FIG. 1 illustrates an embodiment of a network of microgrids integrated with an EnergyNet platform. There are two microgrids, Microgrid A and Microgrid B, electrically and communicatively integrated to a network of power. An EnergyNet platform is coupled to the network of power. The network of power gathers metrology, settlement, and contract management data from Microgrid A and Microgrid B. The EnergyNet platform has its application stack including security, provisioning, auditing, visualization, analytics, rules, workflow, and event management. The EnergyNet platform provides consumer engagement.

Figure 2:
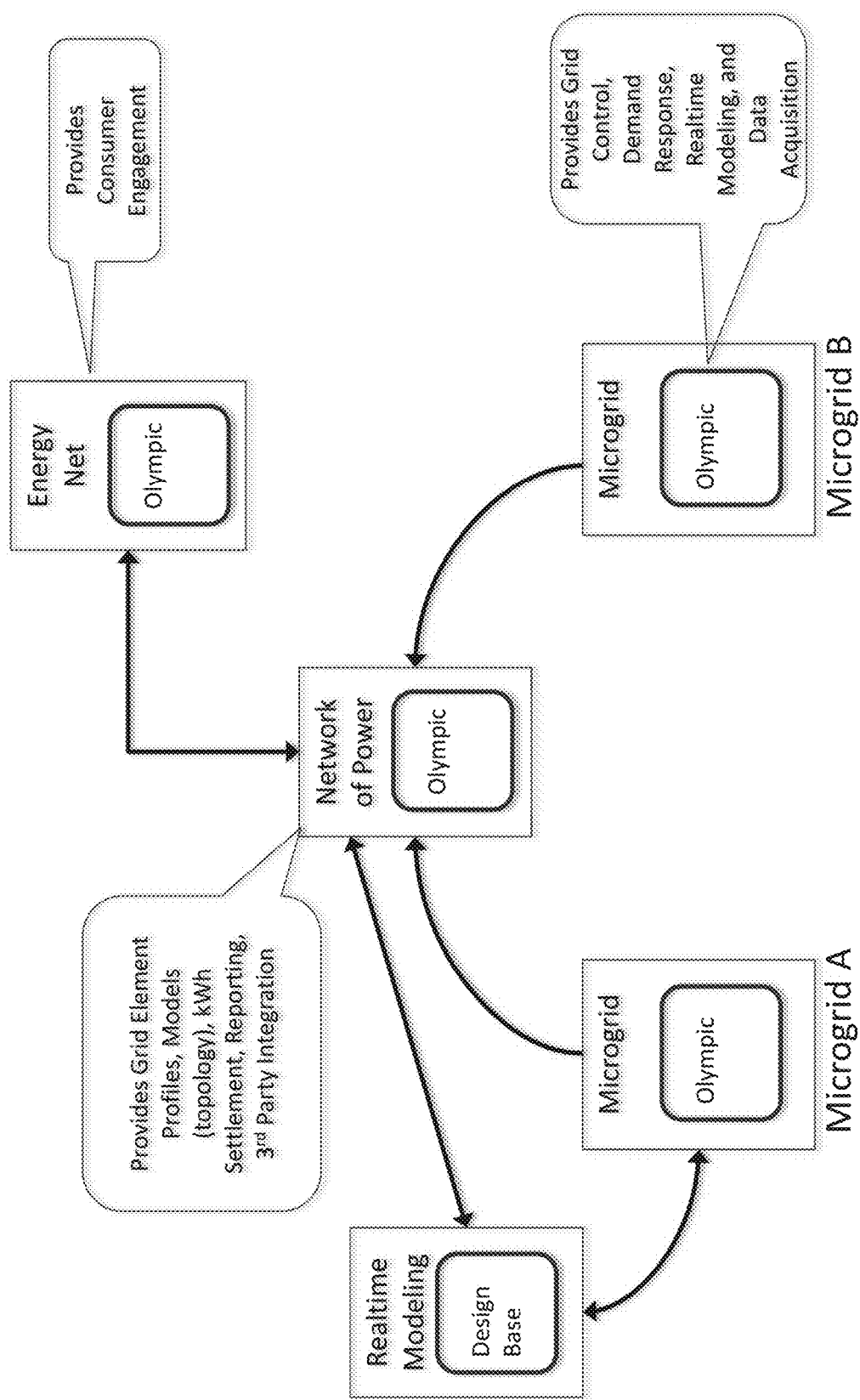
FIG. 2 illustrates another embodiment of a network of microgrids integrated with an EnergyNet platform.

FIG. 2 illustrates another embodiment of a network of microgrids integrated with an EnergyNet platform. There are two microgrids, Microgrid A and Microgrid B. Microgrid B is electrically and communicatively integrated to a network of power, and provides grid control, demand response, real-time modeling, and data acquisition. Microgrid A is externally linked to a real-time modeling module. Both Microgrid A and the real-time modeling module are connected to the network of power for providing grid control, demand response, real-time modeling, and data acquisition. The network of power provides grid element profiles, models and/or topologies, energy settlement, financial settlement, reporting, and third party integration. The network of power is coupled with an EnergyNet platform, which provides consumer engagement on at least one level and preferably on a multiplicity of levels providing for varying levels or degrees of user engagement (e.g., level 0 to level 4, described hereinbelow) from consumer energy consumption from historical data (at least one electrical power bill) uploaded to the platform or system, to grid element introduction and load curtailment or power supply through managed or command and control programs operated by or on behalf of at least one utility or market participant, to vendor interaction and retail electric provider or data aggregator engagement via digital contracts accepted within the electric markets for market-based financial settlement and energy settlement.

Figure 3:
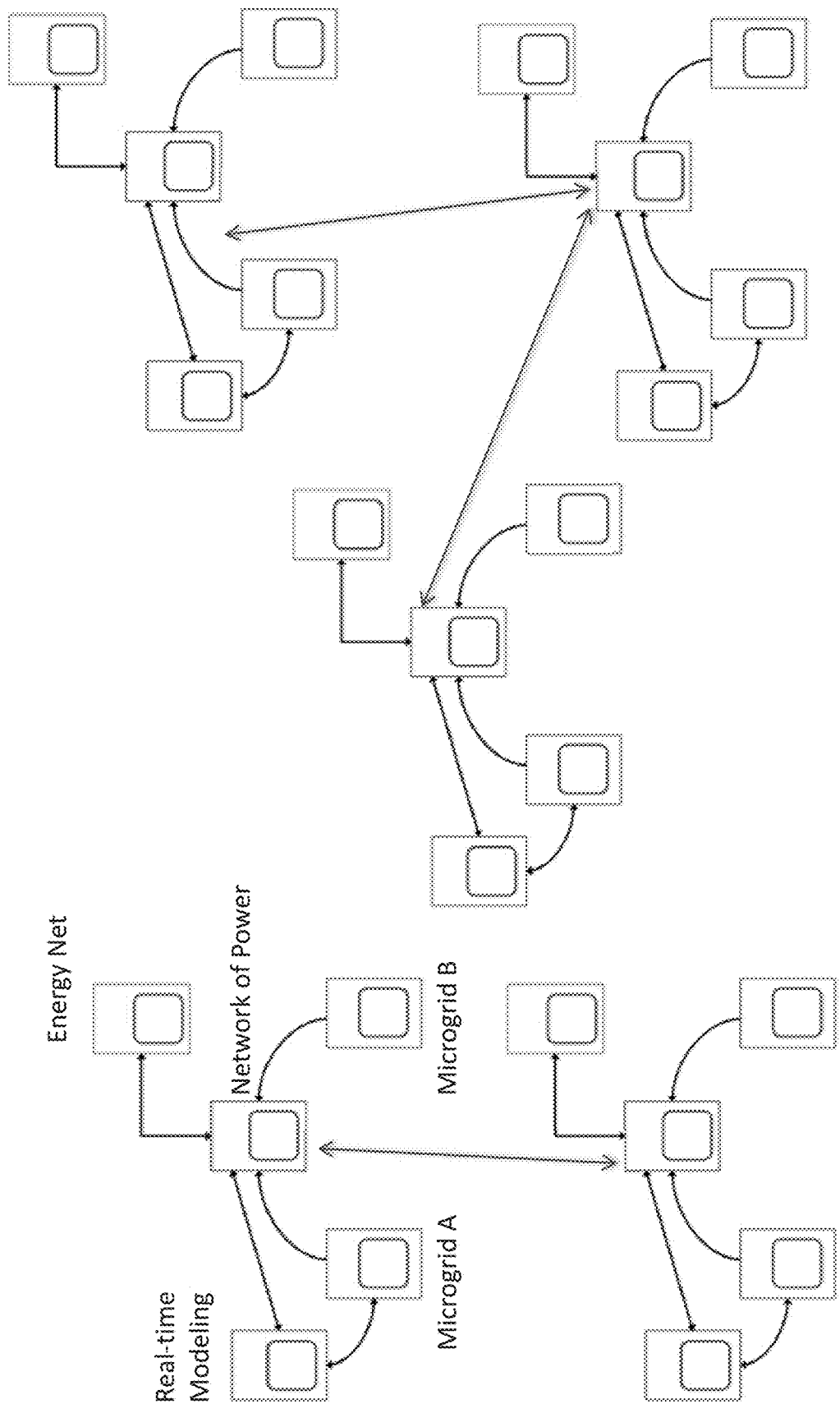
FIG. 3 is a schematic diagram of Federated Microgrid Communities comprising different grid zones.

FIG. 3 is a schematic diagram of Federated Microgrid Communities. These microgrid communities are located in different grid zones. Each of the microgrid communities has a structure as shown in FIG. 2. There are communication links between different microgrid communities within a grid zone.

The present invention includes a multiplicity of interactive graphical user interfaces (GUIs) for all aspects of AES and/or EnergyNet embodiments. By way of example and not limitation, as illustrated in the figures, at least one GUI is provided for electric power consumption for business or commercial facilities, including information and/or controls wherein the GUI is provided for mobile applications, websites, terminal and/or computer displays, and combinations thereof. For mobile applications, one embodiment includes a mobile communication computer device, such as a smartphone, tablet computer, or other mobile smart interactive communications device (personal/wearable or portable), having an application including software operable on a processor coupled with memory, wherein the mobile communication computer device is constructed and configured for network-based communication within a cloud-based computing system as illustrated in FIG. 4.

Figure 4:
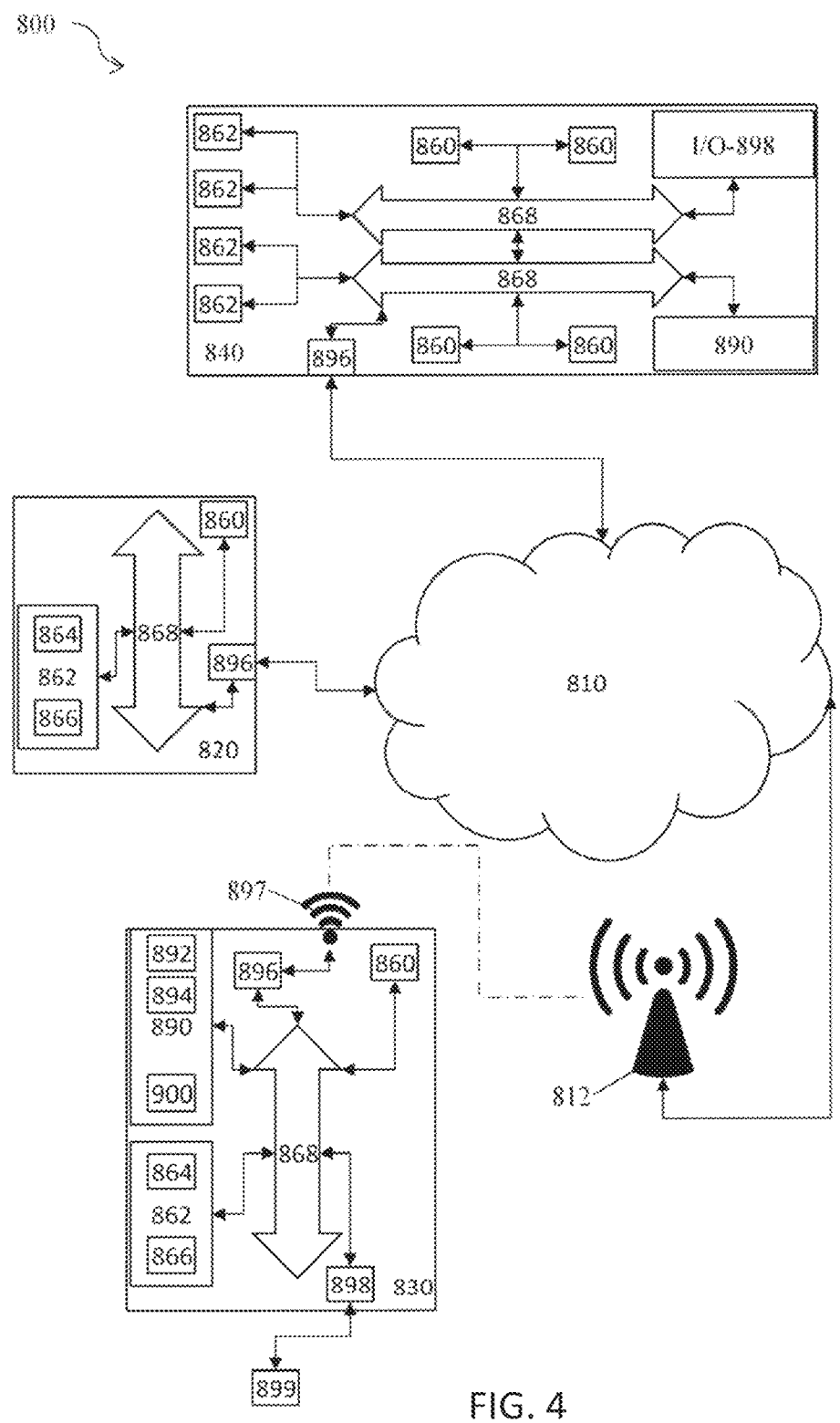
FIG. 4 is a schematic diagram of an embodiment showing a configuration for a cloud-based computing system allowing users to interface with the systems of the present invention.

FIG. 4 is a schematic diagram of an embodiment of the invention illustrating a computer system, generally described as 800, having a network 810 and a plurality of computing devices 820, 830, 840. In one embodiment of the invention, the system 800 includes a cloud-based network 810 for distributed communication via a wireless communication antenna 812 and processing by at least one mobile communication computing device 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers and mobile devices, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU)), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 4, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840 through a network 810. A computing device 830 may connect to a network 810 through a network interface unit 896 connected to a bus 868. Computing devices may communicate communication media through wired networks, direct-wired connections, or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal, such as a carrier wave or other transport mechanism, and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disk, or other magnetic storage devices; or any other medium that can be used to store the computer readable instructions and which can be accessed by the computer system 800.

It is also contemplated that the computer system 800 may not include all of the components shown in FIG. 4, may include other components that are not explicitly shown in FIG. 4, or may utilize an architecture completely different than that shown in FIG. 4. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

In one embodiment, the application (e.g., smartphone app) automatically provides information via the GUI associated with the app to indicate to the user (consumer)

information about electric pricing plan alternatives, including but not limited to their location, the price for electric power supply on any per unit (e.g., data center, microgrid, building type (commercial or residential), facility, device, grid element, and combinations thereof) basis for a duration and/or at a predetermined time, and combinations thereof. Also, preferably the app GUI provides additional information including marketing and advertising information about any merchants, products, and/or services associated with or related to their profile(s), power usage, activities within the system, and combinations thereof. Also preferably, the app GUI provides an interactive interface allowing inputs to be received for generating at least one account and corresponding profile, advanced energy settlements selections, etc. In one embodiment of the present invention, the received inputs are associated with a consumer or user profile that is stored on the smartphone and/or in a database associated with a server computer and/or cloud-based computing system with at least one server computer and at least one database having remote inputs and outputs via the data and communications network, preferably via secure access and/or secure messaging for authorized users associated with the at least one account.

In a virtualized or cloud-based computing system and methods of the present invention, the following components are provided as illustrated by way of example and not limitation to those described in FIG. 4. Components of a cloud-based computing system and network for distributed communication therewith by mobile communication devices include but are not limited to a server computer with a processing unit. The server is constructed, configured, and coupled to enable communication over a network. The server provides for user interconnection with the server over the network using a remote computer device or a personal computer (PC), smartphone, tablet computer, etc., positioned remotely from the server. Furthermore, the system is operable for a multiplicity of remote personal computers or terminals, for example, in a client/server architecture, as shown. Alternatively, a user may interconnect through the network using a user device such as a personal digital assistant (PDA), mobile communication device, such as by way of example and not limitation, a mobile phone, cell phone, smartphone, tablet computer, laptop computer, netbook, terminal, in car computer, or any other computing device suitable for network connection. Also, alternative architectures may be used instead of the client/server architecture. For example, a computer communications network, or other suitable architecture may be used. The network may be the Internet, an intranet, or any other network suitable for searching, obtaining, and/or using information and/or communications. The system of the present invention further includes an operating system installed and running on the server, enabling the server to communicate through the network with the remote, distributed user devices. The operating system may be any operating system known in the art that is suitable for network communication.

Figure 5:
FIG. 5 illustrates method steps for providing advanced energy settlements (AES) according to one embodiment of the present invention.

FIG. 5 illustrates method steps for providing advanced energy settlements (AES) according to one embodiment of the present invention. A settlement AES process is outlined in six distinct steps as follows: (1) revenue grade settlement block data is used to underpin the settlement process for the billing period (e.g., daily, weekly, monthly, predict & pay); (2) settlement block data is mapped to the appropriate distributed or fixed energy power purchase agreement in effect at that point in time; (3) the cost of each settlement block inclusive of Time of Use (TOU), demand, taxes, access fees, and energy charges is calculated; (4) a customer balance is calculated from all the settlement blocks that apply within the period and automatically collected from the customer; (5) distributed energy charges for all customers billed in the cycle are aggregated by generator and settled through the clearing house; and (6) fixed energy charges for all customers billed in the cycle are aggregated and settled with the energy retailer or REP.

Figure 11:
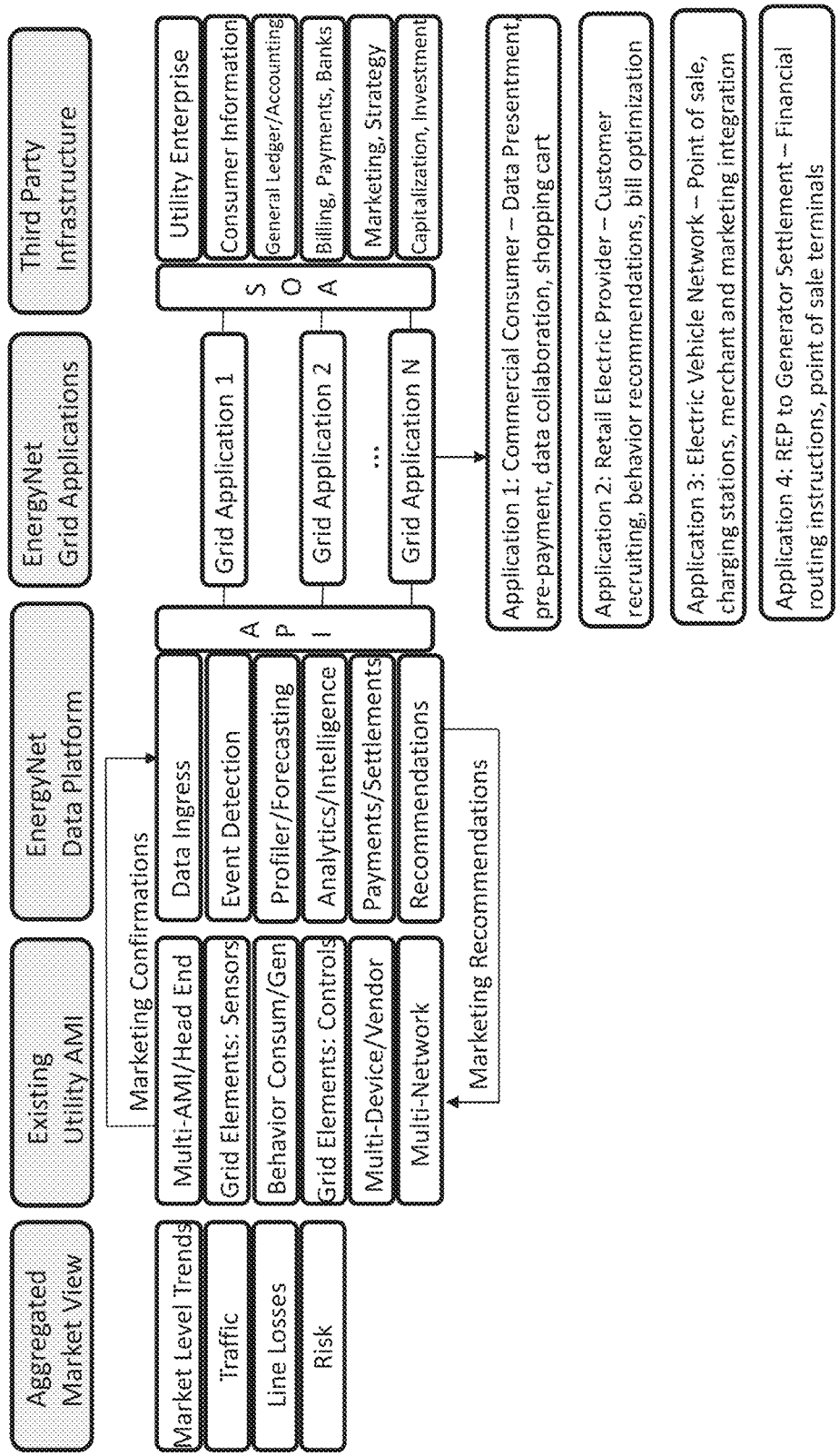
FIG. 11 is a schematic diagram illustrating a grid application model of the systems and methods of the present invention.

The EnergyNet data platform used with AES preferably provides and/or is operable for real-time revenue grade data ingress; stores and organizes packet level information that can be used for forecasting, data mining, revenue extraction, event detection, sophisticated energy management, and enterprise integration purposes; aggregates and stores revenue data into revenue grade settlement blocks (or Power Trading Blocks (PTBs)); connects microgrid and spot market buyers and sellers; provides a fully automated and low latency industry leading settlement process underpinned by a distributed settlement rules engine capable of settling with both distributed and fixed generator market participants; provides an automated payment exchange which supports all advanced billing models (e.g., shared data plan, daily plan, predict & pay); manages payments as single energy bills for customers with EnergyNet responsible for settlement payments between multiple distributed energy generators and the customer's existing energy retailer; provides a real-time energy purchasing solution that matches the customer's real energy consumption against energy currently available within the microgrid or spot market; captures and transforms market data that can provide intelligent analytics by generators for trending, forecasting, planning, and maximizing revenue/investment opportunities; captures and transforms energy data that can provide intelligent analytics for customers' energy management, forecasting, procurement, profiling, bill optimization, and recommendation purposes; and integrates with the existing distributed energy market exchange to allow EnergyNet buyers and sellers to connect and agree prices on distributed generation. As illustrated in FIG. 11, EnergyNet grid applications ensure that the EnergyNet framework is operable to support 1:n grid applications. Third party infrastructure may provide Service-Oriented Architecture (SOA) integration with utility and/or market participant enterprise systems; provide SOA integration with general ledger and accounting systems; and/or provide SOA integration with the financial, banking, and clearing infrastructure, as needed.

For example, in a microgrid management application the EnergyNet platform is transacting between the market, utility, consumers, REPs, distribution service providers, balancing authorities, etc. The energy management system (EMS) power model includes data for frequency, voltage, VARs, state estimation, SCED, and actual or real-time information. Data associated with the microgrid is communicated over a secure IP network. The GUIs of the present invention allow for monitoring the market conditions or grid stability conditions as signalled by the distribution service providers, utilities, etc.; it also allows for monitoring of normal conditions, reserves, forecast conditions, etc. External triggers for the EMS may include changes in forecast conditions, actual conditions, market conditions, market price, schedule based upon forecast price exceeding operating cost for the microgrid, etc. Software as a Service (SaaS) operable within the systems and methods of the present invention provides for dispatch of load and supply via EMS systems for distributed assets, wherein the microgrid is considered its own balancing area. So the various external triggers, including the market and/or market-based pricing, are operable as inputs to activate the isolation or connection of the microgrid according to the profile associated with the microgrid. In one embodiment, the microgrid is a secure, critical infrastructure (such as, by way of example and not limited to, data centers) and/or a military installation or facility, wherein the microgrid is locally managed in GUIs and software for grid stability and function such that the computer and software that controls the microgrid and its grid elements are located within the geographic footprint of the microgrid to enable it to function as its own balancing authority shielded from any external controls of the electrical power flows within it. A microgrid is considered any sub-grid, power generating asset, or power supplying asset that can island itself from the electric power grid and/or connect or reconnect with the main electric power grid (having external controls from the microgrid).

Figure 6:
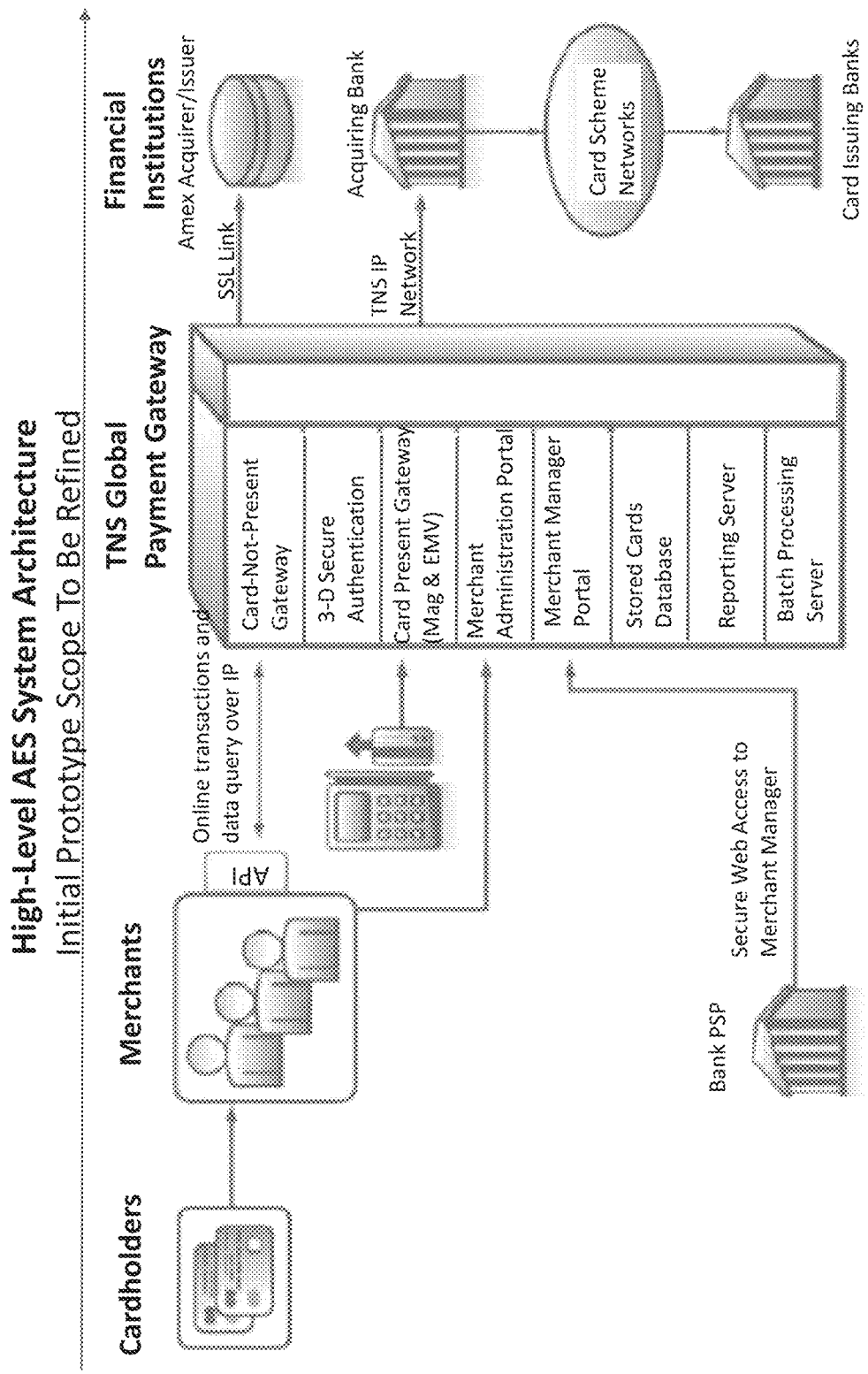
FIG. 6 is a schematic diagram illustrating a high-level AES system architecture according to the present invention.
Figure 12:
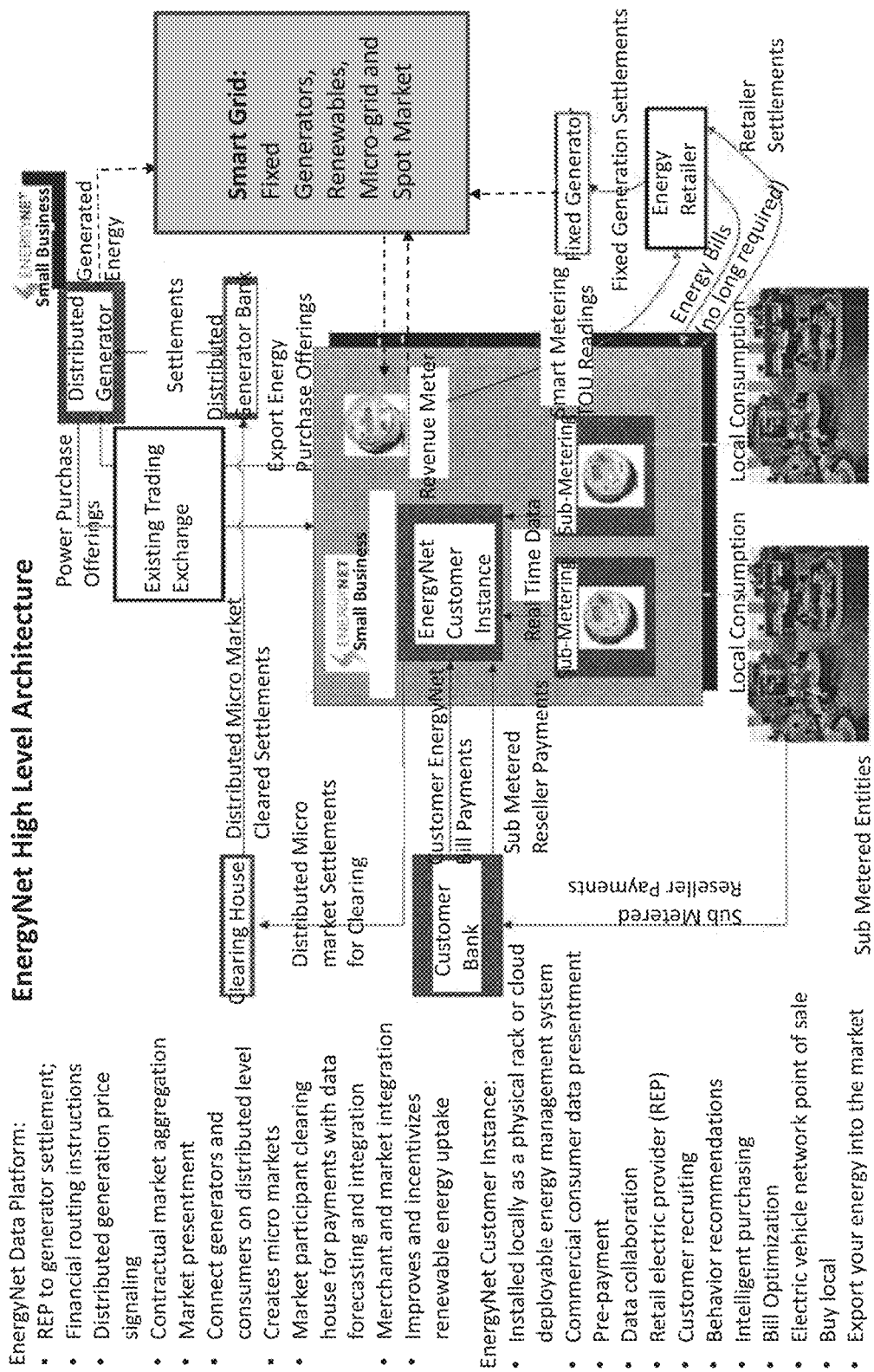
FIG. 12 is a schematic diagram illustrating a high-level system architecture for an EnergyNet embodiment according to the present invention.
Figure 13:
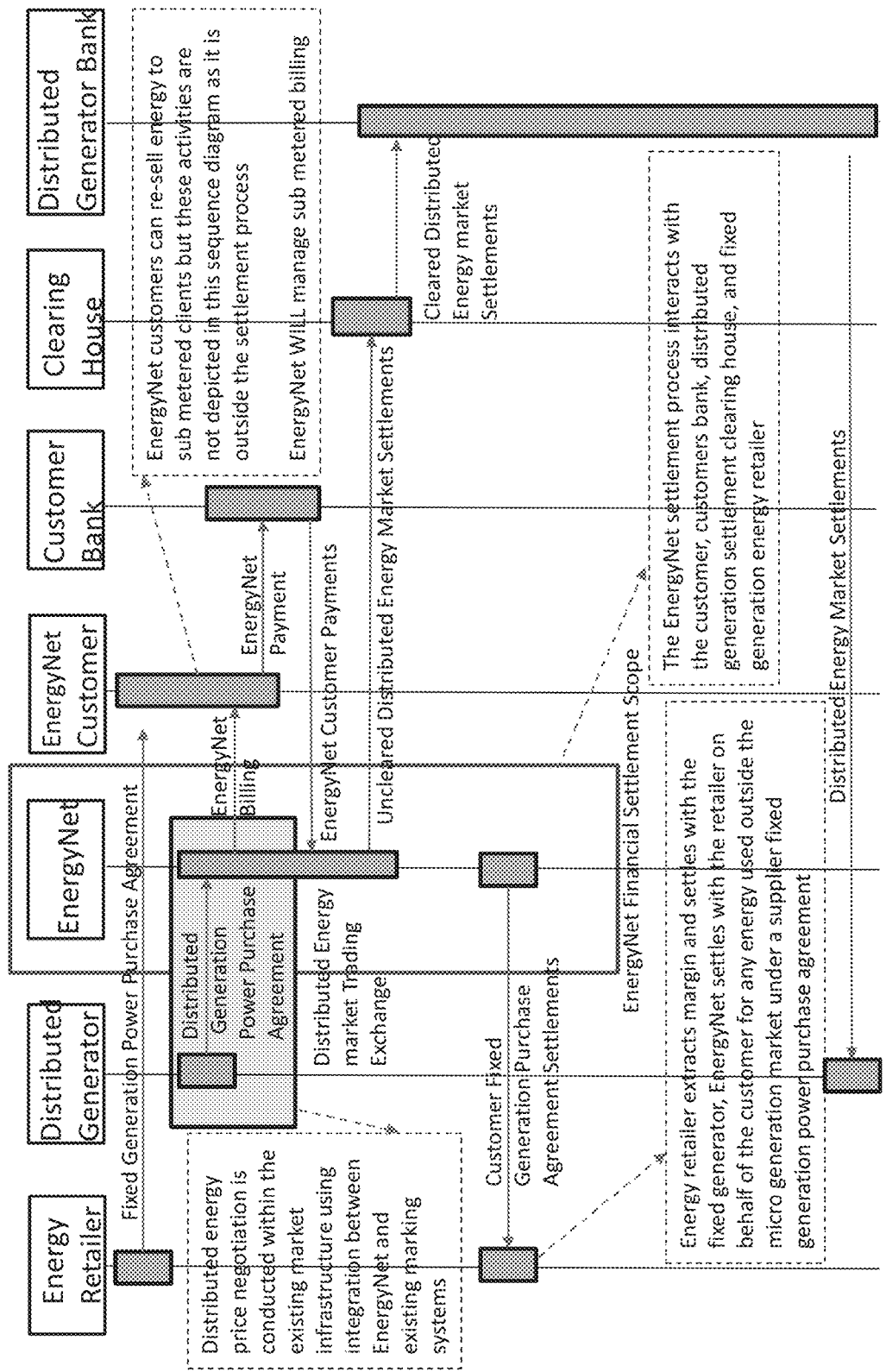
FIG. 13 is a schematic and flow diagram illustrating AES sequencing.

FIG. 6 is a schematic diagram illustrating a high-level AES system architecture according to the present invention. The principal actors and data flows are depicted in FIGS. 6, 12, and 13 for EnergyNet embodiments. Customers receive near-real-time market connection data and price signals through the EnergyNet platform, giving visibility to generated power as it becomes available in the market. This data is used by EnergyNet to facilitate intelligent energy purchasing and settlement between all market participants. Distributed Generators advertise available energy to EnergyNet customers with power purchase offerings published within the EnergyNet platform, ensuring that intelligent energy purchasing decisions can be automated or recommended by EnergyNet within a real-time market. Customers with the capacity to both generate and export energy (i.e., if they have an exportable capacity) can also act as generators through EnergyNet. Customer Payments received from a Customer Bank represent consolidated single payments to EnergyNet for energy purchased on both the fixed and distributed generation market (i.e., supplied by their existing Energy Retailer or Distributed Generators). Settlements are apportioned across revenue grade TOU meter readings over a billing period; internal usage is measured through real-time sub-metering technology at 1 second intervals and/or near real time or real time. EnergyNet supports the billing of sub-metered entities, allowing the EnergyNet customer to resell or cross charge energy using the sub-metered meter readings. The EnergyNet customer instance allows these energy costs to be recovered against the enterprise's total energy consumption. Distributed Generators/generation supplier participants receive cleared settlements from a Distributed Generator Bank for all energy consumed within the billing timelines specified in the distributed power purchase agreements of EnergyNet customers. The Distributed Generator Bank receives aggregated and cleared settlements from a Clearing House for distributed energy that was consumed under each distributed power purchase agreement held by EnergyNet customers. The Clearing House receives all uncleared distributed energy settlements made through EnergyNet's point of sale devices or advanced billing methods before passing the cleared settlements to the Distributed Generator Bank. EnergyNet performs all settlement activities for all participants in a transaction. EnergyNet can also manage the payments for energy resold or cross charged by the customer. This can be viewed and analyzed against the imported energy bill. Customers can still consume energy supplied by fixed generators (e.g., Energy Retailers, REPs) outside the spot energy or micro market; the portion of a customer's consumption that resides within their fixed generation power purchase agreement will be settled with the retailer. The settlement algorithms resolve this using settlement blocks, all power purchase agreements in place, and data generated by revenue grade meter. Purchasing within the spot market requires prices to be negotiated and agreed to in seconds, and these activities require integration with existing market trading systems. A growing customer base allows EnergyNet to provide a complete trading market between users. The purchasing rules engine criteria allows generators to respond to customer preferences and offer a variety of different tariffs as well as alter their own behavior (e.g., if they are a customer/generator can they shift their highest usage off peak and export excess energy at peak periods when demand and prices are higher).

Figure 7:
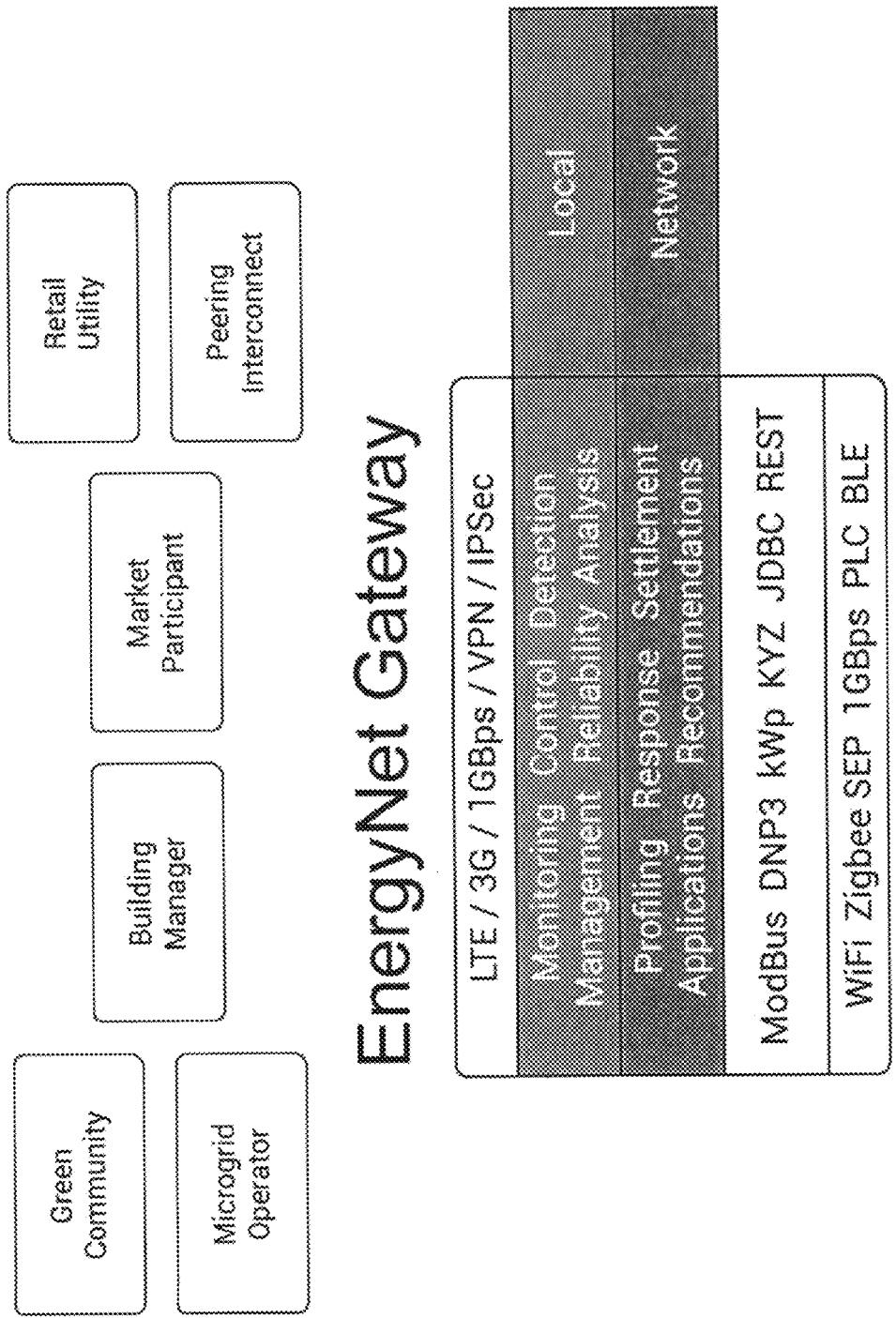
FIG. 7 is a schematic diagram illustrating an exemplary EnergyNet gateway according to the present invention.

FIG. 7 is a schematic diagram illustrating an exemplary EnergyNet gateway according to the present invention. The EnergyNet gateway in the present invention connects different participants having different network protocols to the advanced energy settlement platform. The different participants include green communities, microgrid operators, building managers, market participants, and retail utilities. The EnergyNet gateway is also used for peering interconnections. Different communication protocols/standards may be supported by the EnergyNet gateway (e.g., LTE, 3G, 1 GBps, VPN, IPSec, ModBus, DNP3, kWp, KYZ, JDBC, REST, WiFi, Zigbee, SEP, PLC, BLE). At the local level, the EnergyNet gateway is operable for monitoring, control, detection, management, reliability, and analysis. At network level, the EnergyNet gateway is operable for profiling, response, settlement, applications, and recommendations. Zigbee Hadoop or any distributed DB or structure capable of receiving large amounts of data, whether structured or unstructured data.

Figure 8:
FIG. 8 is a schematic diagram illustrating a partial list of exemplary grid elements according to the present invention.

FIG. 8 is a schematic diagram illustrating a partial list of exemplary grid elements according to the present invention. The grid elements include but are not limited to power transfer switches, wind meters, utility meters, battery discharge controllers, tenant sub-meters, solar meters, power distribution units (PDUs), appliance switches, electric vehicle charging stations, distributed energy resources (DERs), transfer switches, electric vehicle batteries, inverters, controllable loads, weather stations, and HVAC environments.

Figure 9:
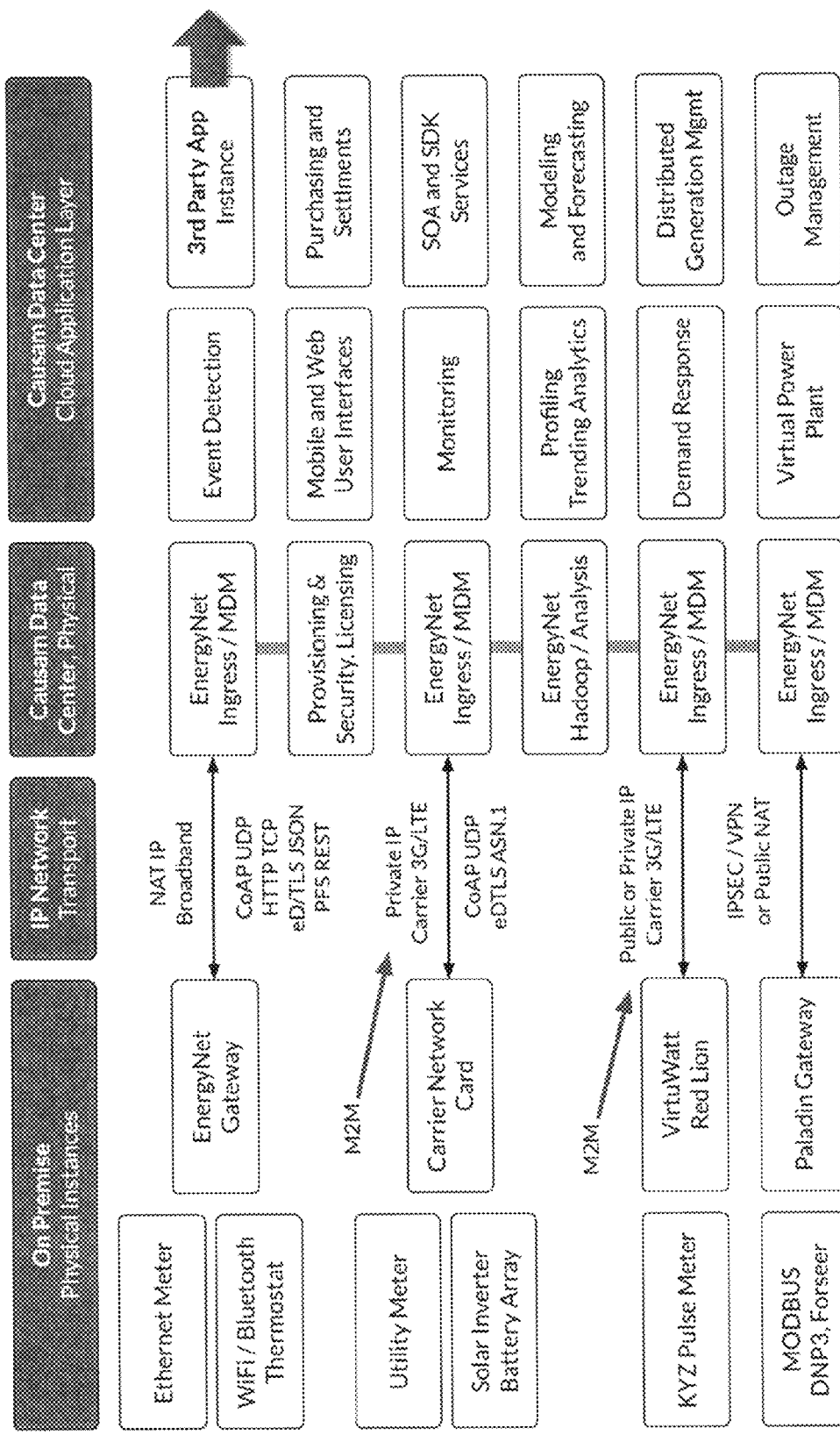
FIG. 9 is a schematic diagram illustrating components of the systems and methods of the present invention.
Figure 10:
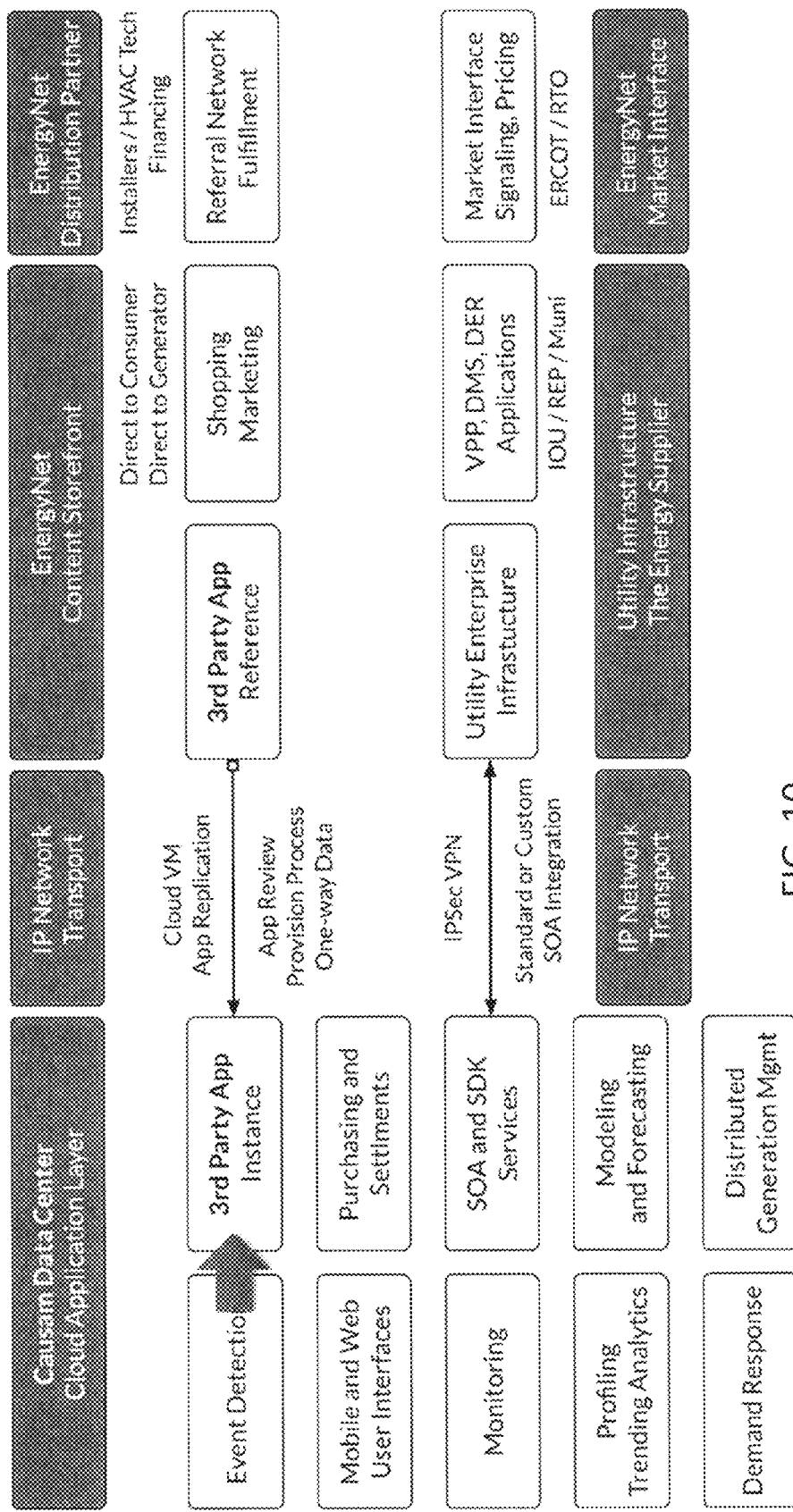
FIG. 10 continues to illustrate components of the systems and methods of the present invention shown in FIG. 9.

FIGS. 9 and 10 are schematic diagrams illustrating components of the systems and methods of the present invention. The systems of the present invention include on premise physical instances, an IP network, a Causam data center, an EnergyNet Content Storefront, at least one EnergyNet Distribution Partner, an EnergyNet Market Interface, and Utility Infrastructure at the Energy Supplier. The on premise physical instances, such as Ethernet meters, WiFi/Bluetooth thermostats, utility meters, solar inverter battery arrays, KYZ Pulse meters, and devices using MODBUS, DNP3, or Foreseer, are connected to an IP network through an EnergyNet gateway, a carrier network card, a VirtuWatt Red Lion, or a Paladin gateway. The Causam data center has a physical layer that includes EnergyNet Ingress for meter data management (MDM); provisioning, security and licensing; and EnergyNet Hadoop for analysis. The Causam data center further includes a cloud application layer providing event detection, third party App instances, mobile and web user interfaces, purchasing and settlements, monitoring, Service-Oriented Architecture (SOA) and Software Development Kit (SDK) services, profiling and trending analytics, modeling and forecasting, demand response, distributed generation management, virtual power plant (VPP), and outage management. The EnergyNet Content Storefront provides third party App reference, which has one-way communication to the third party App instance in the Causam data center for cloud Virtual Machine (VM), App replication, App review, and provision process. The EnergyNet Content Storefront also provides shopping and marketing directed to consumers and generators. The EnergyNet Distribution Partner includes installers, HVAC technicians, and financing institutions, who serve as a referral network, fulfill orders, and provide services. The EnergyNet Market Interface connects with regulation agencies, for example ERCOT and other RTOs, for signaling and pricing. The Energy Supplier can be an investor-owned utility (IOU), REP, and/or municipal power agency. The Utility Infrastructure at the Energy Supplier provides applications, such as VPP, Distribution Management System (DMS), and DER applications, and Utility Enterprise Infrastructure. The Utility Enterprise Infrastructure communicates with the SOA and SDK services at the Causam data center via IPSec and/or VPN for standard or customer SOA integration. AMI system feeds directly into EnergyNet or into a meter data management system that then communicates the data to the EnergyNet platform.

FIG. 11 is a schematic diagram illustrating a grid application model of the systems and methods of the present invention. The EnergyNet Grid Application Model includes aggregated market view, existing utility advanced metering infrastructure (AMI), EnergyNet Data Platform, EnergyNet Grid Applications, and third party infrastructure. The aggregated market view provides information such as market level trends, traffic, line losses, and risk. The existing utility AMI includes multi-AMI for head end systems, grid elements for sensing, grid elements for controlling, multi-devices/vendors, and multi-network. The EnergyNet Data Platform provides application program interfaces (APIs) for data ingress, event detection, profiling and forecasting, analytics and intelligence, payments and settlements, and recommendations. The multi-AMI for head end systems in the existing utility AMI provides marketing confirmation to data ingress on the EnergyNet Data Platform. The recommendations provided by the EnergyNet Data Platform are marketing recommendations provided to multi-network in the existing Utility AMI. EnergyNet Grid Applications include multiple grid applications. For example, grid application 1 is for data presentment, pre-payment, data collaborations, and shopping carts for commercial consumers; grid application 2 is for customer recruiting, behavior recommendations, and bill optimization for retail electric providers; grid application 3 is for point of sale, charging stations, merchant and marketing integration for an electric vehicle network; grid application 4 is for financial routing instructions and point of sale terminals for REP to generator settlements; etc. Third party infrastructure includes SOA for utility enterprise; consumer information; general ledger and accounting; billing, payment, and banks; marketing and strategy; and capitalization and investment.

FIG. 12 is a schematic diagram illustrating a high-level system architecture for an EnergyNet embodiment according to the present invention. This high-level system architecture includes a customer deployable distributed EnergyNet Customer Instance providing customers with a complete energy management, purchasing, and settlement solution within the microgrid and spot generation market for AES.

FIG. 13 is a schematic and flow diagram illustrating AES sequencing. There are four key elements within the EnergyNet enterprise financial settlement product: data ingress, market participation, payments collection, and advanced energy settlements. Intelligent purchasing decisions require advanced smart metering, and EnergyNet uses high speed IP metering technology to build a complete and real-time energy consumption profile aggregated from multiple sub-metering points. All consumption data within the enterprise forms settlement blocks, which are used to drive the billing and settlement process. All metering data is aggregated to provide a real-time settlement block and total enterprise consumption view with drill down. This data forms the basis for billing, settlement, forecasting, market view, and other analytical transformations. Note that EnergyNet can also utilize less dynamic data from legacy meters and head end systems where a customer investment in conventional sub-metering has already been made. Profiling is an important element for customers to forecast future usage and committing to purchase offerings. Time of Use (TOU) and/or demand profiles created from base data are an important tool for customers and generators alike; industry standard profiling techniques can be used to create profiles. Generators can use profiles to price their products and plan their generation activities. Customers can use profiles to ensure they commit to the power purchase offerings that are best aligned with their anticipated usage.

Buyers and sellers of electric power are connected within the microgrid or spot market associated with AES of the present invention. Sellers can advertise their generated capacity to customers in near real time and customers can make intelligent purchasing decisions based upon actionable real-time data. The Advanced Energy Settlement (AES) process performs all billing, payment, and settlement activities with financial and clearing participants. A configurable market purchasing rules engine ranks and selects energy from the market based on customer preferences such as cost, payment preference, locality, renewability of the energy, market supply, consumption, etc., and may recommend purchasing from one or more suppliers. The suitability of the offering also depends on additional factors, such as any minimum and maximum usage constraints, which requires decisions to be made based upon forecasts derived using historical data and profiles stored within EnergyNet.

Figure 14:
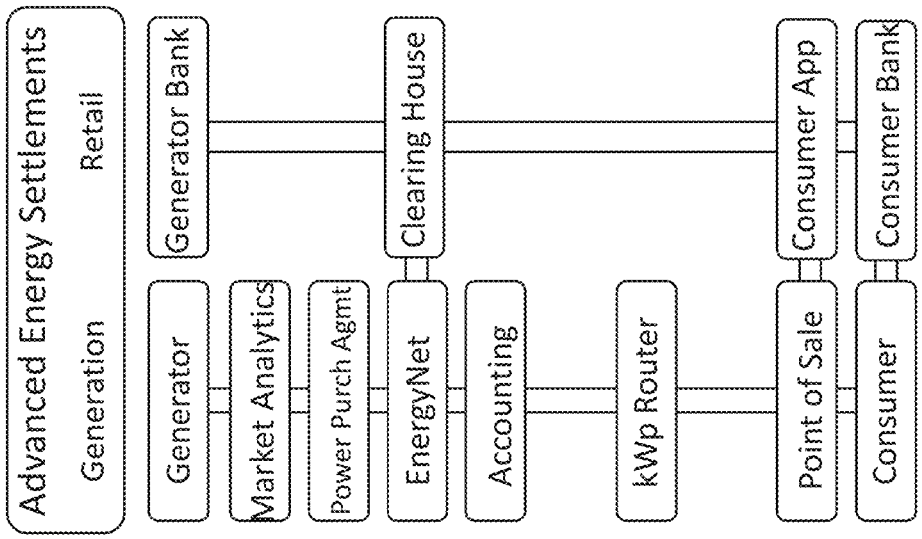
FIG. 14 is a schematic diagram illustrating AES evolution for the systems and methods of the present invention.
Figure 14:
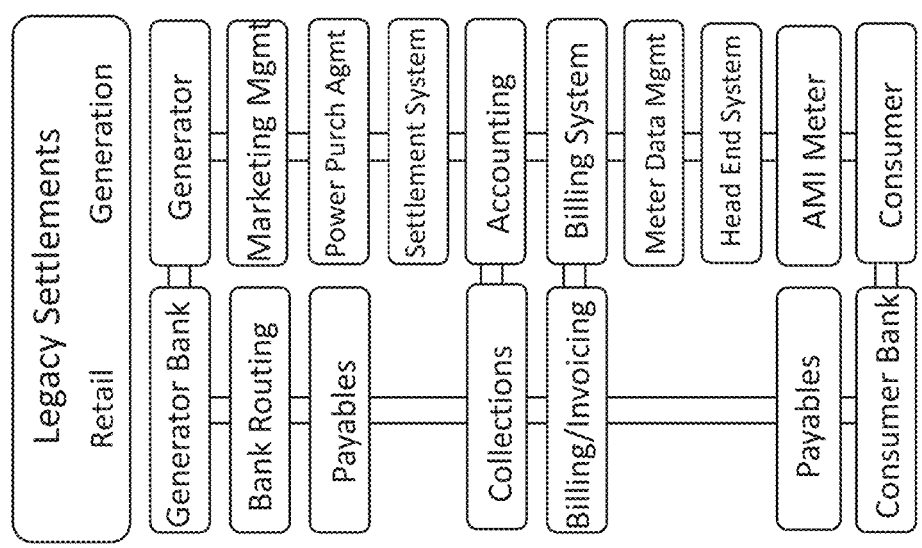

FIG. 14 is a schematic diagram illustrating AES evolution for the systems and methods of the present invention. The advanced energy settlements in the present invention has an EnergyNet Platform in communication with a clearing house, which does the settlements between the generator bank and the consumer bank. This requires fewer participants than legacy settlements, which results in simplified communications between the participants.

The EnergyNet data platform provides distinct graphic user interfaces (GUIs) for various participants of advanced energy settlements. In one embodiment, the GUIs are web-based interfaces. In another embodiment, the GUIs are interfaces of mobile application programs (Apps) for various participants.

The GUI enables simulation and modeling for building demand response resources DERs, microgrids, etc., allowing for a drag and drop that automatically triggers generation of a power model and a pro forma model having at least one generator and/or at least one load device associated with it, and an engineering interconnection based upon location, equipment, grid identifier, geodetic information, attachment point information, etc. The model considers collected data provided by the customer, historical data, and the current environment of the distribution system; it allows any operable attachment point to be an energy settlement and market-based financial settlement point, and provides an interconnection to the attachment point. The model also indicates if devices are added, provides cost information for the devices, lists the attributes of the devices, etc., which are used as inputs to generate a cost curve that determines how much the customer will spend and funds receivable based upon participation in programs (e.g., encouraging sustainable or alternative energy).

The system includes a grid element catalog that includes attributes of the grid elements. Based upon customer inputs, the model indicates options that match or fit the customer's profile. The model also provides information about financing and energy capacity programs as provided by REP, TDSP, independent system operator (ISO), RTO, community, FERC, and/or the governing body of the power grid. Once the customer selects a grid element, the system provides digital contract elements and/or financing terms associated with that grid element and/or corresponding services. For example, installation, service, and maintenance contract terms for generator, solar, etc. The digital contract is a standard form document between suppliers and consumers at wholesale or retail level. Digital contract terms are coordinated through the platform for market participants (e.g., utilities, consumers, and all parties between the utility and consumer). Digital contract terms for a grid element device are presented as part of update messaging and/or programming, through a coordinator or distributed database, or combinations thereof. Contract terms and data, including but not limited to financial settlements for grid elements and their participation on or with any electric power grid, extend through the fields of the template and function as a complex rules engine to be administered vis-à-vis the grid elements and related or corresponding services, distributed architectures, networks, etc.

The GUI shows options for customers based on customer preferences, data generated by the customer, and the results of power modeling. End use customers (residential or commercial) are presented choices for grid elements, OEMs offering grid elements, energy plans, and service and maintenance plans.

The platform makes calculations based upon the reliability of microgrids and/or DERs. These calculations are used to provide recommendations and updated information to users in real time and/or near real time through the GUIs.

Electric vehicles or other mobile power storage devices on the microgrid are part of the platform. The present invention allows for receiving, delivering, and/or discharging power from a mobile power storage device, interrupting the charging of that device, and combinations thereof with a portable market participant platform and corresponding GUI. Grid elements may decouple or couple to any pre-approved attachment point; this provides for dynamic interconnection of the grid element having mobile power storage. The platform dynamically updates the model for the grid upon confirmation of location or geo-detection of that grid element. The platform also contains predictive analytics that show locations in need of power inputs. Required components associated with the mobile storage device or electric vehicle include at least a meter for revenue grade metrology sufficient for market-based financial settlement and at least one pre-approved attachment point for the interconnect; the mobile storage device or electric vehicle must also be registered with the platform. Pre-approved interconnection zones are thus provided for mobile grid elements; these zones and/or their aggregation further provide for logical nodes for controlling or inputting power or load, demand response, etc. The zones may further function as balancing areas.

Utility Operator Interface

A utility operator interface provides a utility view for control room staff to control DERs with transparency. Maps, tables, and charts are applied for illustration and view in regional or smaller areas. Regional control scenario algorithm and detail view control for specific premise or units are applied for real-time behavior or run-mode adjustments to support grid operations.

Figure 15:
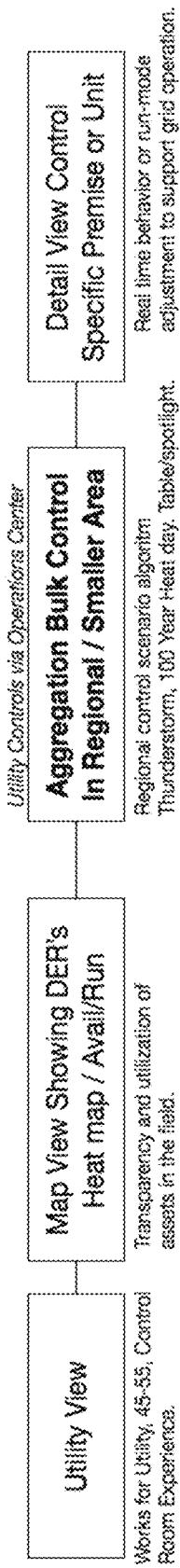
FIG. 15 is a block diagram for the functions of a utility operator interface provided by an EnergyNet data platform.

FIG. 15 is a block diagram for the functions of a utility operator interface provided by an EnergyNet data platform. The utility operator interface provides utility operators with a utility view, map view showing DERs, aggregation bulk control in regional or smaller areas, and detail view control for a specific premise or unit. In one embodiment, the map view of the utility operator interface includes a heat map of DERs showing available capacity and running capacity. It provides a transparent view of utilization of assets in the field. In one embodiment, a regional control scenario algorithm is used for aggregation bulk control. Current and/or historical weather and climate data may be listed in a table. Detail view control provides real-time behavior or run-mode adjustment to support grid operation.

Figure 16:
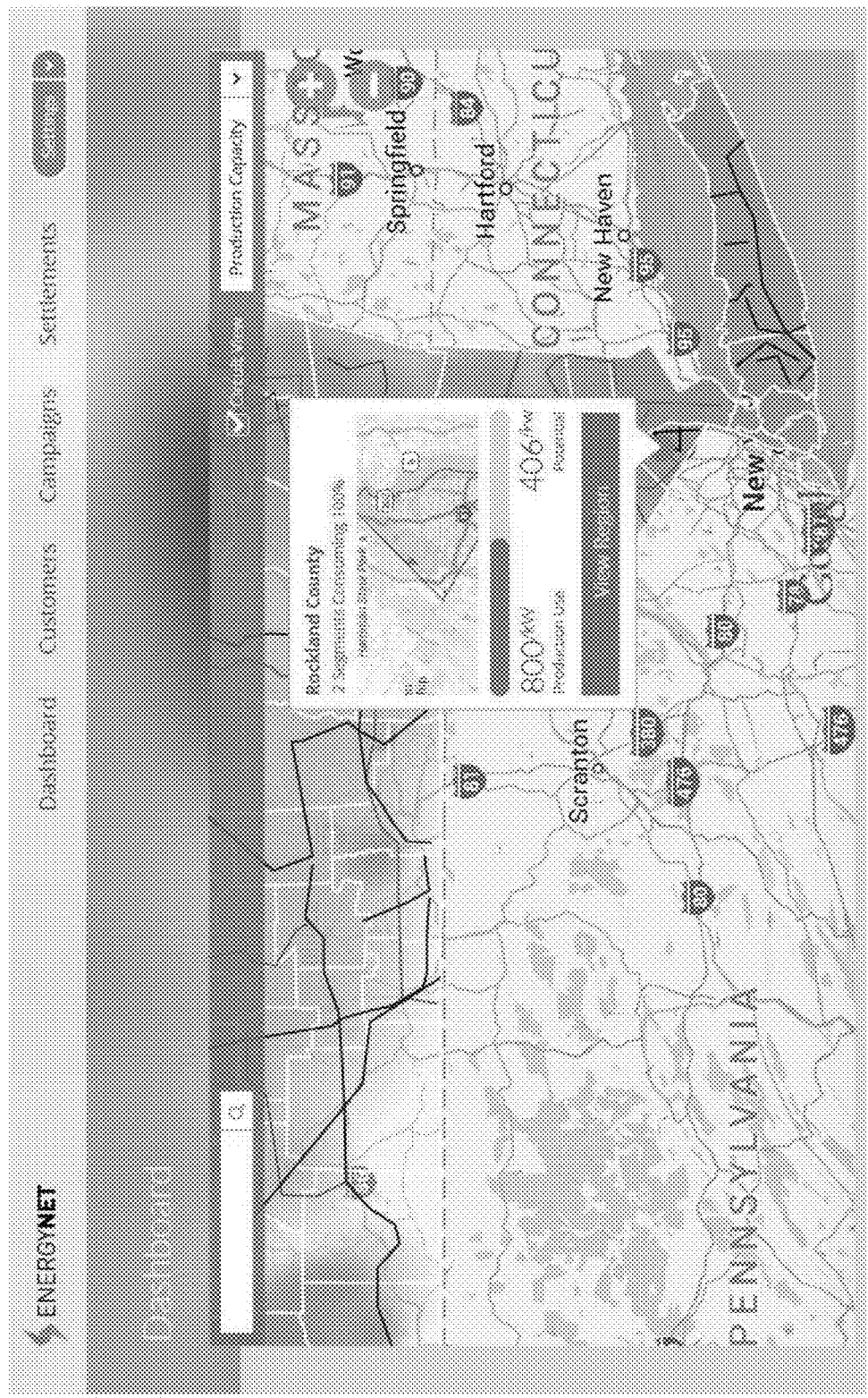
FIG. 16 is a screenshot of a utility operator interface showing a heat map of a distributed energy resource (DER) in a certain area displaying production capacity distribution by circuit view.
Figure 17:
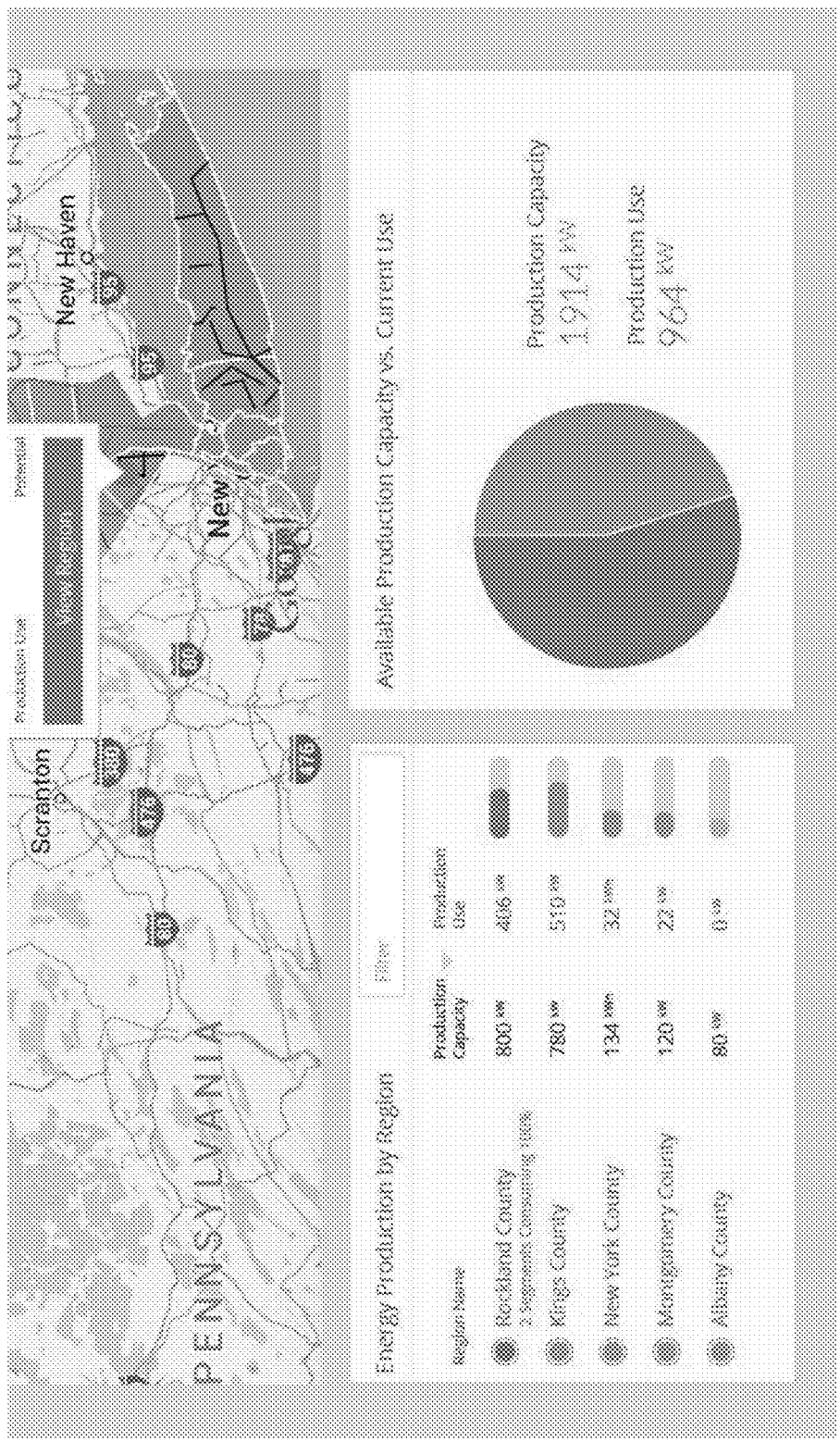
FIG. 17 is a screenshot of a utility operator interface showing energy production in a certain area by region.
Figure 18:
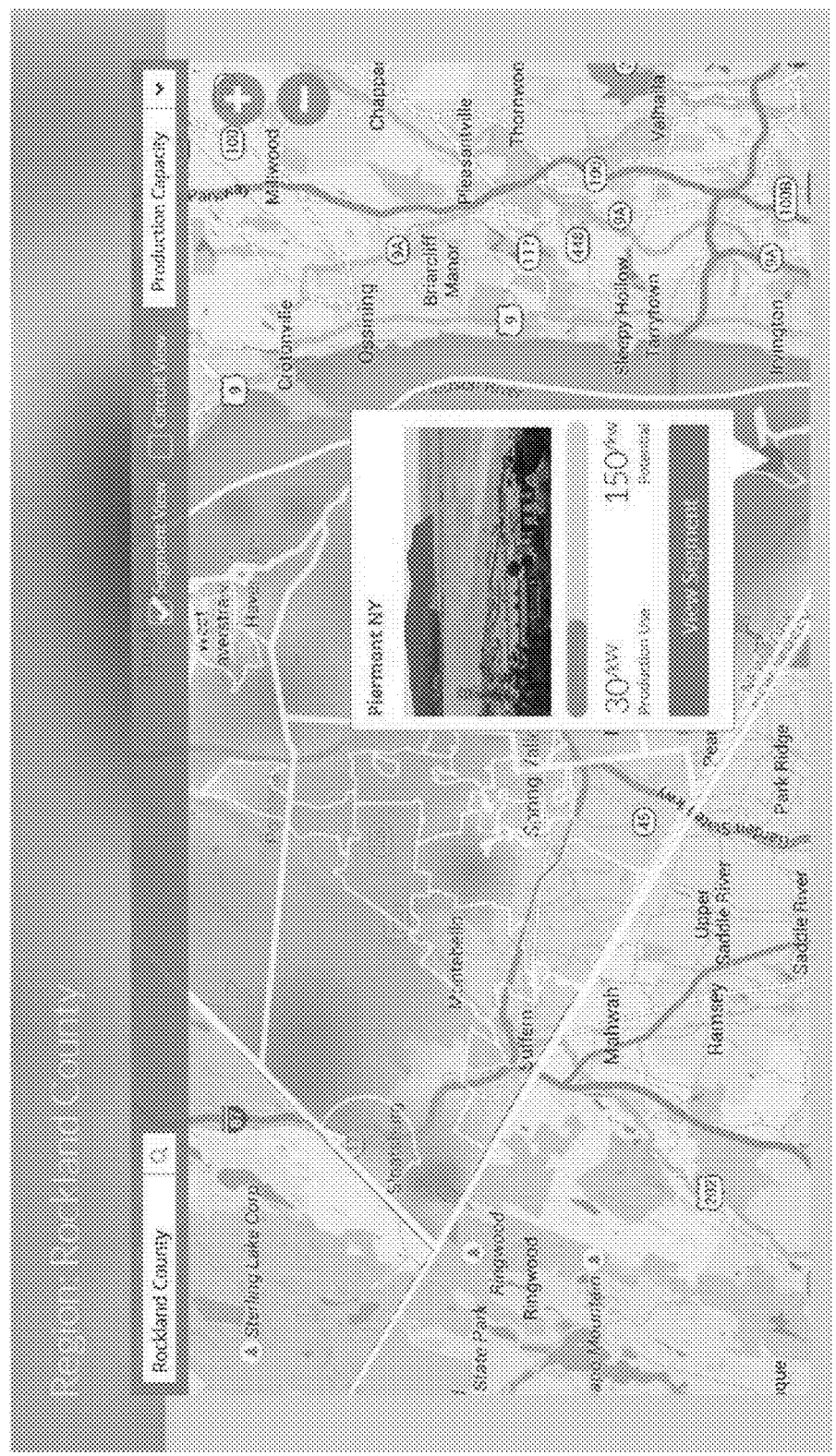
FIG. 18 is a screenshot of a utility operator interface showing a heat map of a DER displaying production capacity distribution by segment view.
Figure 19:
FIG. 19 is a screenshot of a utility operator interface showing a tabular and graphic description of different segments.
Figure 20:
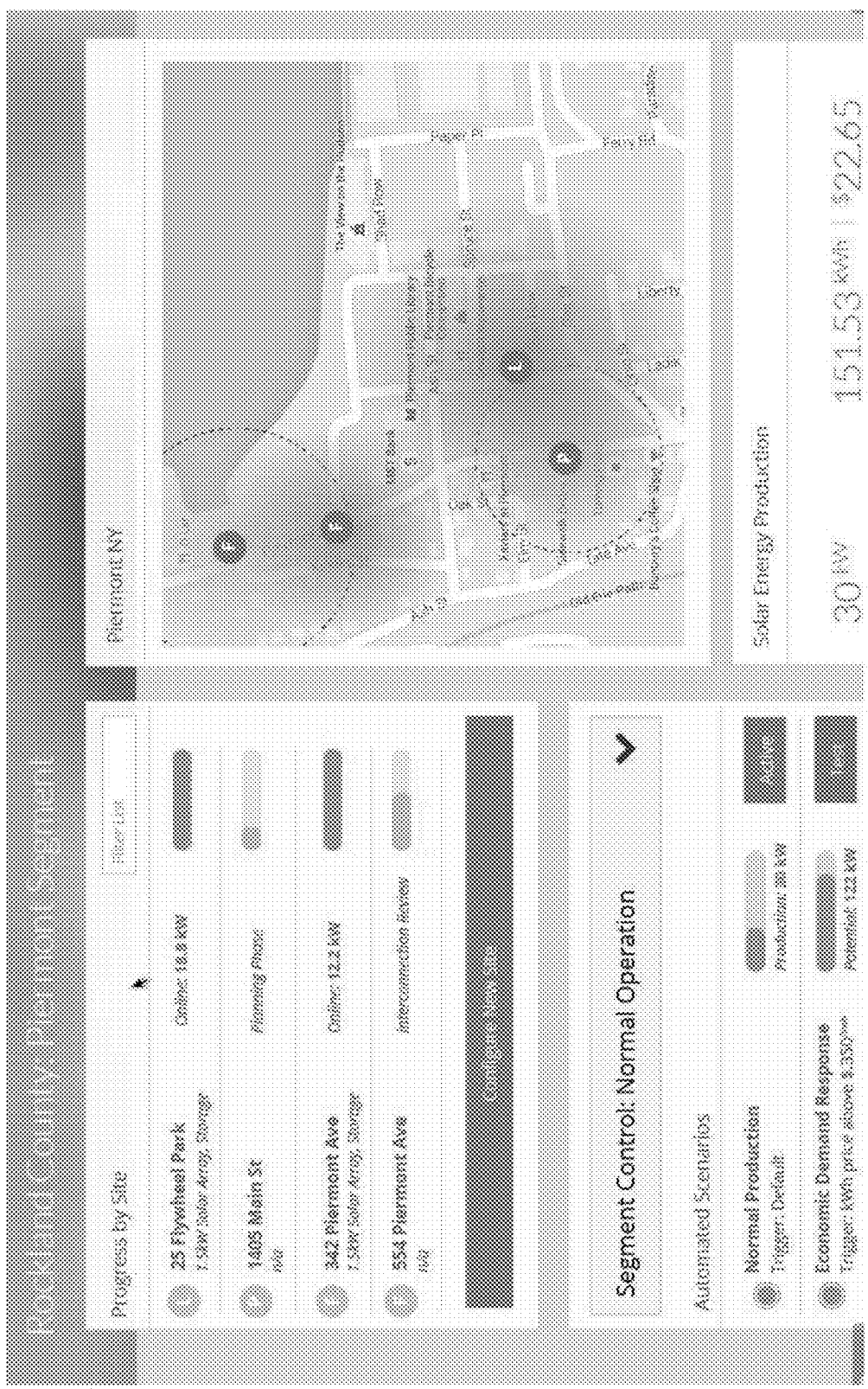
FIG. 20 is a screenshot of a utility operator interface providing a map of different DERs sites in a certain segment and information regarding each site's configuration.
Figure 21:
FIG. 21 is a screenshot of a utility operator interface showing a detailed energy description of a specific site.
Figure 22:
FIG. 22 is a screenshot of a utility operator interface describing the grid configuration of a specific site and showing the energy demand and usage of a specific site.

FIGS. 16-22 are screenshots of a utility operator interface. FIG. 16 shows a heat map of a distributed energy resource (DER) in a certain area displaying production capacity distribution by circuit view. FIG. 17 shows energy production in a certain area by region. Region name, production capacity, and production use are listed. A chart of available production capacity vs. current use is also displayed. FIG. 18 shows a heat map of a DER in a certain region displaying production capacity distribution by segment view. FIG. 19 shows a tabular and graphical description of different segments. Segment status, segment name, zip code, utility usage, the number of DERs sites in a segment, production potential, production use, and the microgrid configuration mode are listed in a table. The microgrid configuration mode options include but are not limited to normal production and economic demand response. When the utility cost is above a threshold, the microgrid in a certain segment may be in economic demand response mode. Control room staff can perform segment control via the utility operator interface, for example, to change microgrid configurations. Production sources are presented in a pie chart listing the type of power source, including but not limited to solar, generator, or storage. A bar graph of production vs. consumption is also shown, along with the average monthly production of energy per square foot, average monthly price per square foot for energy produced, average monthly consumption of energy per square foot, and average monthly price per square foot for energy consumed. FIG. 20 provides a map of different DERs sites in a certain segment and information regarding each site's configuration. Energy production, demand, and usage can be displayed for each site. The progress by site is shown, including information about whether a site is online, in the planning phase, or under interconnection review. A heat map including these different sites is also displayed. FIG. 21 provides a detailed energy description of a specific site. A heat map showing the location of the specific site is provided. Different energy sources, including alternate solar, utility, and battery storage, are listed with their current status, rate, and power usage. Solar energy production is illustrated in a bar graph, and values are shown for the current production and average daily production. FIG. 22 describes the grid configuration of a specific site and shows the energy demand and usage of that site. Various configuration modes include normal operation, off-grid island, grid parallel, distributed generation, demand response, and black start support. Utility operators are enabled to activate a certain configuration mode. Demand and use is displayed graphically, and information about the real-time power usage, current energy usage, current daily cost, average energy usage, and average daily cost is provided.

Interconnection Processing Interface

Figure 23:
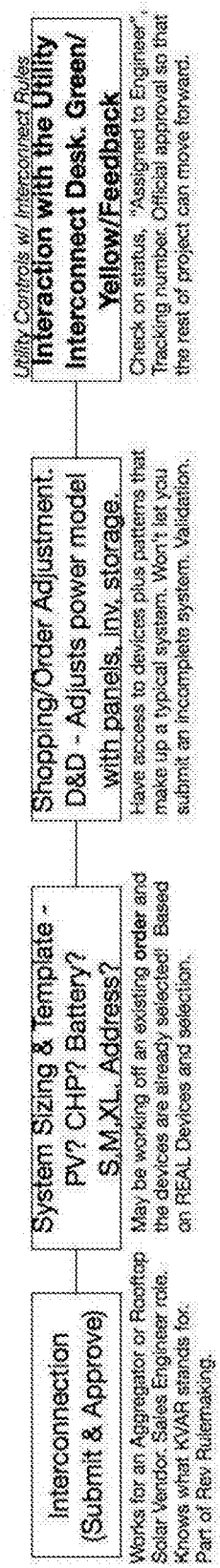
FIG. 23 is a block diagram for the functions of an interconnection processing interface provided by an EnergyNet data platform.

FIG. 23 is a block diagram for the functions of an interconnection processing interface provided by an EnergyNet data platform. The interconnection processing interface enables a sales engineer for a DER provider, demand response, curtailment response provider, or renewable energy provider, or any assets deployed at transmission/distribution system level for electric power grids to facilitate interconnection requests and studies, system sizing and template, shopping and order adjustments, and interaction with the utility interconnect desk. The interconnection processing interface also provides a validation function wherein a sales engineer is unable to submit an incomplete system.

Figure 24:
FIG. 24 is a screenshot of an interconnection processing interface showing interconnection progress by site.
Figure 25:
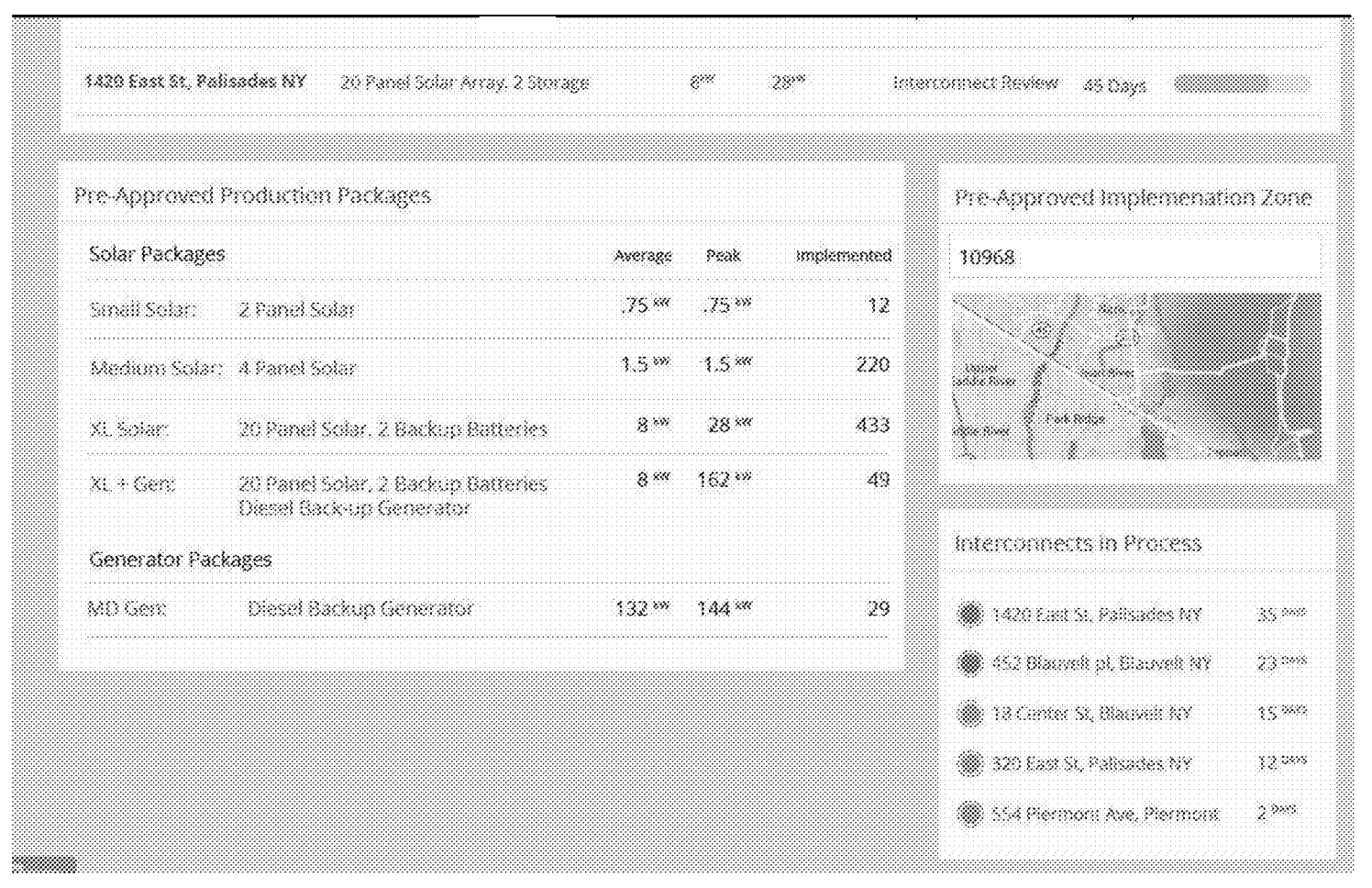
Figure 26:
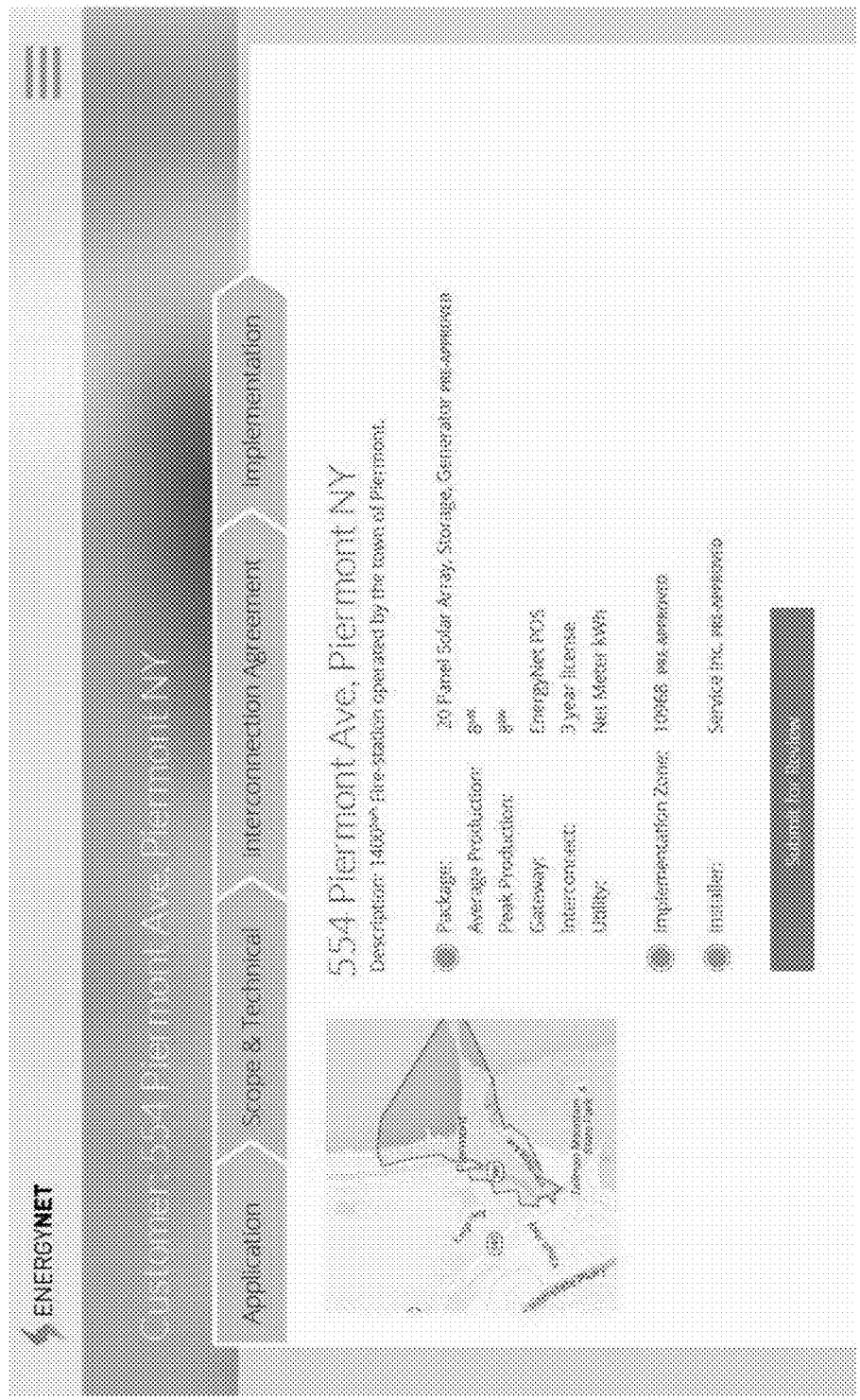
FIG. 26 is a screenshot of an interconnection processing interface displaying the scope and technical description for an interconnection application submitted for review.
Figure 27:
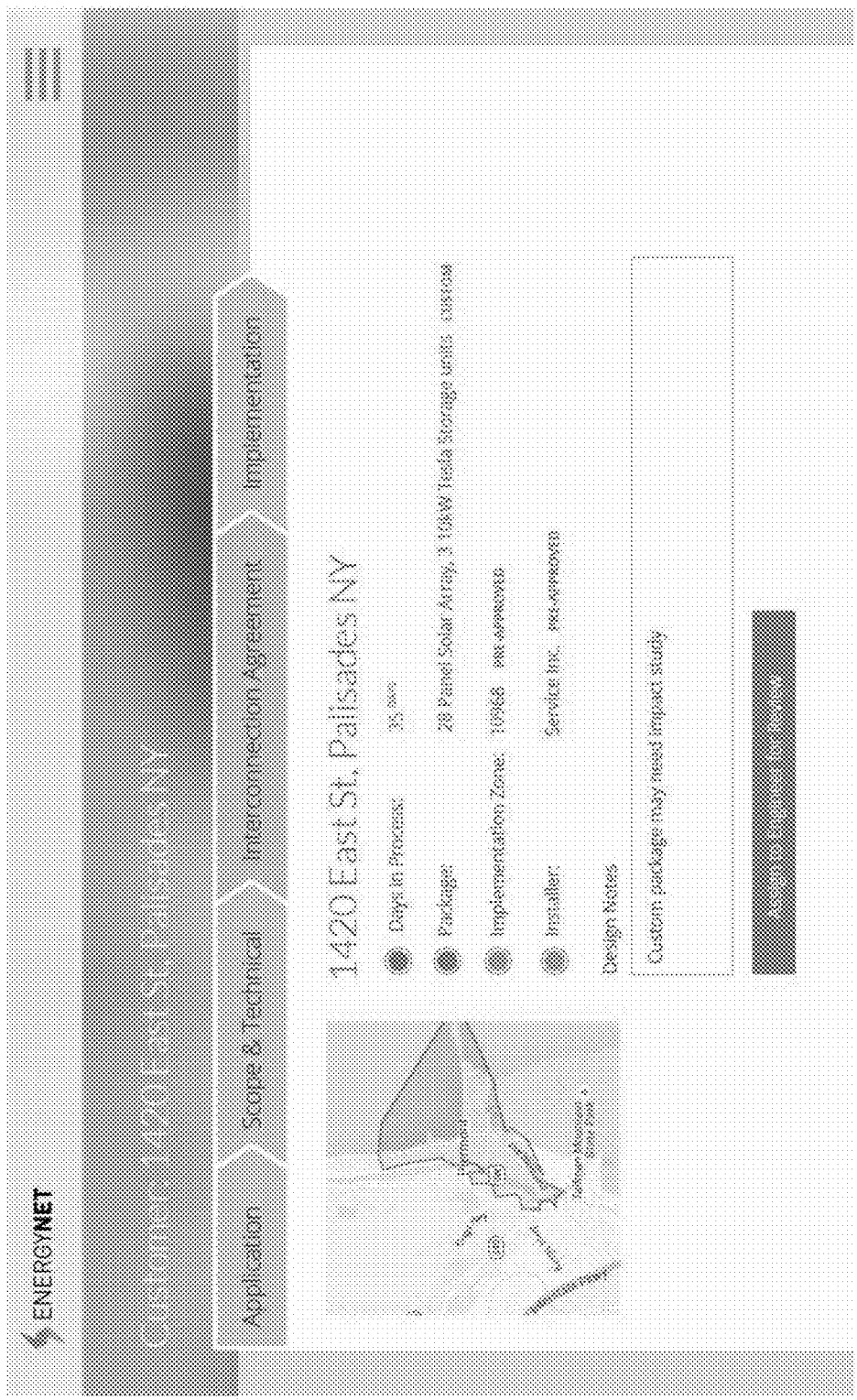
FIG. 27 is a screenshot of an interconnection processing interface displaying information about the interconnection agreement for an interconnection application assigned to an engineer for review.

FIGS. 24-27 are screenshots of an interconnection processing interface. FIG. 24 shows interconnection progress by site. Address, production configuration, average power, peak power, interconnection request stage, and time in progress are provided for each site. FIG. 25 displays pre-approved production packages. Descriptions of solar packages including size, equipment needed (e.g., solar panels, backup batteries, and backup generators), average power, peak power, and the number of implemented packages are provided, as well as descriptions of generator packages including the average power, peak power, and number of implemented packages. The interface also includes a list of interconnects in progress and the time in progress. FIG. 26 displays the scope and technical description for an interconnection application submitted for review. The interface displays a description of the site, the package selected by the customer, the average power production, peak power production, gateway, interconnect license information, utility, implementation zone, and installer. FIG. 27 displays information about the interconnection agreement for an interconnection application assigned to an engineer for review. The interface displays the address, days in process, package selected by the customer, implementation zone, and installer; it also allows for design notes to be entered about the application.

Vendor/Aggregator View Interface

Figure 28:
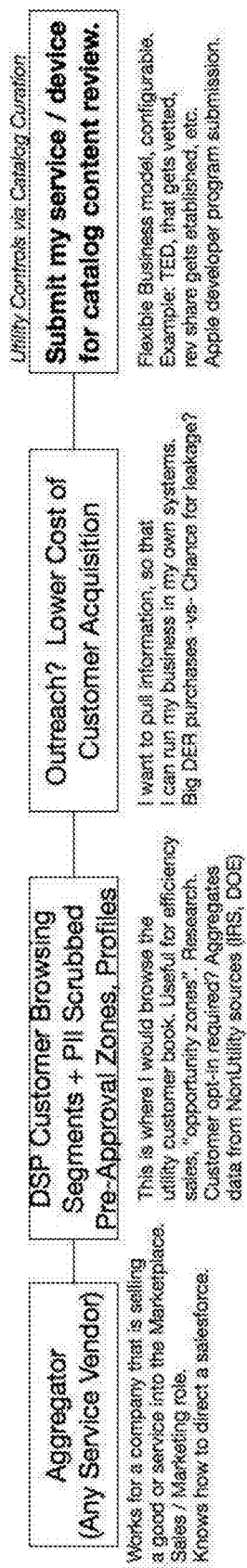
FIG. 28 is a block diagram for the functions of a vendor/aggregator view interface provided by an EnergyNet data platform.

FIG. 28 is a block diagram for the functions of a vendor/aggregator view interface provided by an EnergyNet data platform. The interface enables vendors/aggregators to browse distributed service provider customers, perform outreach, lower the cost of customer acquisition, and submit services and devices for catalog content review.

Figure 29:
FIG. 29 is a screenshot of a vendor/aggregator view interface listing top customer segments, top sellers in the marketplace, top campaigns in the marketplace, and pre-approved production zones.
Figure 30:
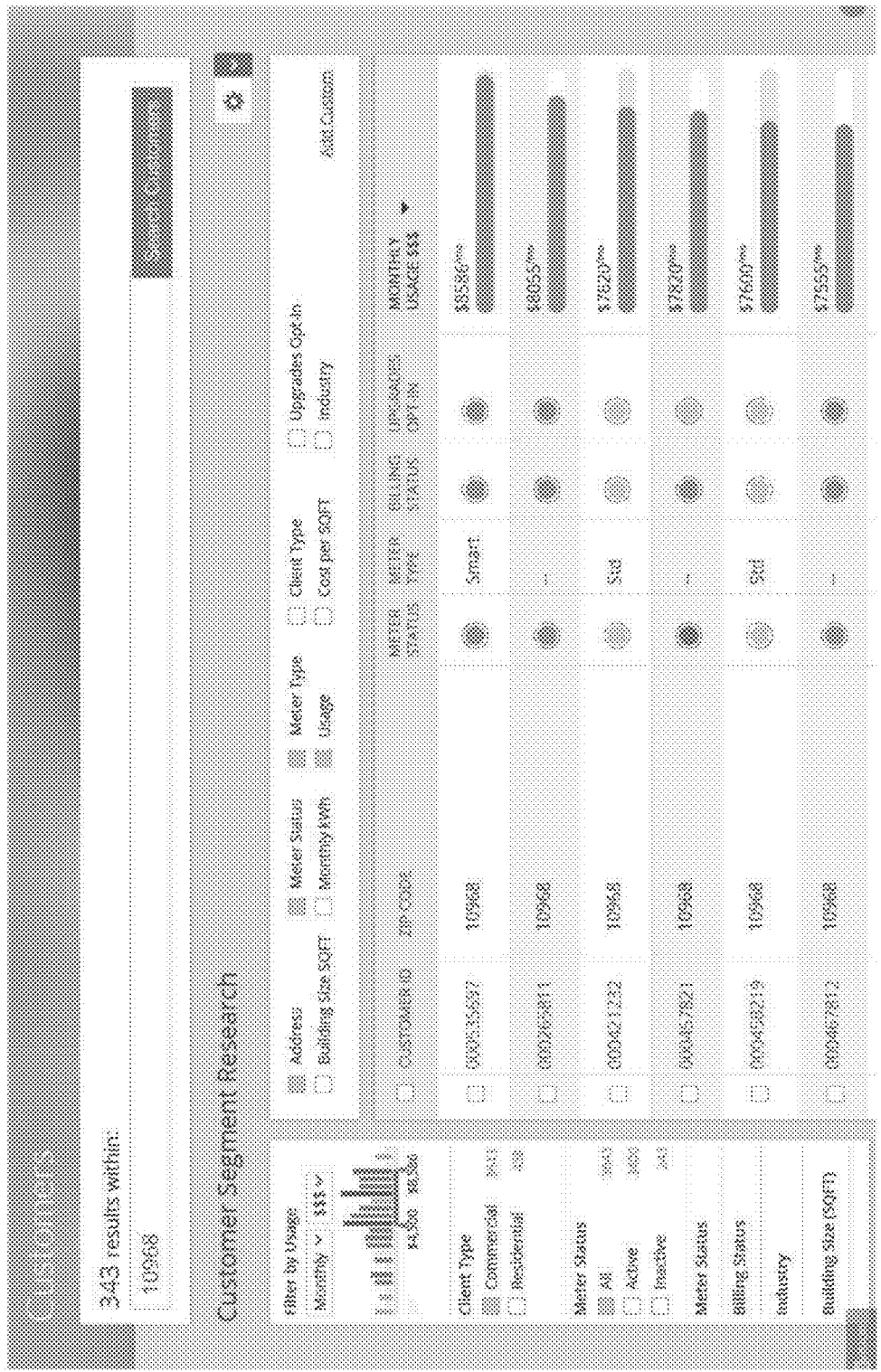
FIG. 30 is a screenshot of a vendor/aggregator view interface displaying customer segment research for vendors/aggregators.
Figure 31:
FIG. 31 is a screenshot of a vendor/aggregator view interface displaying submission of a device for catalog content review.

FIGS. 29-31 are screenshots of a vendor/aggregator view interface. Vendors can see their portfolio and prospect for new sales via the vendor/aggregator view interface. FIG. 29 lists top customer segments, top sellers in the marketplace, top campaigns in the marketplace, and pre-approved production zones. FIG. 30 displays customer segment research for vendors/aggregators. The platform is operable to allow a vendor user from level 3 (L3) to search customers based on key words, for example, zip code. The system also presents vendors with GUIs or views customers using relevant information such as address, meter status (e.g., active, inactive), meter type, client type (commercial or residential), billing status, upgrades opt-in, building size, monthly cost, monthly energy consumption, cost per square foot, industry type, etc. FIG. 31 displays submission of a device for catalog content review. Vendors/aggregators can edit information regarding pricing, rebates, and descriptions for a certain type of device, and provide information regarding optional services offered.

Marketplace View Interface

Figure 32:
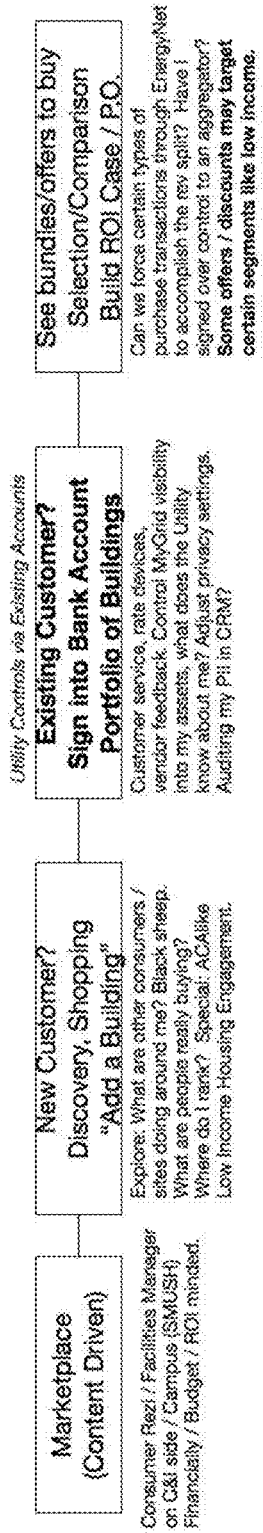
FIG. 32 is a block diagram for the functions of a marketplace view interface provided by an EnergyNet data platform.

FIG. 32 is a block diagram for the functions of a marketplace view interface. The marketplace view interface enables new customers to discover what other customers are doing in the market, and enables existing customers to manage their portfolios on the market and see bundles and offers for transaction.

Figure 33:
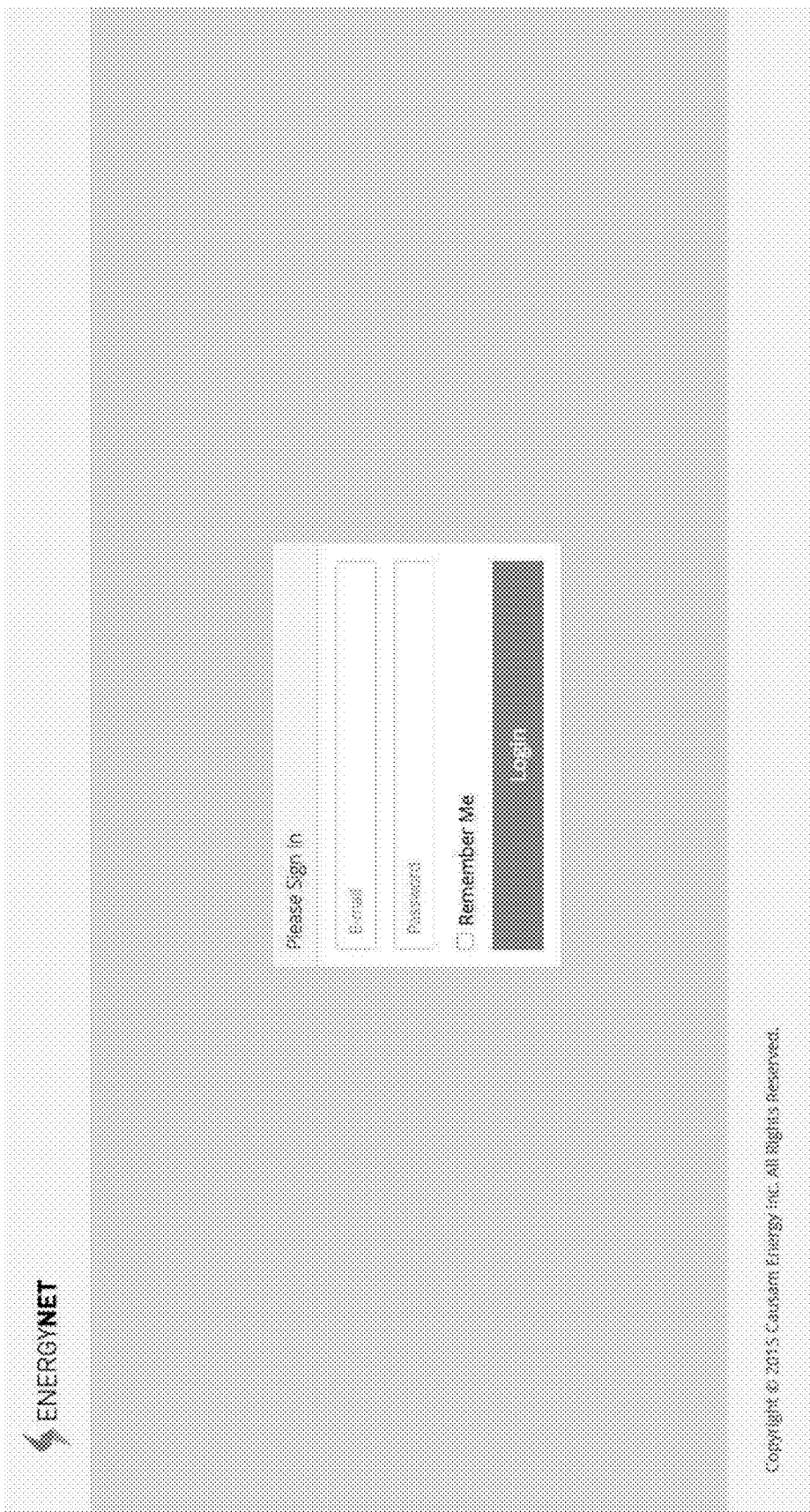
FIG. 33 is a screenshot of the log in screen for a marketplace view interface.
Figure 34:
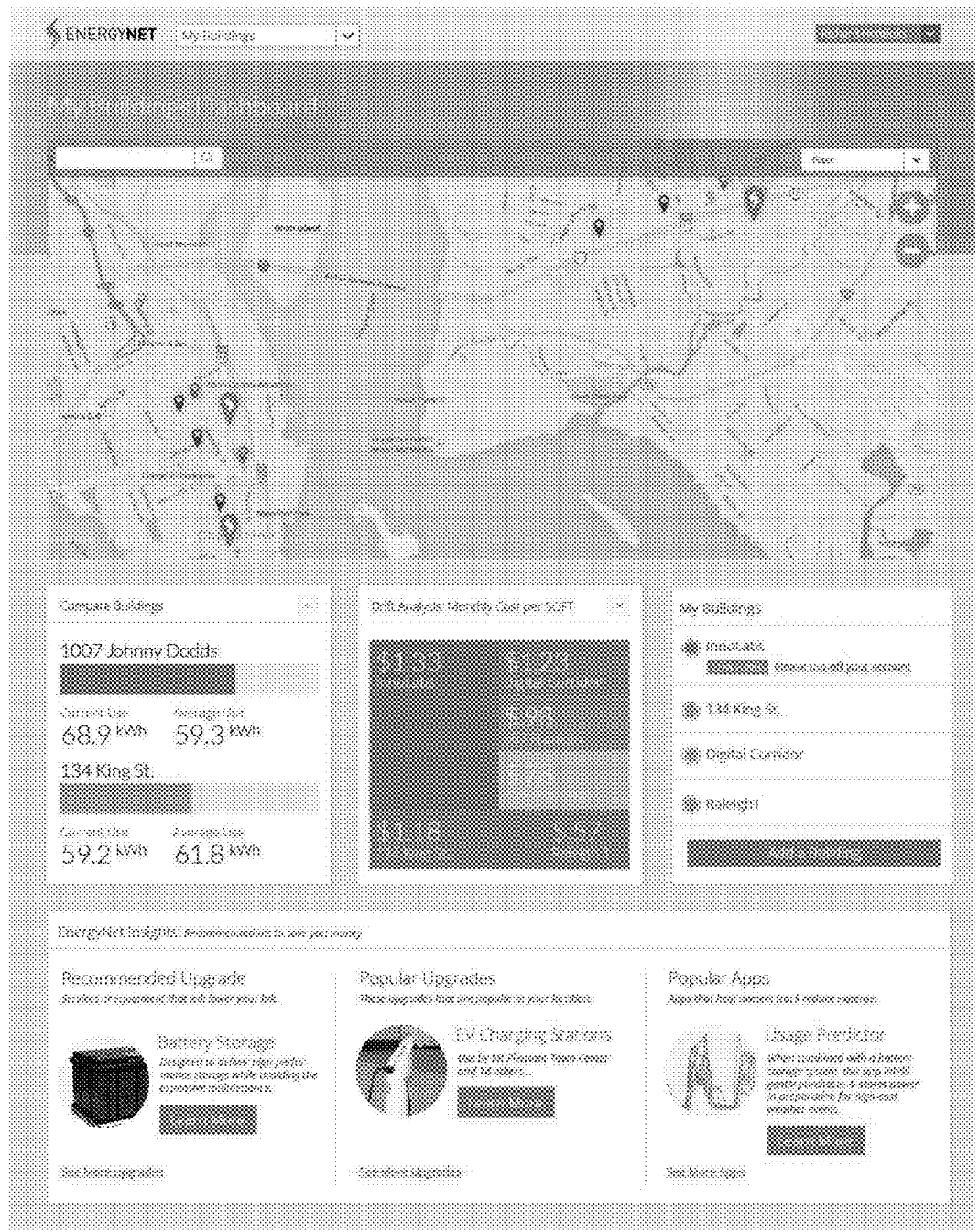
FIG. 34 is a screenshot of a marketplace view interface displaying a customer's buildings on a map and information related to energy usage at the buildings.
Figure 35:
FIG. 35 continues to illustrate the marketplace view interface of FIG. 34 with an overlay providing information about a specific building.
Figure 36:
FIG. 36 is a screenshot of a marketplace view interface displaying the description, energy rate, current/average usage, and daily cost for a site.

FIGS. 33-50 are screenshots of a marketplace view interface. The marketplace view interface enables commercial, industrial, and residential participants, such as homeowners or facility managers, to see their energy information, shop for new products or services in the marketplace on the EnergyNet platform, and manage rate plans. FIG. 33 is a screenshot of the log in screen for a marketplace view interface. FIGS. 34-36 display various functions under the "Dashboard" tab in the marketplace view interface. FIG. 34 displays a customer's buildings on a map and information related to energy usage at the buildings. The interface provides a list of all buildings owned or managed by the customer, the monthly cost per square foot for each building, and allows the customer to compare buildings. FIG. 35 continues to illustrate the marketplace view interface of FIG. 34 with an overlay providing information about a specific building. The overlay lists the price per square foot and energy rate for the building. FIG. 36 displays the description, energy rate, current/average usage, and daily cost for a site. The power sources for the site are listed (e.g., utility, solar, backup generator), and a summary of the account balance is shown. Additionally, a recommendation to configure the site's grid to connect to nearby microgrid producers is displayed.

Figure 37:
FIG. 37 is a screenshot of a marketplace view interface displaying current energy usage.
Figure 38:
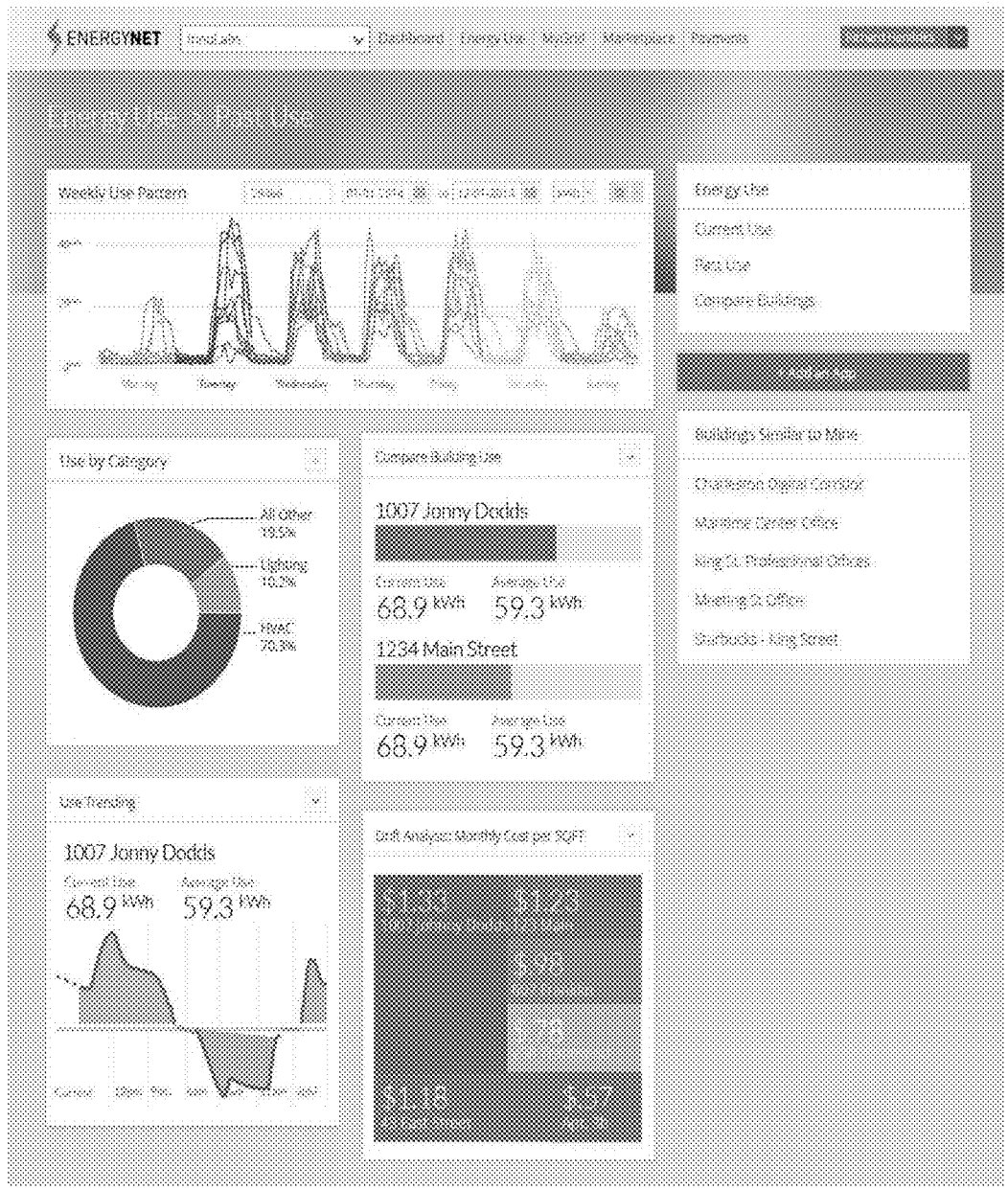
FIG. 38 is a screenshot of a marketplace view interface displaying past energy usage.
Figure 39:
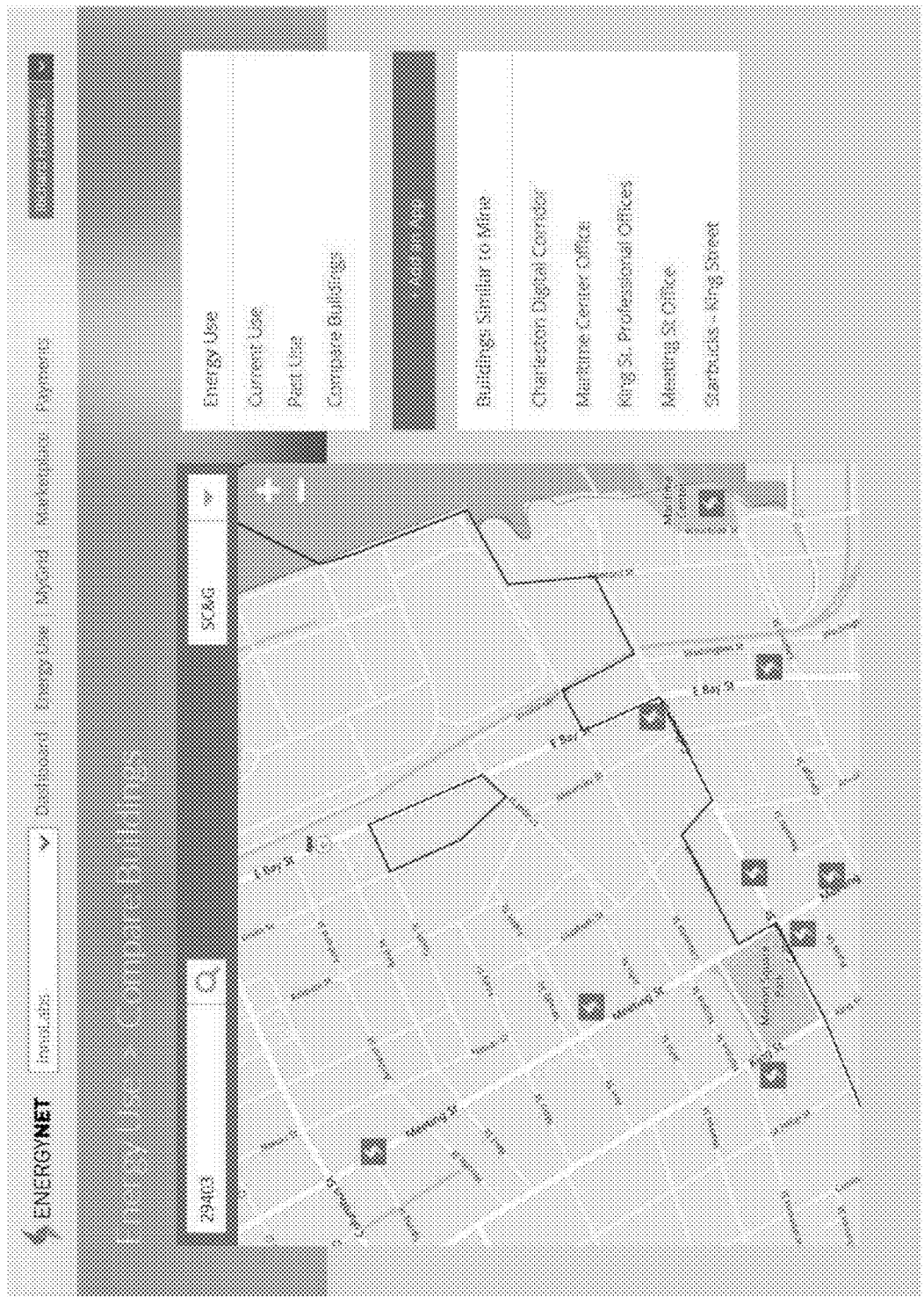
FIG. 39 is a screenshot of a marketplace view interface allowing users to compare the energy use of different buildings.
Figure 40:
FIG. 40 continues to illustrate the marketplace view interface of FIG. 39 with an overlay showing a brief description of a selected building.
Figure 41:
FIG. 41 is a screenshot of a marketplace view interface showing a comparison between two buildings.
Figure 42:
FIG. 42 continues to illustrate the marketplace view interface of FIG. 41 with an overlay showing a recommendation to install an electric vehicle charging station.

FIGS. 37-42 display various functions under the "Energy Use" tab in the marketplace view interface. FIG. 37 displays current energy usage, including a real-time power usage chart, average daily power usage, peak daily power usage, peak monthly power usage, cumulative daily energy use, average daily energy usage, 30 day energy usage, and 30 day reactive energy usage. FIG. 38 displays past energy usage, including weekly use pattern, use by category, use trending, building use comparison, and drift analysis. FIG. 39 is a screenshot of a marketplace view interface allowing users to compare the energy use of different buildings. FIG. 40 continues to illustrate the marketplace view interface of FIG. 39 with an overlay showing a brief description of a selected building. FIG. 41 shows a usage and cost comparison between two buildings. The interface also allows the user to compare the energy use of a specific building to the regional average. FIG. 42 continues to illustrate the marketplace view interface of FIG. 41 with an overlay showing a recommendation to install an electric vehicle (EV) charging station.

Figure 43:
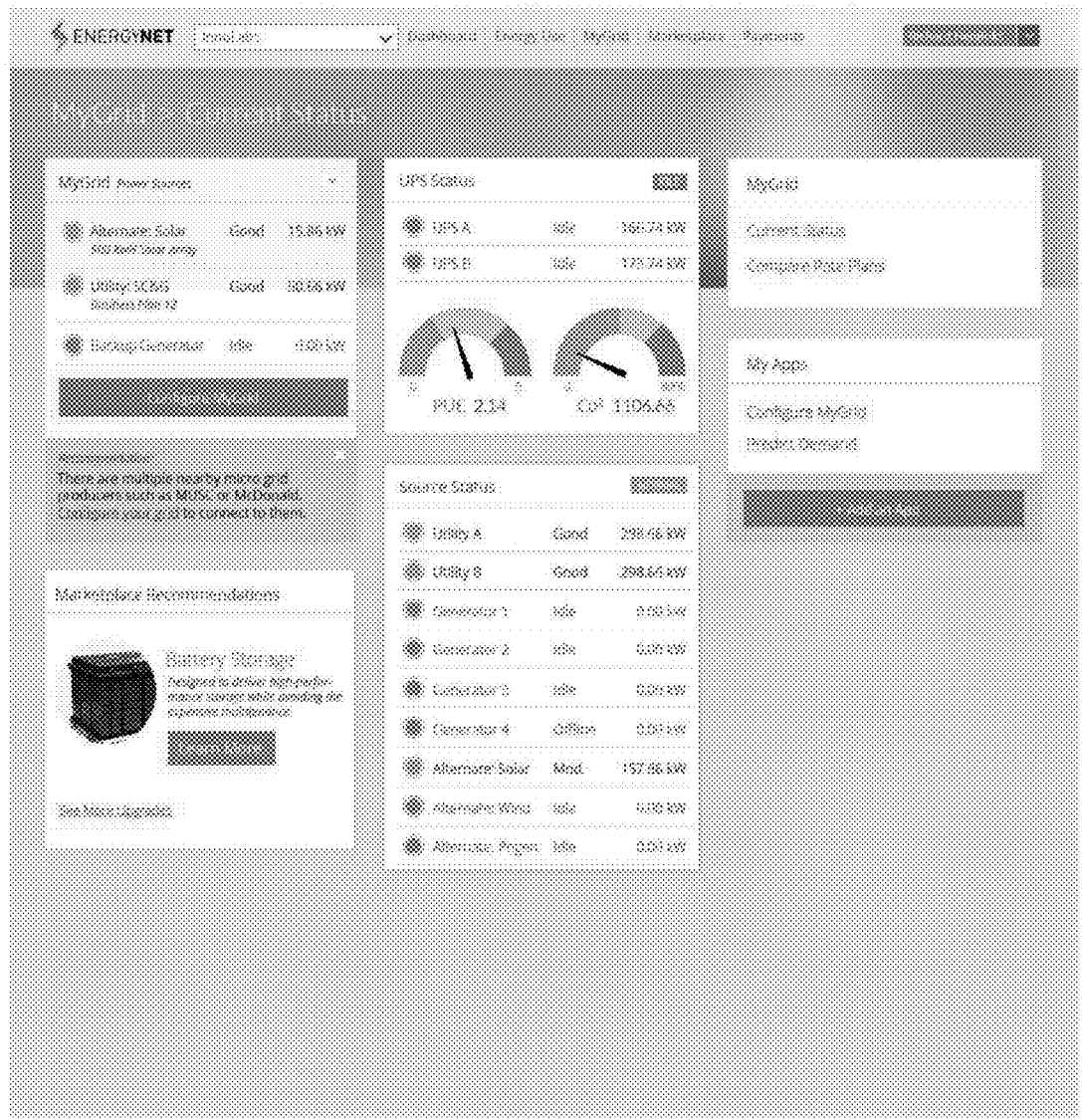
FIG. 43 is a screenshot of a marketplace view interface showing the current status of a customer's grid.

FIG. 43 displays the current status of a customer's grid. Power sources (e.g., solar, utility, backup generator) are listed with real-time and/or near-real-time status and power level, and real-time and/or near-real-time UPS status and power levels are displayed. Graphic representations of power usage efficiency (PUE) and carbon dioxide emissions are shown. A table showing source status, including the source name, status, and power level, is displayed. Additionally, a recommendation to configure the site's grid to connect to nearby microgrid producers is displayed, as well as a recommendation to purchase an upgraded battery storage device.

Figure 44:
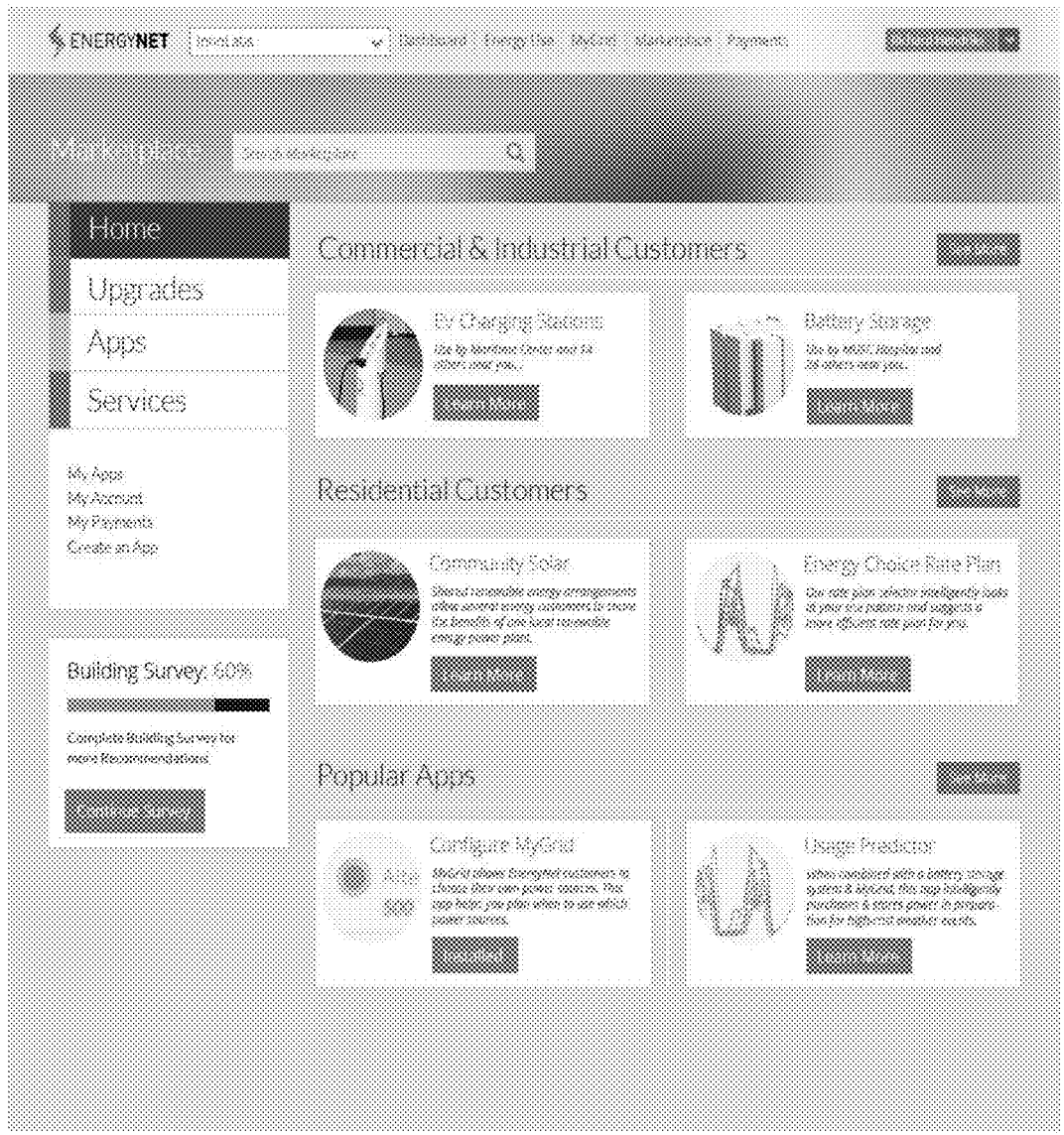
FIG. 44 is a screenshot of the home page of the marketplace for commercial and industrial customers, residential customers, and popular apps.
Figure 45:
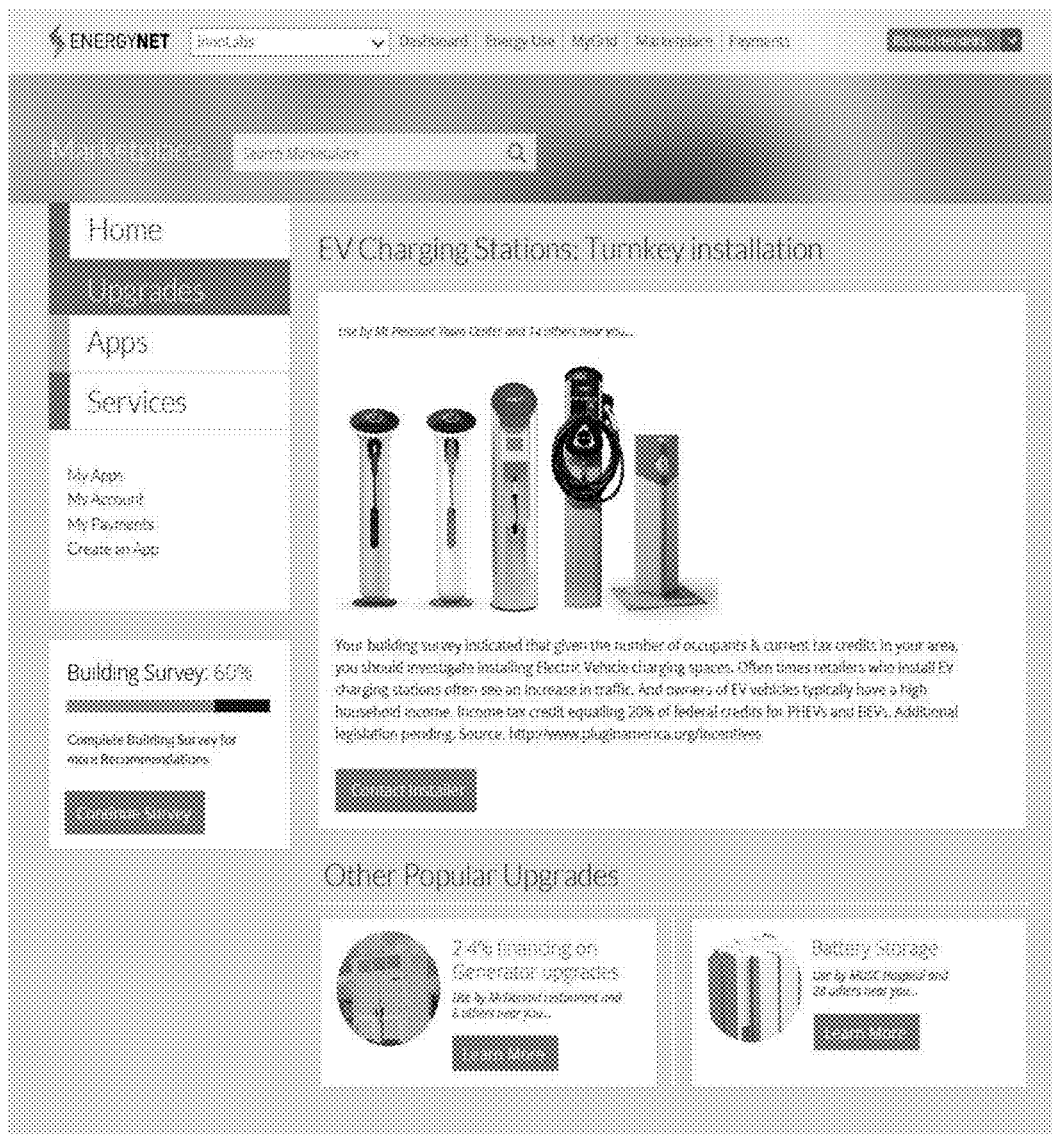
FIG. 45 is a screenshot showing upgrade options in a marketplace view interface.
Figure 46:
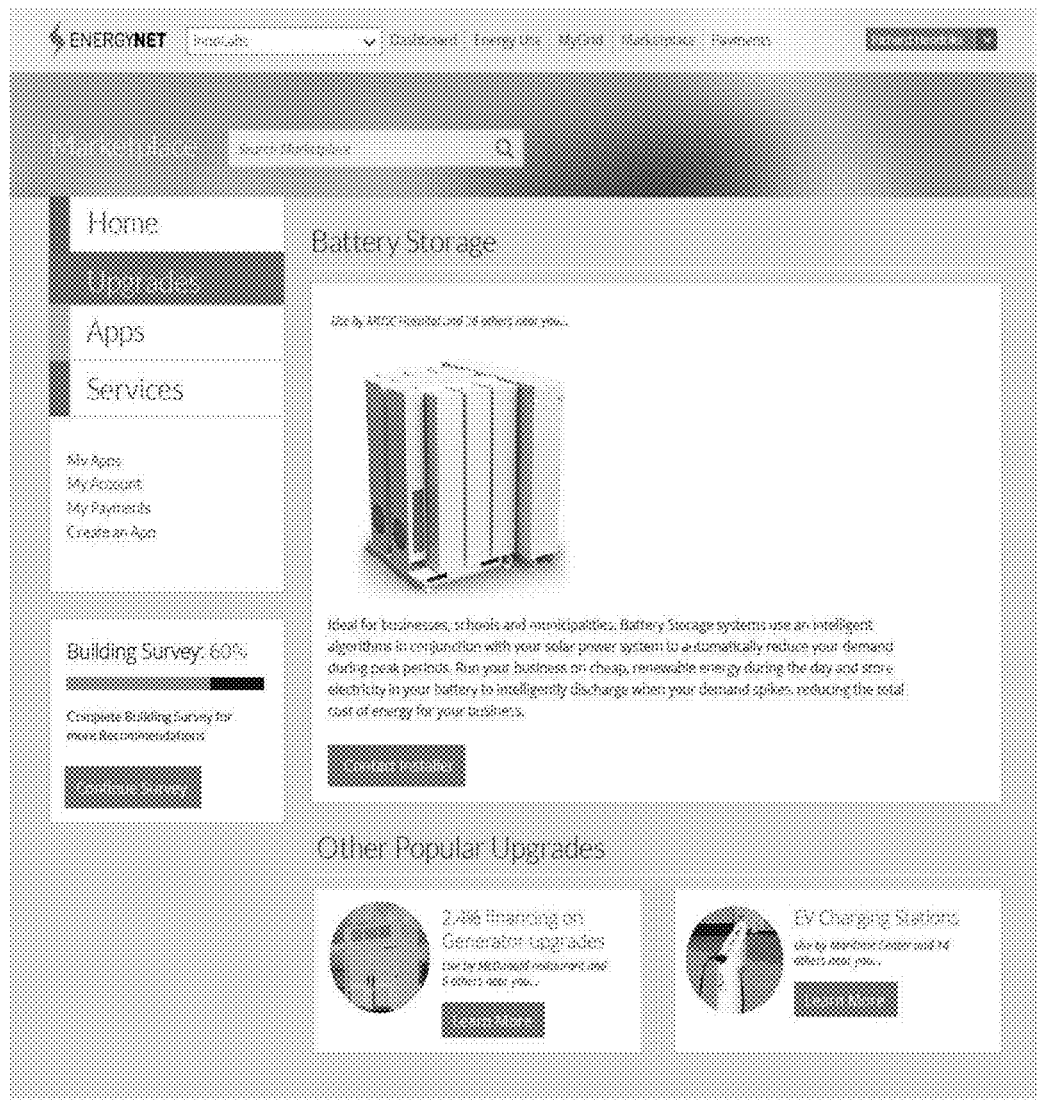
FIG. 46 is another screenshot showing upgrade options in a marketplace view interface.
Figure 47:
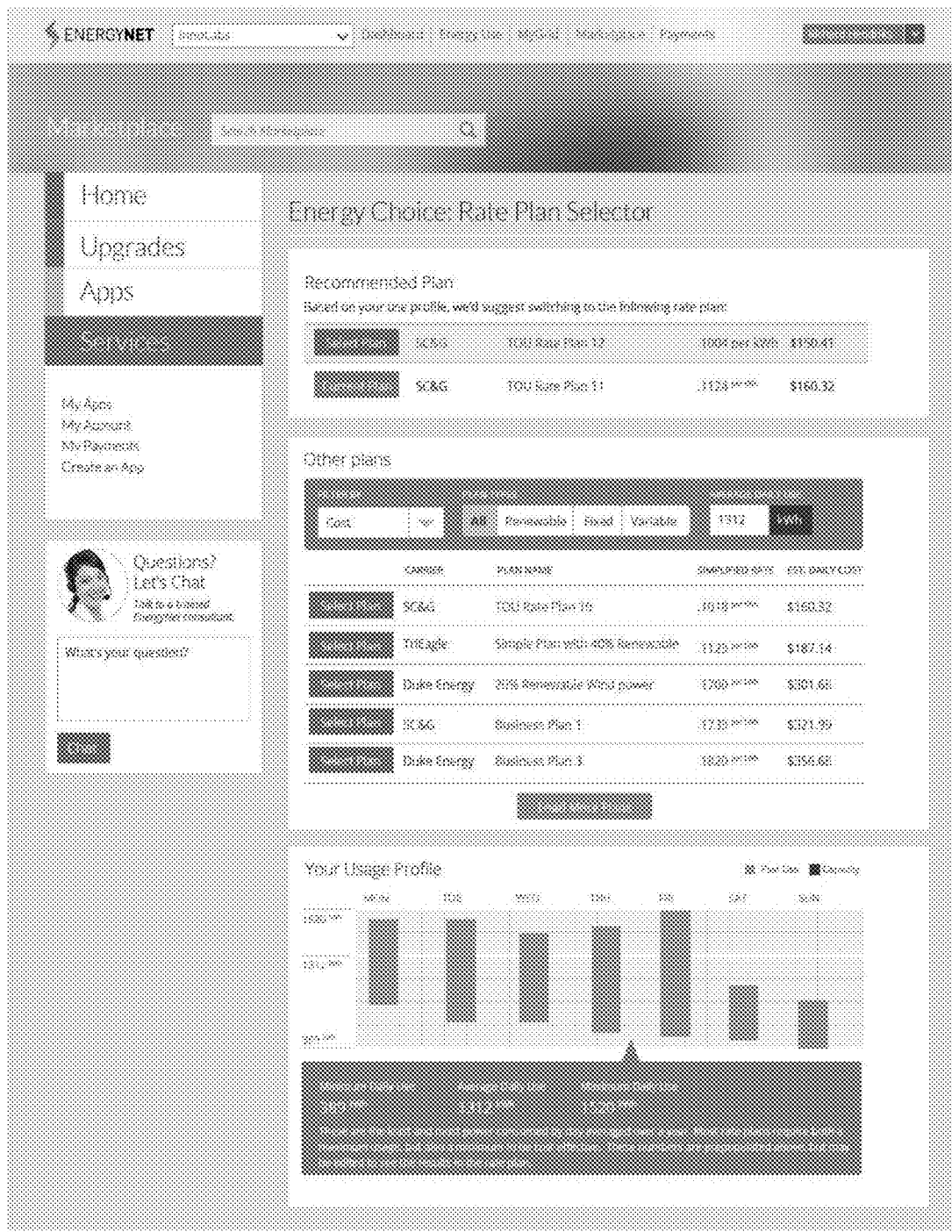
FIG. 47 is a screenshot showing a rate plan selector in a marketplace view interface.
Figure 48:
FIG. 48 continues to illustrate the marketplace view interface of FIG. 47 with an overlay showing a description of a selected plan.
Figure 49:
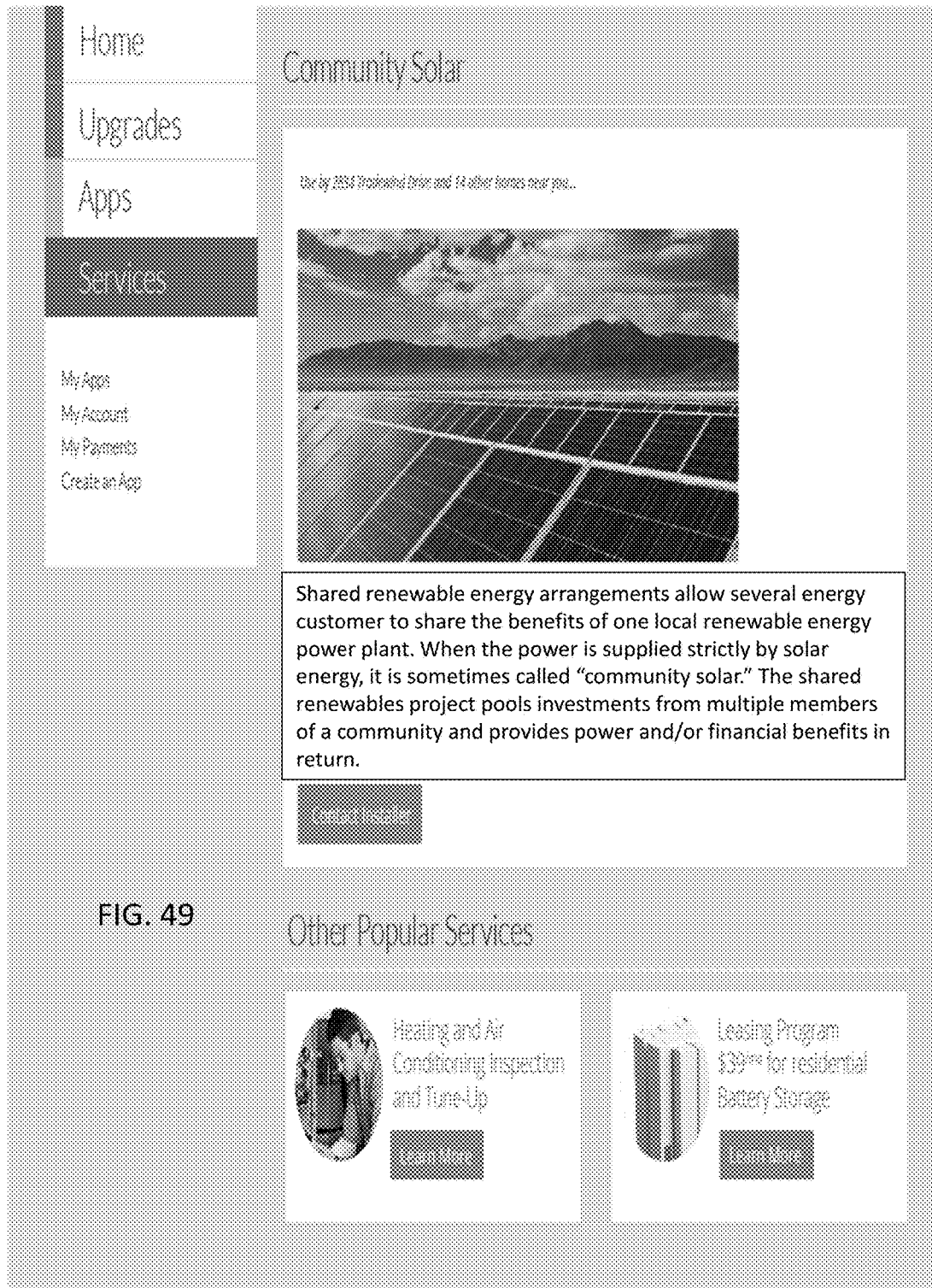
FIG. 49 is a screenshot of a marketplace view interface displaying other services provided by the marketplace.

FIGS. 44-49 display various functions under the "Marketplace" tab in the marketplace view interface. FIG. 44 is a screenshot of the home page of the marketplace for commercial and industrial customers, residential customers, and popular apps. The home page suggests completing a building survey for more recommendations. FIGS. 45 and 46 show upgrade options, including turnkey installation for EV charging stations, battery storage upgrades, and low interest financing on generator upgrades. FIG. 47 shows a Rate Plan Selector as one of the services provided by the marketplace. Recommended plans are listed based on the user profile. Other plans are also listed and users may filter the listed plans by information such as cost or plan type (e.g., all, renewable, fixed, variable). A user may select a plan by clicking the "Select Plan" button next to the plan. FIG. 48 continues to illustrate the marketplace view interface of FIG. 47 with an overlay showing a description of the selected plan, including the simplified rate, plan terms, and additional fees. If the user decides to select the plan, they can do so by clicking "Enroll in Plan." FIG. 49 displays other services provided by the marketplace, for example, community solar installation, heating and air conditioning inspection and tune-up, and a leasing program for residential battery storage.

Figure 50:
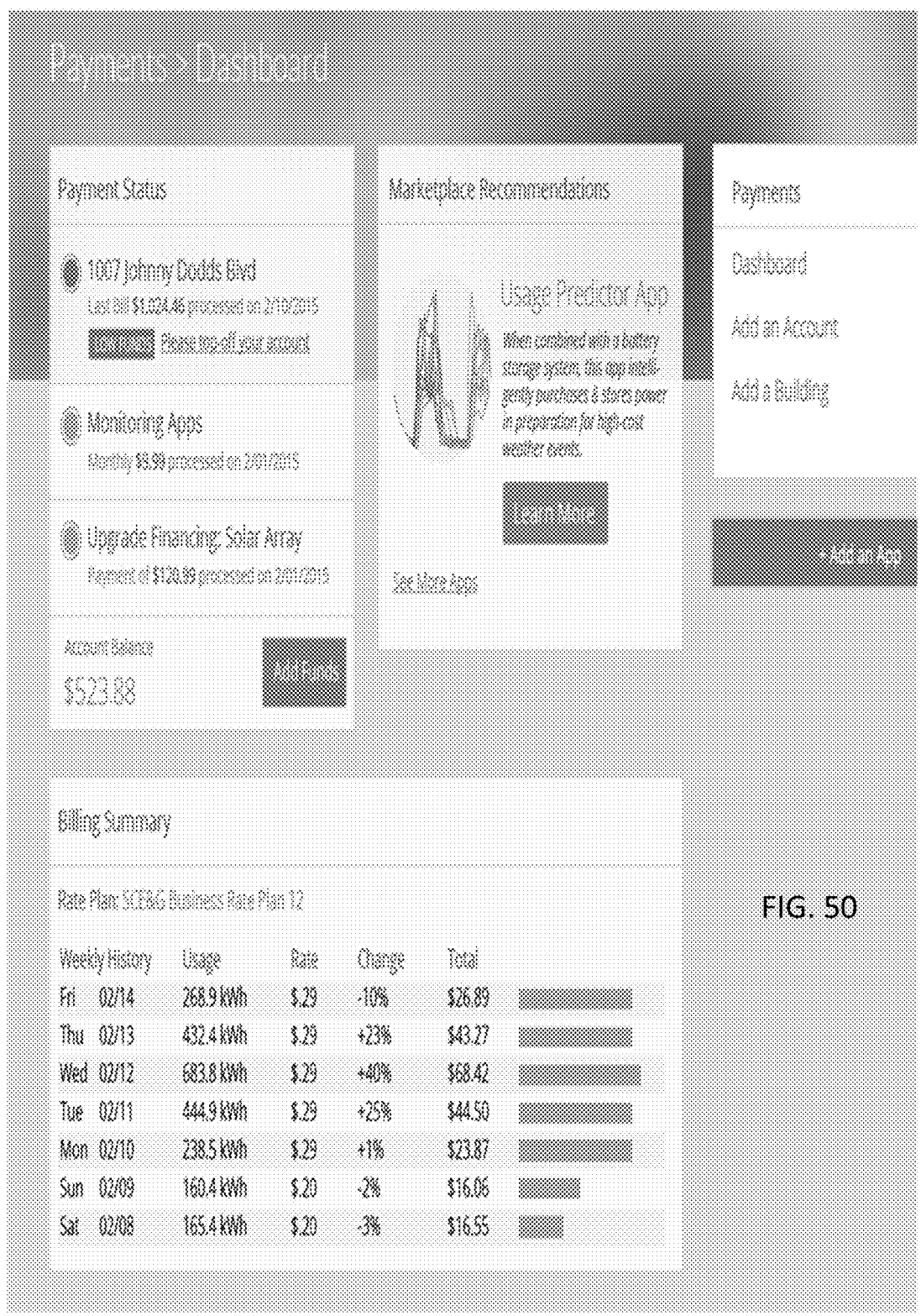
FIG. 50 is a screenshot of a marketplace view interface showing the payments dashboard.

FIG. 50 displays the payment dashboard in the marketplace view interface. Payment status, marketplace recommendations, and a billing summary are provided. The billing summary includes weekly history, energy usage, rate, change, and total for the rate plan. Users can also add funds to the account through the payment dashboard.

Financial Settlement View Interface

Figure 51:
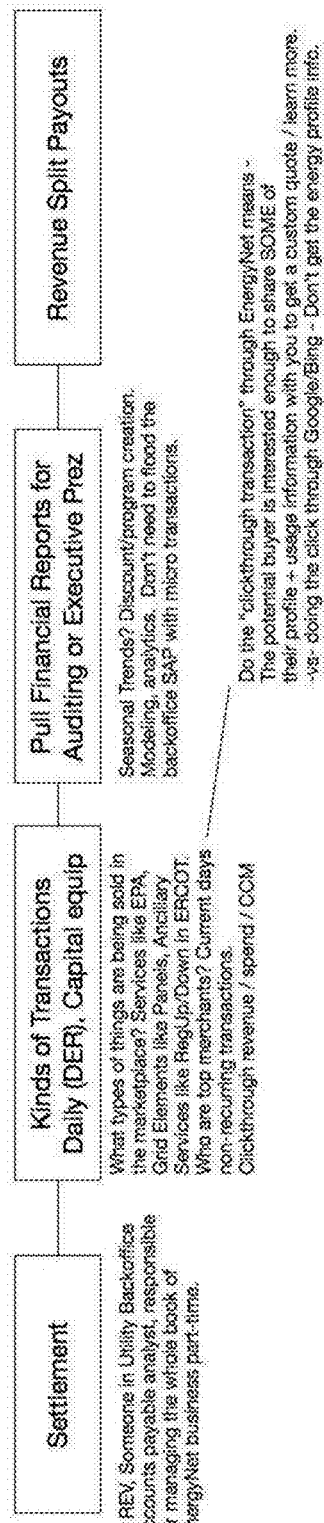
FIG. 51 is a block diagram for the functions of a financial settlement view interface provided by an EnergyNet data platform.

FIG. 51 is a block diagram for the functions of a financial settlement view interface provided by an EnergyNet data platform. The financial settlement view interface provides information regarding settlements, transactions, and revenue split payouts, as well as financial reports. The financial settlement view interface also enables utility back office staff to see a view of revenue streams from the EnergyNet platform to the utility. The supplied energy and consumed energy are also reconciled and provided in similar views such as a general ledger format. A blockchain view may also be provided, wherein a list of nodes is provided that show the number of transactions that are being published through the nodes, which allows users to view their node and status of transactions through the node.

Figure 52:
FIG. 52 is a screenshot of a financial settlement view interface showing the settlements dashboard.
Figure 53:
FIG. 53 is a screenshot of a financial settlement view interface showing recent transactions.

FIGS. 52-53 are screenshots of a financial settlement view interface. FIG. 52 displays the settlements dashboard of the financial settlement view interface. The financial settlement view interface is operable to show different transaction types (e.g., energy production, grid elements, services, application programs) performed by the EnergyNet platform and the percentage of financial settlements within the EnergyNet platform for each transaction type. The production transaction type includes settlements between energy consumers and energy providers. The grid elements transaction type includes solar panels and backup generators. The services transaction type includes Environmental Protection Agency (EPA) service, financing, installation, and ancillary services. An example of an ancillary service is regulation down/regulation up in Electric Reliability Council of Texas (ERCOT). The Apps transaction type includes the building monitoring app and other apps. The financial settlement view interface also displays marketplace campaign information, including annual profit potential, and digital contracting status for different sites. A table of recent production settlements, including transaction number, energy rate, and settlement amount (value), is also shown. FIG. 53 displays recent transactions within the financial settlement view interface. Detailed information for each transaction number is provided, including seller, buyer, rate, contract type, fuel mix, and value.

Tiers or Levels within the EnergyNet Platform

One embodiment of the present invention is a system of an advanced energy network, comprising a platform communicatively connected to at least one distributed computing device operable for providing inputs from at least one energy user, wherein the platform is operable to: create a user profile for the at least one energy user; collect energy usage data for the at least one energy user; associate the energy usage data with the user profile corresponding to the at least one energy user; aggregate the energy usage data; estimate projected energy usage for the at least one energy user; predict energy consumption data based on the energy usage data and the projected energy usage data; and store the energy usage data, the projected energy usage data, and the predicted energy consumption data in a database. In Level 0 (L0) of the present invention, the user or consumer is engaged in the platform by providing verified information on actual energy usage to the platform. In Level 1 (L1) of the present invention, the user may provide additional information to the system and/or additional information may be gathered from public sources. In Level 2 (L2) of the present invention, the user may add grid elements to their user profile. In Level 3 (L3) of present invention, the utility, grid element vendors, meter data aggregators, etc. may identify sales opportunities based on data in the database and provide marketing for products and/or service offerings to consumers (consumer users) or commercial users with profiles within the EnergyNet platform. In Level 4 (L4) of the present invention grid elements operable for providing electric power supply (by way of example and not limitation, solar power generation, fuel cell or battery power storage devices, wind generation, back-up power generators, etc.) that are properly constructed and configured, modeled, and connected with revenue grade metrology acceptable for energy settlement and market-based financial settlement within the energy market, are introduced after being registered and profile created within the EnergyNet platform.

In one embodiment, for level 0 (L0) the actual energy usage data documented within a utility bill is uploaded to the platform by an energy user having a profile or creating a profile on the EnergyNet platform. The actual energy usage data is uploaded and communicated over at least one network to at least one computer or server associated with the platform, which automatically recognizes the format of the utility bill based upon prior utility bill(s) uploaded by at least one user. For example, if a first user uploads a utility bill to the platform and selects the relevant information from the utility bill, the platform may automatically recognize the format of utility bills for subsequent users who have the same service provider. Also or alternatively, the energy user inputs indication of which data to capture from the utility bill for automatic association with that user's profile. The system also provides options for the energy user to selectively redact information on the utility bill, such as customer name, account number, and PIN number. The platform may automatically populate the database based on the data on actual energy usage in the utility bill. The platform is further operable to collect at least one of real-time or near real-time data from grid elements and data from smart meters associated with the at least one user.

Figure 54A:
Figure 55A:
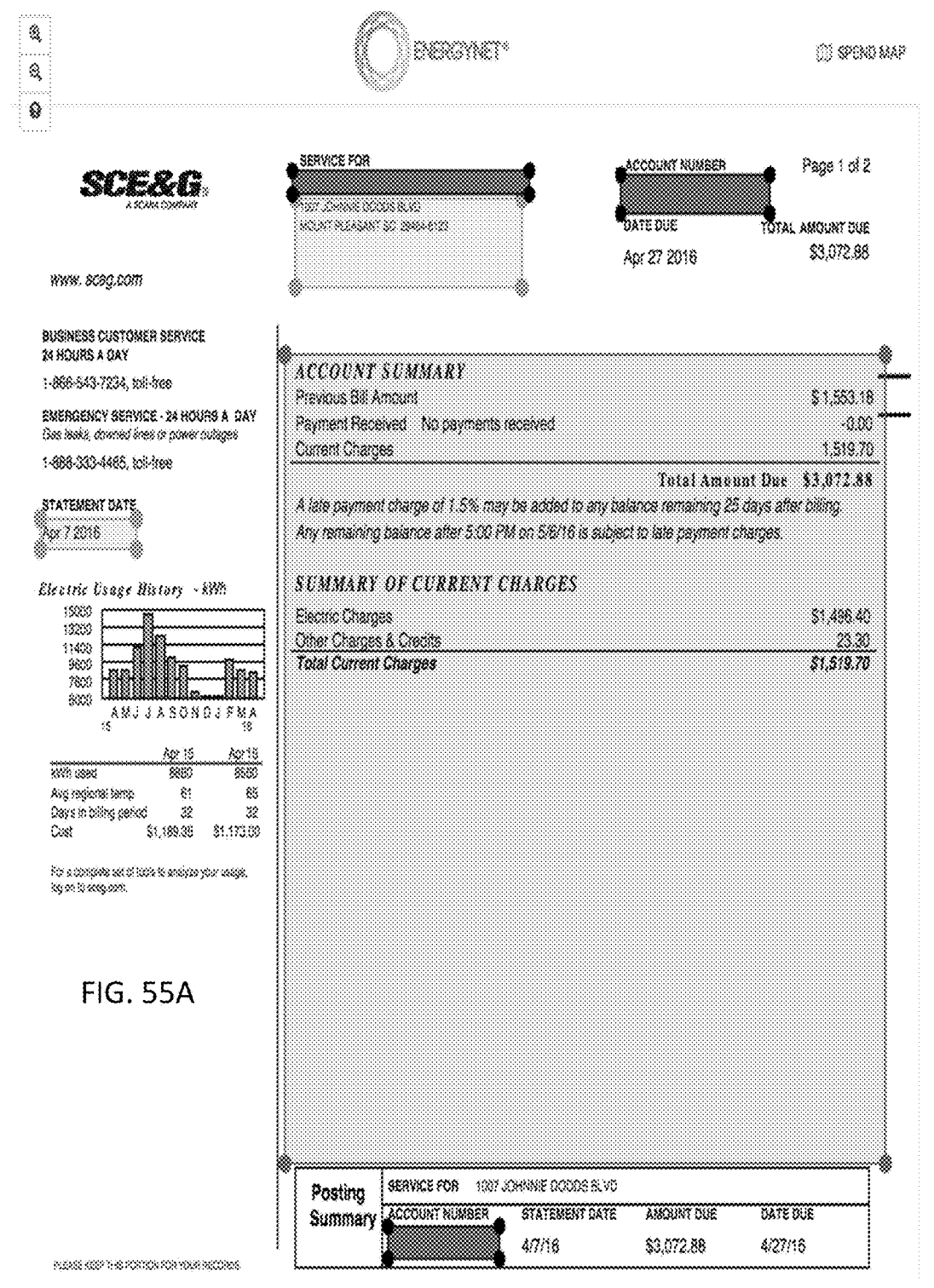

FIG. 54A and FIG. 54B are screenshots of a utility bill verification for an electric bill. The utility bill is shown on the left side of the screen in FIG. 54A. The system extracts the relevant information from the utility bill, such as service address, bill date, and current charges for electricity from the bill as shown in FIG. 54B. The system allows users to select the relevant information to be extracted. In a preferred embodiment, the user can adjust the selection overlays with matching colors on the bill by dragging the overlays or their corners as needed. If the information is still incorrect after adjusting the selection overlays, the user can modify the values in the fields themselves. When all fields are correct, the user can verify the values in the fields by pressing the confirm button as shown in FIG. 54B. If the system recognizes the format of the utility bill, it automatically populates the fields in FIG. 54B with the name of the electric provider, service address, building type, bill date, and current charges. Information such as the customer name, account number, and PIN number may be redacted by the system and/or user inputs as shown in FIG. 54A. FIG. 55A and FIG. 55B are screenshots of a utility bill verification for an electric and gas bill. The utility bill is shown in FIG. 55A. The system populates the current charges field in FIG. 55B with the electric charges and does not include "Other Charges & Credits" in the value populated in the field.

The embodiments disclosed make use of the "user profiles" concept. The user profile includes, but is not limited to, the following: (1) energy user name; (2) service address; (3) electric provider; (4) building type; (5) historical and current bill dates; and (6) historical and current charges for electrical service. The user profile may further include information regarding geodetic location; meter ID; customer programs (possibly including program history); device information, including device type and manufacturer/brand; user energy consumption patterns; and connection and disconnection profile. The connection/disconnection profile can include service priority (i.e., elderly, police, etc.) and disconnection instructions.

In other embodiments, additional data called "variability factors" may be captured by the system as part of the user profile, including, but not limited to, the following: (1) outside temperature, (2) sunlight, (3) humidity, (4) wind speed and direction, (5) elevation above sea level, (6) orientation of the service point structure, (7) duty duration and percentage, (8) set point difference, (9) current and historic room temperature, (10) size of structure, (11) number of floors, (12) type of construction (brick, wood, siding etc.) (13) color of structure, (14) type of roofing material and color, (15) construction surface of structure (built on turf, clay, cement, asphalt etc.), (16) land use (urban, suburban, rural), (17) latitude/longitude, (18) relative position to jet stream, (19) quality of power to devices, (20) number of people living in and/or using structure, (21) age of structure, (22) type of heating, (23) lot description, (24) type of water, (25) other square footage, and (26) other environmental factors. Additional data that may be stored by the system include vacancy times, sleep times, and times in which control events are permitted. User profiles may also include whether a swimming pool is located at the service address.

In level 1 (L1) of the present invention, the user may provide additional information to the system and/or additional information may be gathered from public sources to further populate the user profile. Information regarding the plurality of variability factors may obtained from public sources. For example, information regarding weather (e.g., outside temperature, sunlight, humidity, wind speed and direction) may be obtained from publicly available weather services. Additionally, information regarding size of structure (e.g., square footage), number of floors or stories, type of roofing material, type of construction, age of structure, type of heat, etc. may be found on publicly available websites (e.g., county or state records, Zillow, and Trulia). Users may be given incentives to provide additional information for their user profile.

The user profile may further contain information regarding user preferences, wherein the user preferences comprise at least one of automatic uploading of utility bills, contact preferences, payment preferences, privacy preferences, renewability of energy sources, grid element preferences, rate plans, consumption, cost, locality, and market supply.

The platform uses information in the user profile to generate more accurate predictive consumption data. For example, if one energy user uploads a utility bill, that utility bill may be used to generate predictive consumption data for similar structures or similar geographic locations (e.g., houses in the same neighborhood). If additional energy users upload utility bills, the aggregated data from the utility bills may be used to generate more accurate predictive consumption data. With additional information, such as variability factors, the platform is able to increase the accuracy of the prediction. For example, a house with a pool and an electric vehicle would be expected to use more electricity than a house in the same neighborhood without a pool or electric vehicle. Additionally, a larger house or multi-story house would have a larger predictive energy consumption than a smaller house or single-story house in the same neighborhood. Also, typically older houses have lower energy efficiency, due to factors affecting energy consumption, e.g., older HVAC equipment that is less efficient than modern equipment, and/or factors affecting the leakage of conditioned air, e.g., less insulation, older windows and doors, etc. Variability factors may be added to the system by users or obtained from public sources of data.

Figure 56:
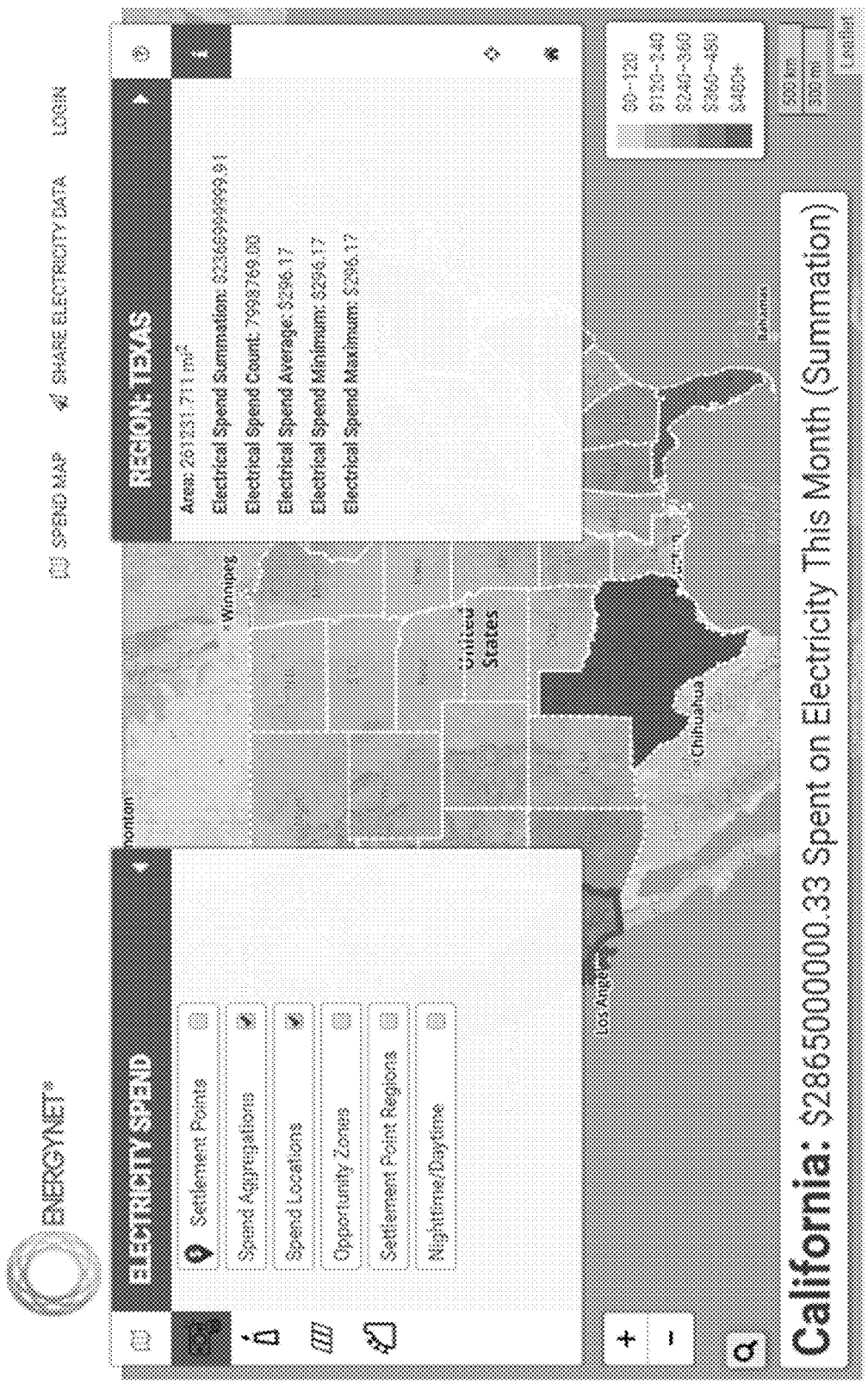
FIG. 56 is a screenshot of a map of an electrical spend map zoomed out to show the Continental United States.
Figure 57:
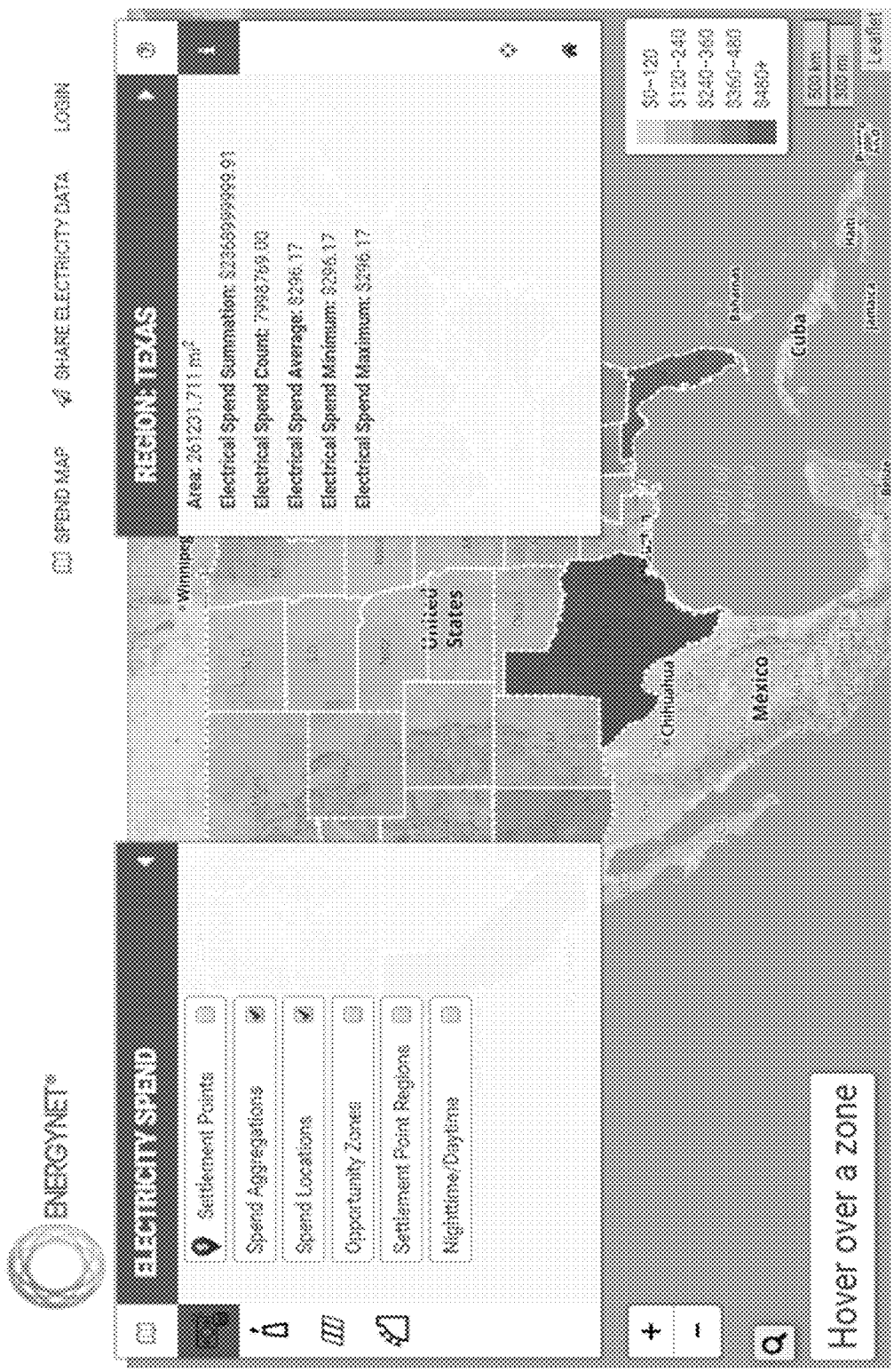
FIG. 57 is a screenshot of a map of an electrical spend map zoomed in to the region level.
Figure 58:
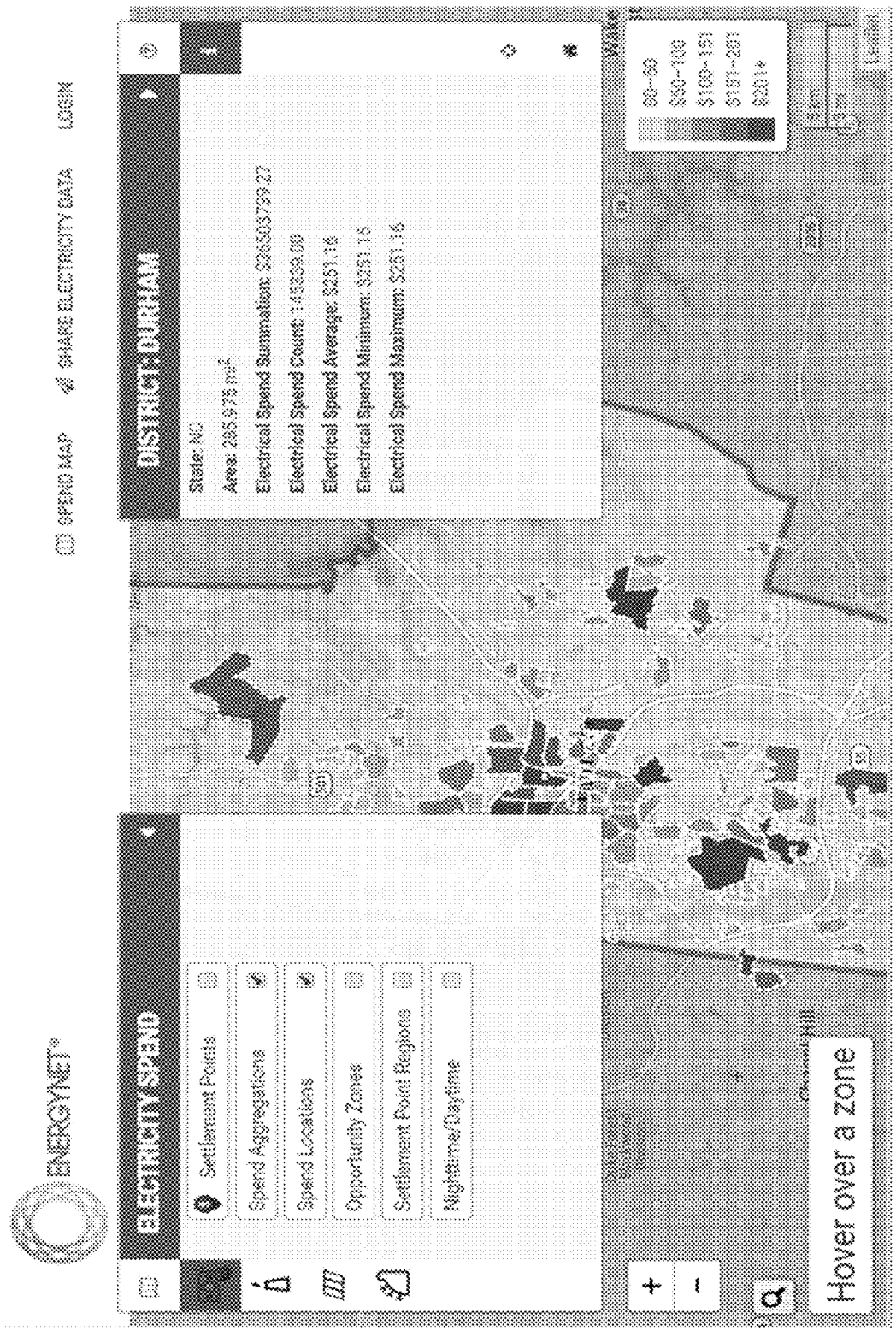
FIG. 58 is a screenshot of a map of an electrical spend map zoomed in to the district level.
Figure 59:
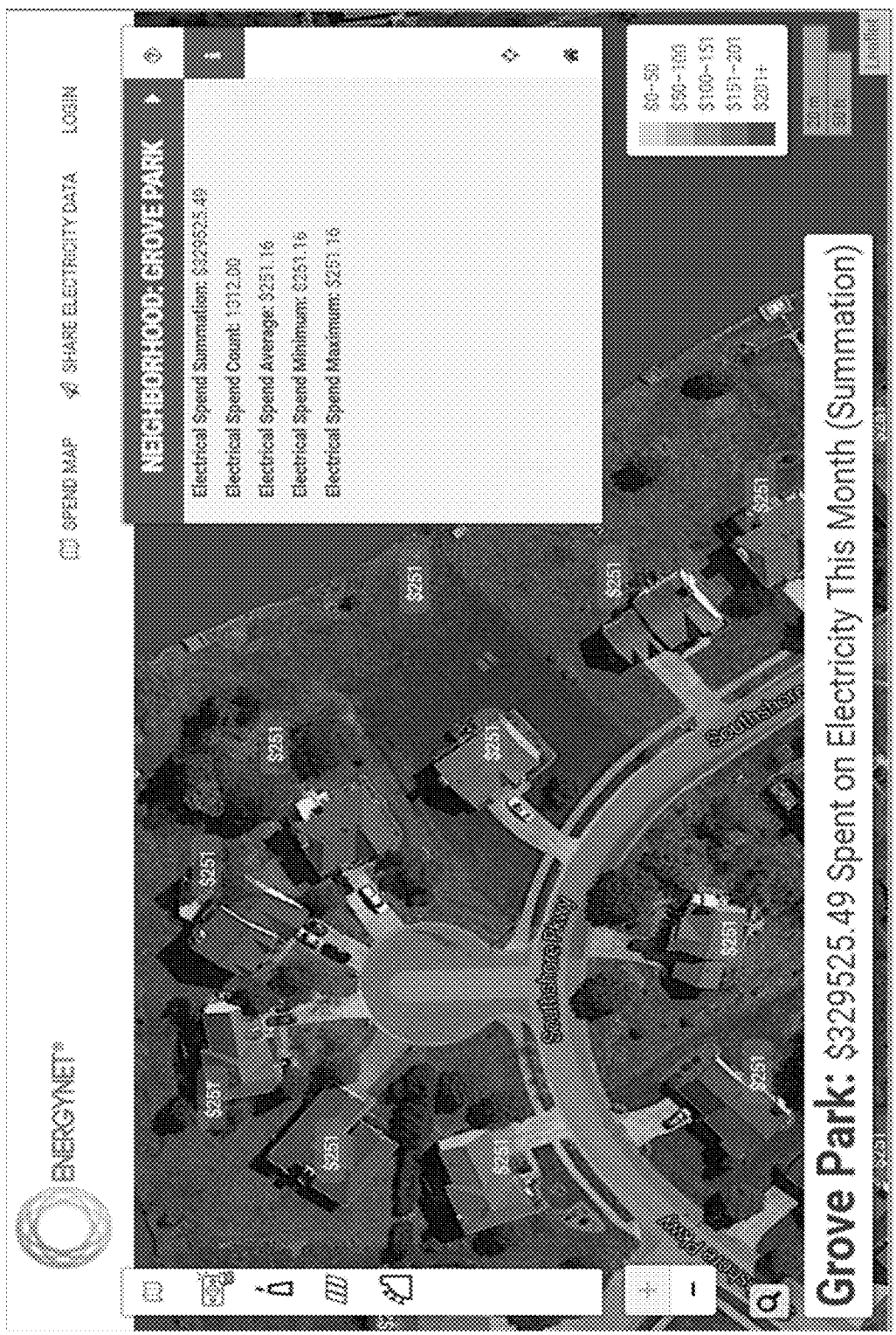
FIG. 59 is a screenshot of a map of an electrical spend map zoomed in to the neighborhood level.

The platform is further operable to display a map of the predicted energy consumption as shown in FIGS. 56-59. FIG. 56 shows an electricity spend map zoomed out to show the Continental United States. FIG. 57 shows an electricity spend map zoomed in to the region level. The area, electrical spend summation, electrical spend count, electrical spend average, electrical spend minimum, and electrical spend maximum are listed in a table. FIG. 58 shows an electricity spend map zoomed in to the district level. The state, area, electrical spend summation, electrical spend count, electrical spend average, electrical spend minimum, and electrical spend maximum are listed in a table. FIG. 59 shows an electricity spend map zoomed in to the neighborhood level. The zoomed in map is a satellite image showing houses in a particular neighborhood. The electrical spend summation, electrical spend count, electrical spend average, electrical spend minimum, and electrical spend maximum are listed in a table. The electrical spend for each house is shown above the house.

In Level 2 (L2) of the present invention, the system receives user inputs that associate at least one grid element with their corresponding user profile. The grid elements include but are not limited to power transfer switches, wind meters, utility meters, battery discharge controllers, tenant sub-meters, solar meters, power distribution units (PDUs), appliance switches, electric vehicle charging stations, distributed energy resources (DERs), transfer switches, electric vehicle batteries, inverters, controllable loads, weather stations, and/or HVAC environments. For example, the system may receive an indication or selection inputs from a user regarding a present or future interest in, or action for installing and operating of, solar panels to their roof for the location associated with their corresponding user profile; this change and the user's preferences or profile regarding the solar panels is saved in the database.

In Level 3 (L3) of present invention, the at least one utility or market participant and its partners (e.g., vendors) utilize the EnergyNet platform to identify sales opportunities based on data in the database. Data that is anonymized or permission-based access to data from user profiles may be used to provide insights on inefficient devices, defective devices, or devices that require updating to meet current standards. User profile data may also be used to identify related sales opportunities. For example, if energy consumption patterns suggest that the user may be very interested in personal energy conservation, then sales efforts could be directed toward that individual concerning products related to that lifestyle. This information can be used by the utility or its partners to provide incentives to users to buy newer, updated devices, or obtain maintenance for existing devices. The user is given the option to opt out of having his user profile used for sales and marketing efforts, or for regulating energy conservation. The user profile makes use of open standards (such as the CPExchange standard) that specify a privacy model with the user profile. The use of consumption patterns in this manner is governed by national, state, or local privacy laws and regulations.

A further embodiment of using user profiles to identify sales opportunities involves the use of device information to create incentives for users to replace inefficient devices. By identifying the known characteristics and/or behavior of devices within a service point, the invention identifies those users who may benefit from replacement of those devices. The invention estimates a payback period for replacement. This information is used by the utility or its partners to create redemptions, discounts, and campaigns to persuade users to replace their devices.

Users may be grouped by geography or some other common characteristics. For example, groups might include "light consumers" (because they consume little energy), "daytime consumers" (because they work at night), "swimmers" (for those who have a pool and use it), or other categories. Categorizing users into groups allows the utility or its partners or market participants to target sales and marketing efforts to relevant users.

EnergyNet Graphs

Figure 60:
FIG. 60 is a screenshot of a sample settlement pricing zone.
Figure 61:
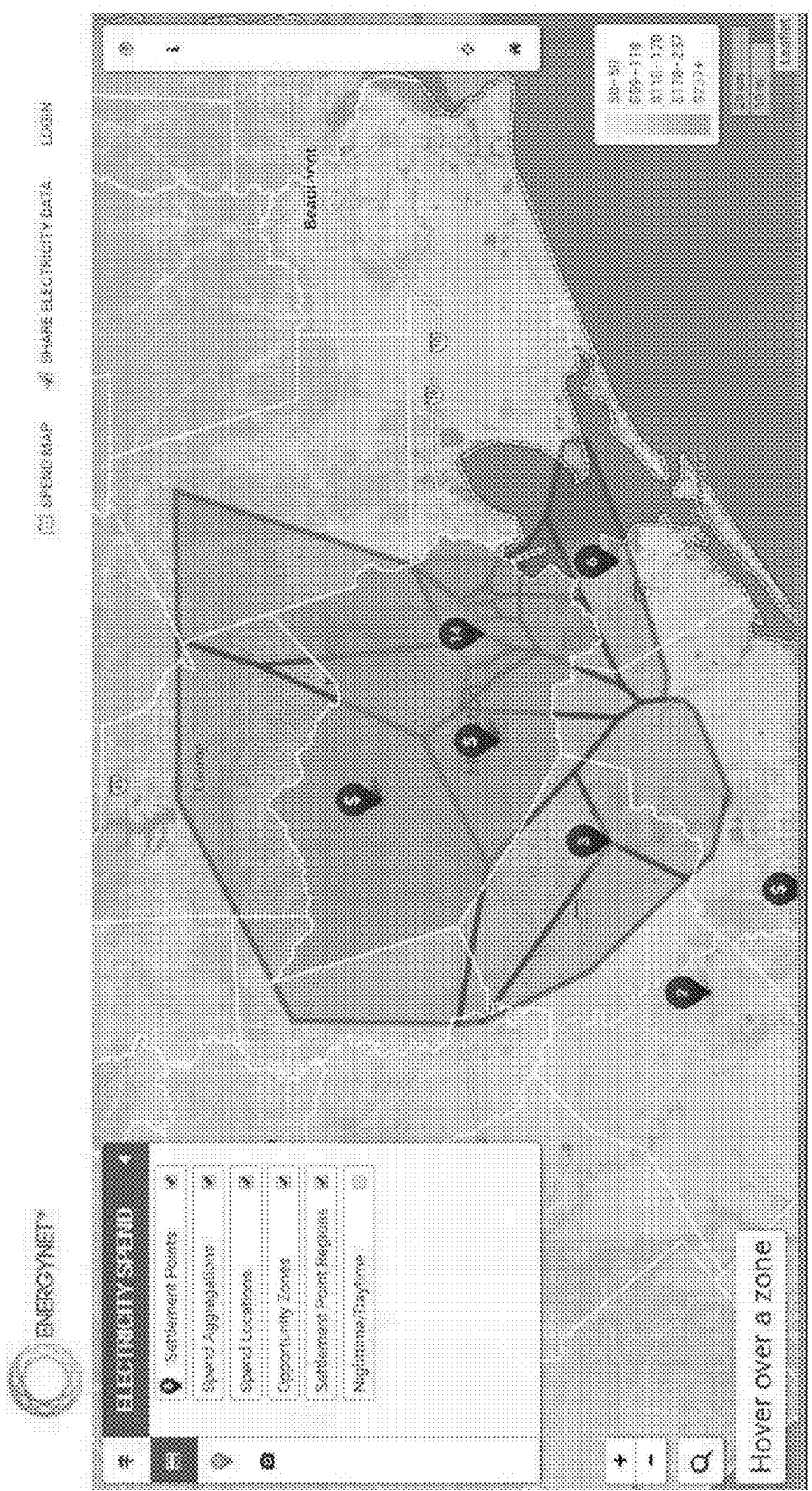
FIG. 61 continues to illustrate the screenshot of FIG. 60 with additional map layers for ERCOT Settlement Points.

FIG. 60 is a screenshot of a sample settlement pricing zone. The blue shaded areas with dark outlines in the figure are settlement zones corresponding to traditional settlement zones established by energy markets, e.g., ERCOT, wherein the market (ERCOT) determines the geographic zones that comprise the settlement zones, wherein electric power grid resources settle energy supplied and load consumed to the nearest resource point or settlement point, which are shown in the additional map layers in FIG. 61. Anything northwest of the blue shaded zone with dark outlines illustrated settles in the uppermost settlement area marked with a "$" on the map. Larger grid elements, by way of example and not limitation, power plants, substations, transmission interconnections, large commercial or industrial locations with their own substations, are also identified and energy settlement and corresponding market-based financial settlement by the market (e.g., ERCOT), which also defines them within its settlement zones and defines the pricing node for them. Locational marginal price (LMP) is based upon where the grid elements (supply or load grid elements) are relative to the blue settlement area with dark outlines marked with a "$" on the map.

Figure 62:
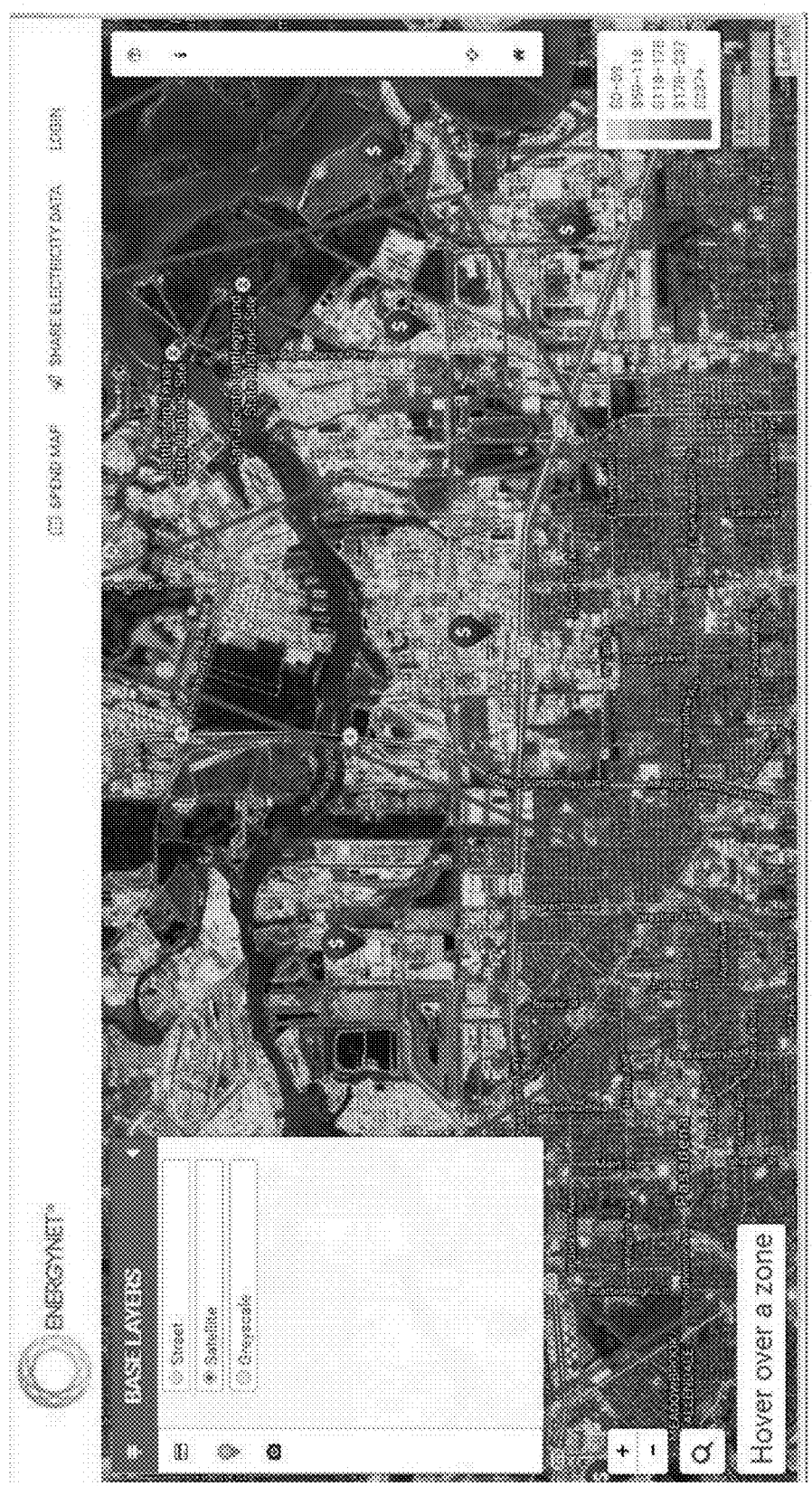
FIG. 62 is a screenshot showing a satellite image of actual settlement points.

FIG. 62 is a screenshot showing a satellite image of actual settlement points. The interface allows the user to zoom in with satellite photography to identify each grid element, e.g., power plant, substation, large commercial and/or industrial grid elements or power supply grid elements. The zones are close together in this view because a commercial facility is drawing significant amounts of power off the distribution of electrical power of the grid. Also illustrated are a power plant and light commercial and/or industrial, and residential consumers in that second zone. While these grid elements and electric power loads exist and are identifiable within the GUIs and within the EnergyNet platform and system, within the EnergyNet platform the traditional zones and nodes established by the market (e.g., ERCOT) are subdivisible into logical points below the LMP or settlement nodes. The systems and methods of the present invention are operable to aggregate and/or directly control load below these traditional zones, nodes, and attachment points. While new loads and new power supply (e.g., new generation source) may be introduced and operable below the traditional zones or nodes, the market (e.g., ERCOT) will not have data associated with those newly introduced and operable grid elements (for load and for supply) unless it is supplied to the market via the EnergyNet platform. For example, if a solar generation grid element and solar energy fuel cell or storage is introduced to the electrical power grid via the EnergyNet platform and located within one of the illustrated traditional zones, then it is operable to start introducing power for distribution at the proximal substation. The market would only be able to detect that a lower amount of electrical power is being drawn at the substation level or traditional zone. However, after the solar generation grid element and solar energy fuel cell or storage is registered and active within the EnergyNet platform, energy settlement and market-based financial settlement for the electrical power introduced or supplied to the electric power grid is provided at the point of attachment (attachment point) for those solar grid elements. This contrasts with prior art, where the market cannot detect or settle energy or provide for market-based financial settlement below the traditional zones or substation level.

Figure 63:
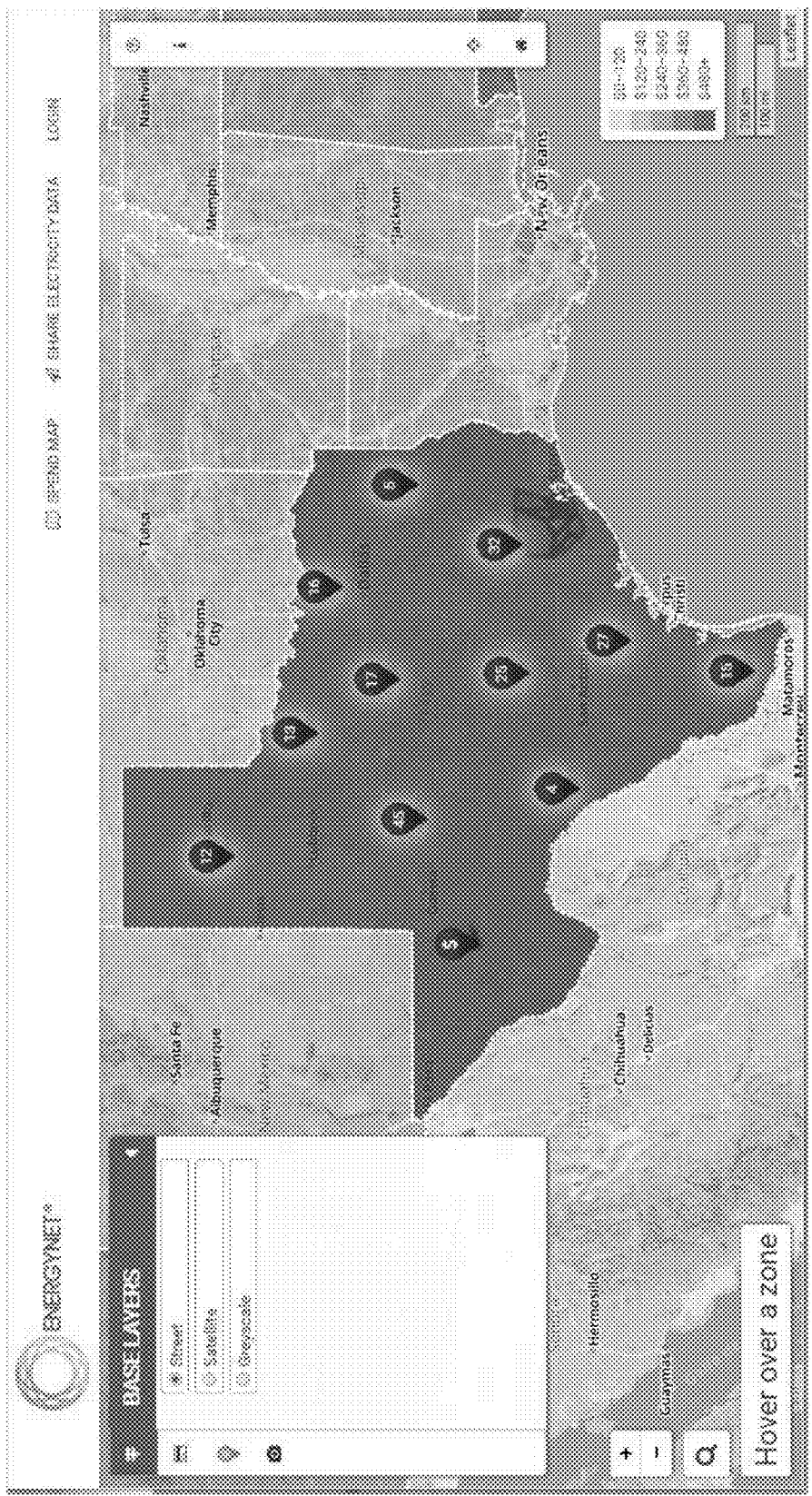
FIG. 63 is a screenshot of an overview of ERCOT Settlement Zones.

FIG. 63 is a screenshot of an overview of ERCOT Settlement Zones. The number inside the point represents the number of nodes geographically at each point. For example, there are 17 subnodes within the location marked with a "17" on the map, and 16 subnodes within the location marked with a "16" on the map; these subnodes correspond to ERCOT subnodes, which provide for settlement zones at Level 4 within the system.

Financial Model Visualization Interface

A financial model visualization interface allows at least one utility or market participant, to run Monte Carlo simulations for adding new meters to the market, energy usage distribution, and/or energy generation distribution. Adjusting the simulation parameters (e.g., mean, standard deviation, skewness) provides for minimizing or managing risk for decision-making and investment related to the electric power grid, and to better predict outcomes.

Figure 64:
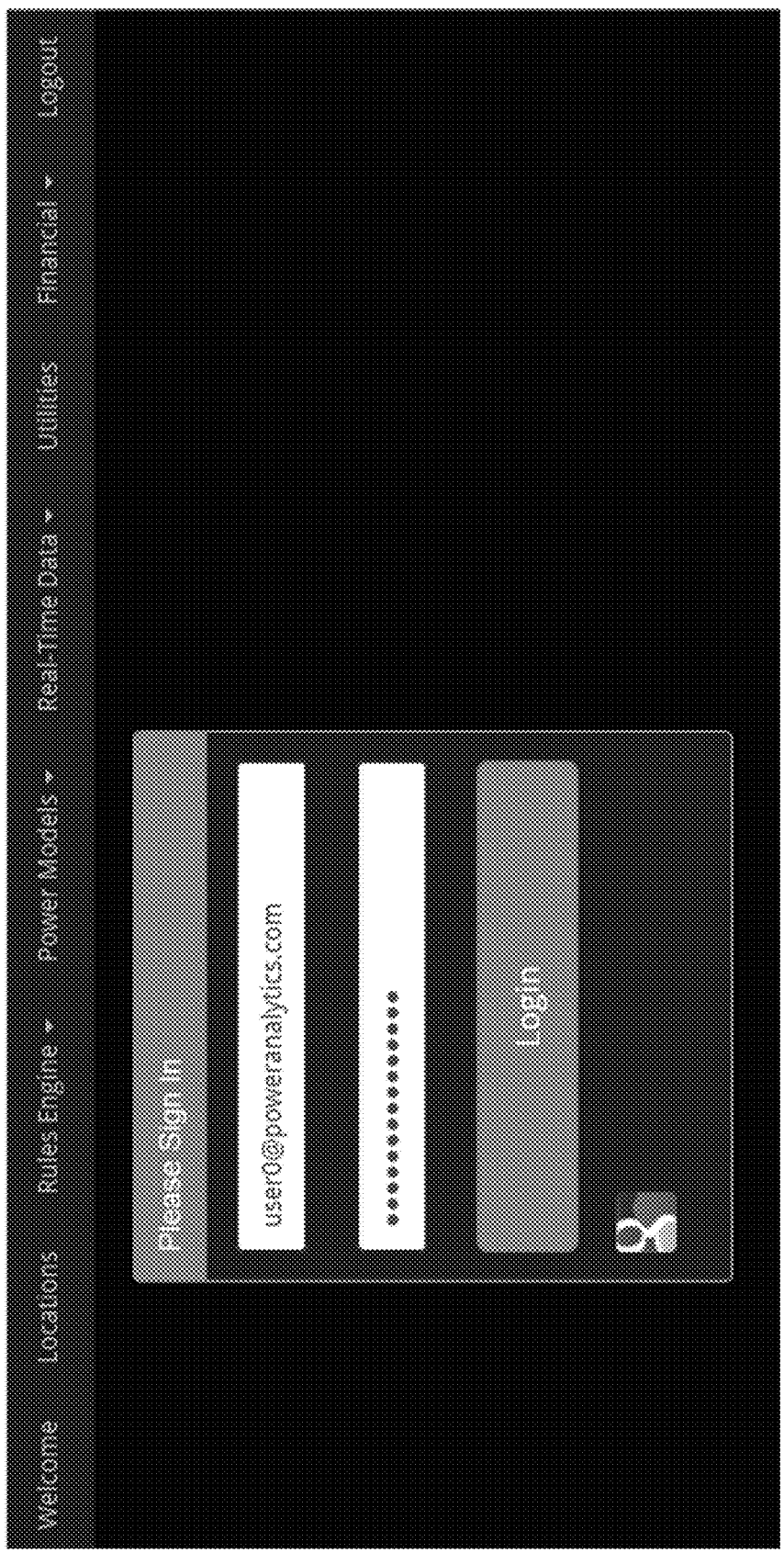
FIG. 64 is a screenshot of the log in screen for a financial model visualization interface.
Figure 65:
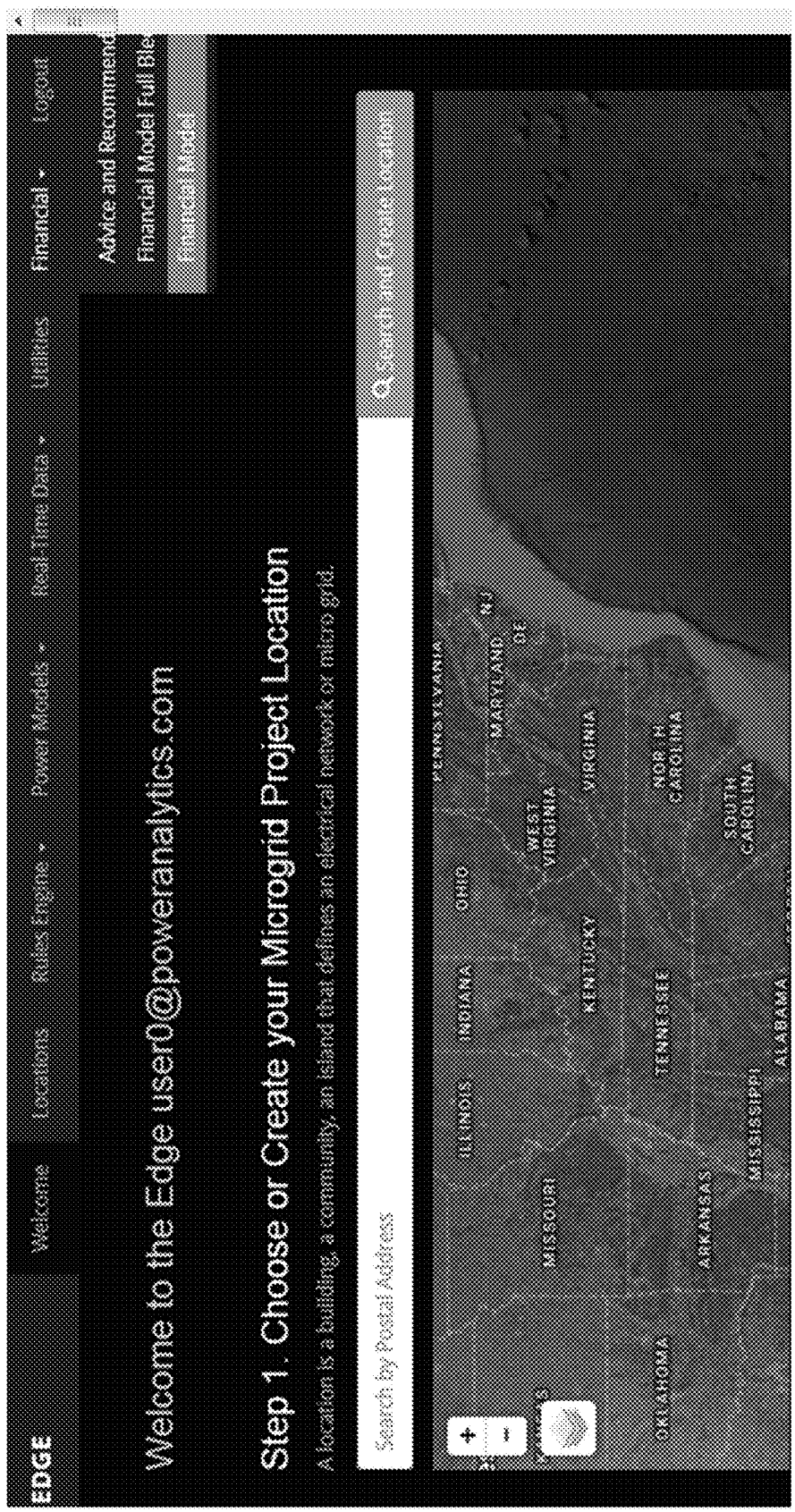
FIG. 65 is a screenshot showing the selection of the financial model from the dropdown menu.
Figure 66:
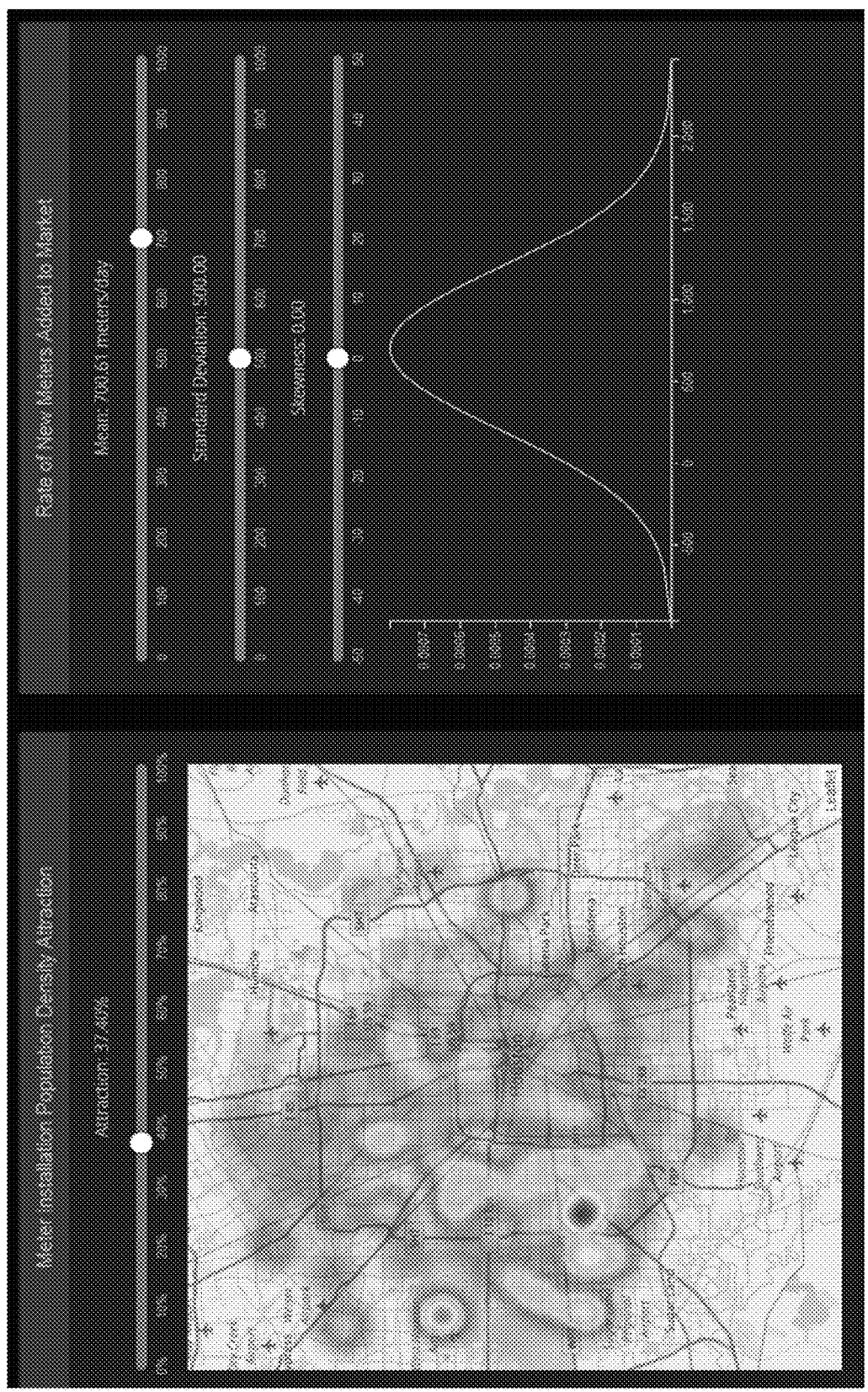
FIG. 66 is a screenshot of a financial model page.
Figure 67:
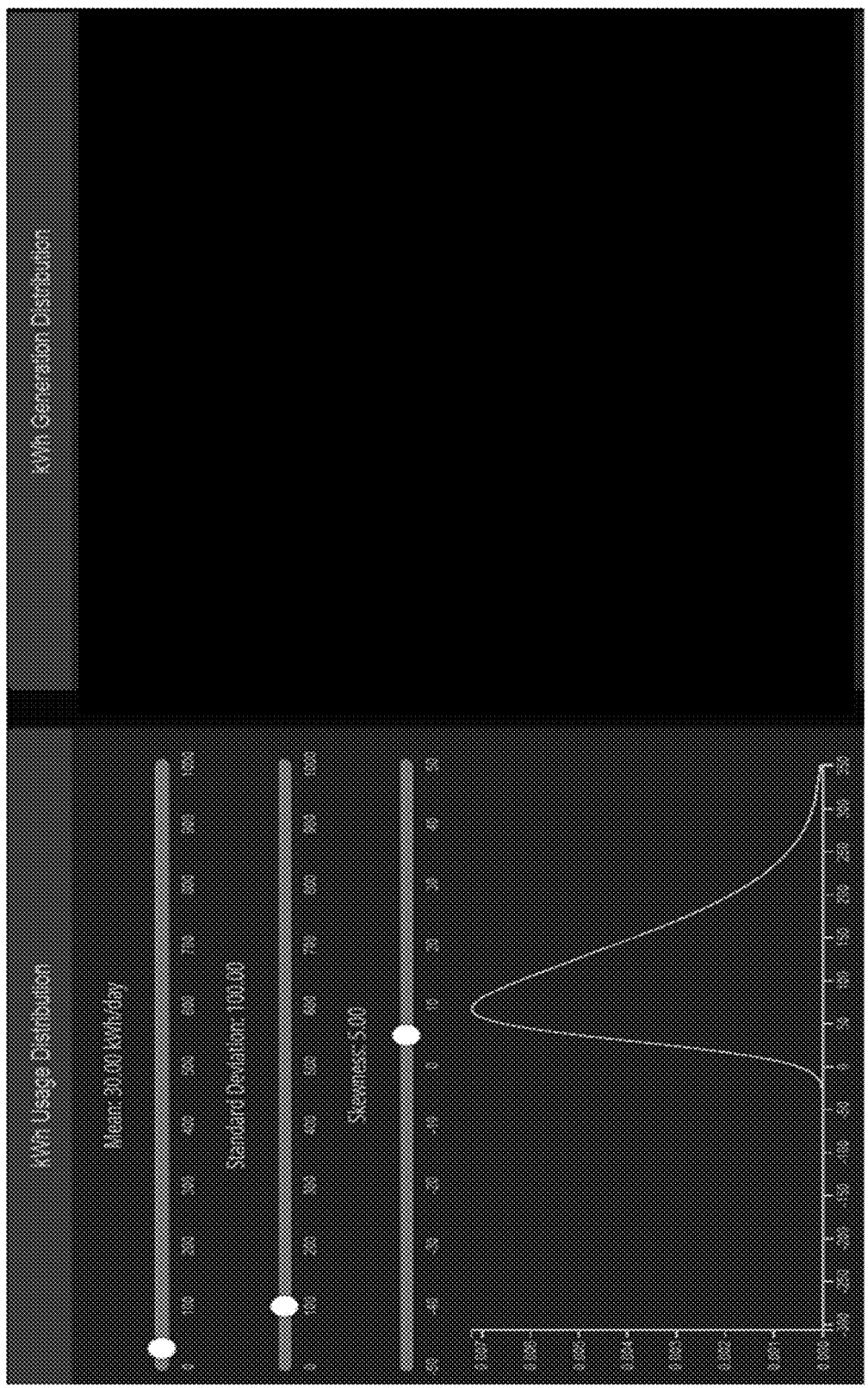
FIG. 67 is a screenshot showing kilowatt hour (kWh) Usage Distribution and kWh Generation Distribution.

FIG. 64 is a screenshot of the log in screen for a financial model visualization interface. In a preferred embodiment, the user can sign in to system and authorize the application with an account provided by a third party, e.g., Google. FIG. 65 is a screenshot showing the selection of the financial model from the dropdown menu. FIG. 66 is a screenshot of a financial model page. The left half of the screen shows a meter installation population density attraction with a heat map. The attraction percentage can be adjusted with a sliding bar. The right half of the screen shows the rate of new meters added to the market. The mean rate of new meters added to the market per day, the standard deviation, and the skewness can be adjusted with a sliding bar. A graph displays the rate of new meters added to the market based on the mean, standard deviation, and skewness selected. FIG. 67 is a screenshot showing kWh Usage Distribution and kWh Generation Distribution. The left half of the screen shows kWh Usage Distribution. The mean energy usage, standard deviation, and the skewness can be adjusted with a sliding bar. A graph displays the kWh usage distribution based on the mean, standard deviation, and skewness selected. The right half of the screen is to display kWh Generation Distribution. Users would be able to adjust the mean energy generation, standard deviation, and the skewness in much the same way as for kWh Usage Distribution. A graph could also be displayed with the kWh generation distribution based on the mean, standard deviation, and skewness selected. Skewness values may differ for residential, commercial, and industrial uses.

Figure 68:
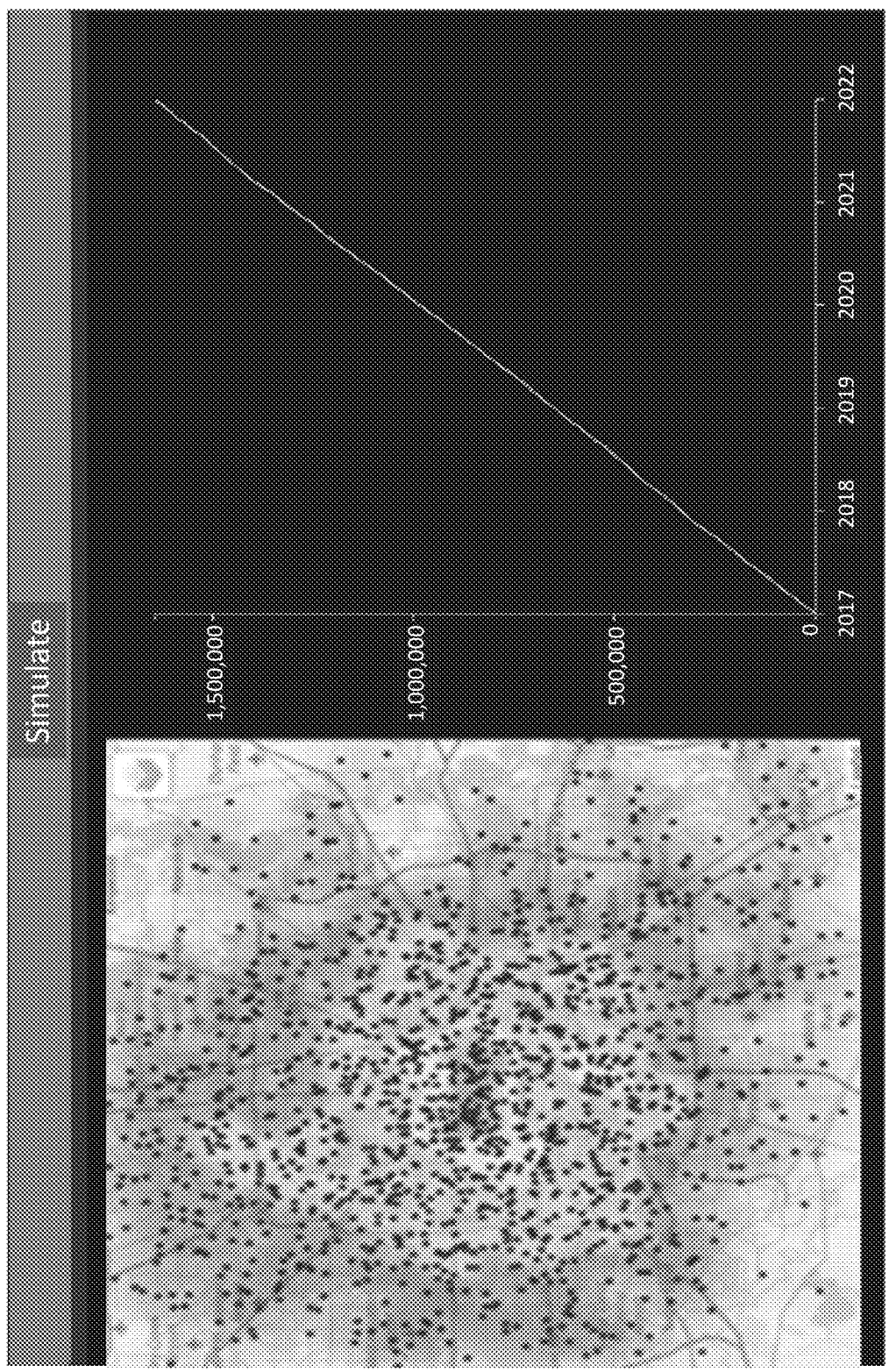
FIG. 68 is a screenshot of a simulation showing meter distributions randomly added to the map over time.
Figure 69:
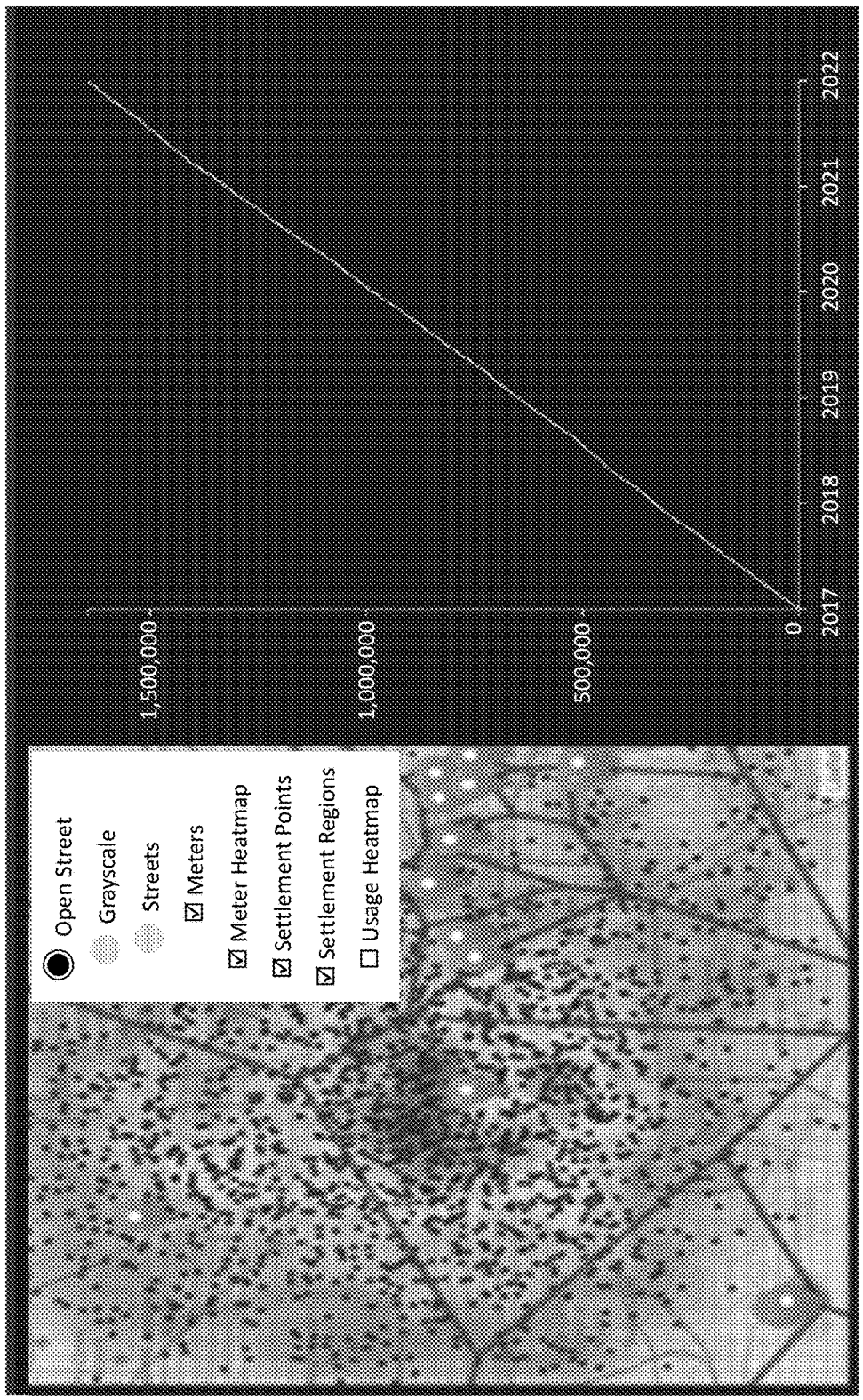
FIG. 69 continues to illustrate the screenshot of FIG. 68 with additional map layers for ERCOT Settlement Points.

FIG. 68 is a screenshot of a simulation showing meter distributions randomly added to the map over time. A map is shown on the left half of the screen showing a meter heatmap with the dots representing meters. A graph is shown on the right half of the screen showing the increase in the number of meters on the y-axis and time on the x-axis based on the parameters selected. FIG. 69 continues to illustrate the screenshot of FIG. 68 with additional map layers for ERCOT Settlement Points. The user can select the following levels: meters, meter heatmap, settlement points, settlement regions, and usage heatmap. The user can also view the map as open street, grayscale, and streets. A map is shown on the left half of the screen showing a meter heatmap, settlement points, meters, and settlement regions. A graph is shown on the right half of the screen showing the increase in the number of meters on the y-axis and time on the x-axis based on the parameters selected.

The following are incorporated herein by reference in their entirety: the NY REV order, CAL ISO rules and proposed rules and subsequent order for DER marketplace, ERCOT presentation stakeholder concerns, and terms and their definitions: telemetry light, telemetry medium, etc.

Certain modifications and improvements will occur to those skilled in the art upon a reading of the foregoing description. For example, Software as a Service (SaaS) or Platform as a Service (PaaS) may be provided in embodiments of the present invention. Also, updated communications such as 5G and later alternatives are considered within the scope of the present invention. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system of an advanced energy network comprising:
a server platform communicatively connected to an electric power grid, and at least one distributed computing device in network communication with the server platform;
wherein the electric power grid comprises a multiplicity of grid elements;
wherein the server platform is operable to provide at least one interactive graphical user interface (GUI) for the at least one distributed computing device for network communication;
wherein the server platform is operable to:
create a user profile for at least one energy user via the at least one interactive GUI;
collect real-time energy usage data from the multiplicity of grid elements;
build a power model for the electric power grid by dragging and dropping grid element modules via the at least one interactive GUI based on the real-time energy usage data from the multiplicity of the grid elements, historical data of the multiplicity of the grid elements, and current environment of the electric power grid;
generate predictive energy consumption data based on the real-time energy usage data and the historical data;
control a participation of at least one of the multiplicity of grid elements based on the predictive energy consumption data via the at least one interactive GUI;
perform energy financial settlements for the participation of the at least one of the multiplicity of grid elements based on real-time market information and revenue grade metrology data for the at least one of the multiplicity of grid elements in real time or near real time; and
transmit the predictive energy consumption data, control information for the participation of the at least one of the multiplicity of grid elements, and energy settlement data to the at least one distributed computing device for displaying the predictive energy consumption data, the control information for the participation of the at least one of the multiplicity of grid elements, and the energy settlement data via the at least one interactive GUI.

2. The system of claim 1, wherein the server platform is operable to collect historical energy usage data from a utility bill uploaded to the server platform.

3. The system of claim 2, wherein the server platform is operable to automatically recognize the format of the utility bill.

4. The system of claim 2, wherein the server platform is operable to allow selection of the historical energy usage data to capture from the utility bill.

5. The system of claim 2, wherein the server platform automatically populates a database based on the historical energy usage data in the utility bill, and wherein the database stores the real-time energy usage data and the predictive energy consumption data.

6. The system of claim 1, wherein the server platform is further operable to collect at least one of real-time data from the multiplicity of grid elements and data from smart meters associated with the at least one energy user.

7. The system of claim 1, wherein the user profile further comprises information regarding user preferences of the at least one energy user, wherein the user preferences comprise at least one of automatic uploading of utility bills, contact preferences, payment preferences, privacy preferences, renewability of energy sources, grid element preferences, rate plans, consumption, cost, locality, and market supply.

8. The system of claim 1, wherein the user profile further comprises a plurality of variability factors including outside temperature, sunlight, humidity, wind speed and direction, elevation above sea level, orientation of a service point structure, duty duration and percentage, set point difference, current and historical room temperature, size of structure, number of floors, types of construction, color of structure, type of roofing material and color, construction surface of structure, land use, latitude and longitude, relative position to jet stream, quality of power to device, number of people living in and/or using structure, age of structure, type of heating, lot description, type of water, square footage, and other environmental factors.

9. The system of claim 8, wherein the server platform is further operable to obtain information regarding the plurality of variability factors from public sources.

10. The system of claim 1, wherein the server platform is further operable to display a map, wherein the map further includes the predictive energy consumption data.

11. The system of claim 1, wherein the server platform is operable to provide information contained in the user profile for sales and marketing efforts by at least one of a vendor, a utility, or a utility partner.

12. The system of claim 1, wherein the server platform is operable to perform settlements for electrical power introduced or supplied to the electric power grid at a point of attachment for at least one grid element.

13. The system of claim 1, wherein the multiplicity of grid elements comprises at least one power storage device operable for receiving power from and delivering power to the electric power grid.

14. The system of claim 1, wherein the participation of the at least one of the multiplicity of grid elements comprises supplying, consuming and/or curtailing power.

15. The system of claim 1, wherein the at least one interactive GUI comprises a utility operator interface for controlling and displaying real-time behaviors of distributed energy resources in the electric power grid.

16. The system of claim 1, wherein the at least one interactive GUI comprises an interconnection processing interface for facilitating interconnection requests and studies in the electric power grid.

17. The system of claim 1, wherein the at least one interactive GUI comprises a vendor/aggregator view interface operable for searching energy customers, a market view interface for managing energy portfolios on a marketplace, and a financial settlement view interface for displaying information for energy transactions and settlements.

18. The system of claim 1, wherein the at least one interactive GUI comprises a financial mode visualization interface for visualizing meter installation, energy usage distribution, and/or energy generation distribution in a heat map, and wherein the meter installation, the energy usage distribution, and/or the energy generation distribution are visualized by adjusting a mean value, a standard deviation, and a skewness with a sliding bar.

19. The system of claim 1, wherein the server platform is operable to dynamically update the power model of the electric power grid when a grid element is coupled to or decoupled from the electric power grid.

20. A method for managing an advanced energy network comprising:

provFiding a server platform communicatively connected to an electric power grid, and at least one distributed computing device in network communication with the server platform, wherein the electric power grid comprises a multiplicity of grid elements;

the server platform providing at least one interactive graphical user interface (GUI) for the at least one distributed computing device for network communication;

the server platform creating a user profile for at least one energy user via the at least one interactive GUI;

the server platform collecting real-time energy usage data from the multiplicity of grid elements;

the server platform building a power model for the electric power grid by dragging and dropping grid element modules via the at least one interactive GUI based on the real-time energy usage data from the multiplicity of the grid elements, historical data of the multiplicity of the grid elements, and current environment of the electric power grid;

the server platform generating predictive energy consumption data based on the real-time energy usage data and the historical data;

the server platform controlling a participation of at least one of the multiplicity of grid elements based on the predictive energy consumption data via the at least one interactive GUI;

the server platform performing energy financial settlements for the participation of the at least one of the multiplicity of grid elements based on real-time market information and revenue grade metrology data for the at least one of the multiplicity of grid elements in real time or near real time; and the server platform transmitting the predictive energy consumption data, control information for the participation of the at least one of the multiplicity of grid elements, and energy settlement data to the at least one distributed computing device; and the at least one distributed computing device displaying the predictive energy consumption data, the control information for the participation of the at least one of the multiplicity of grid elements, and the energy settlement data via the at least one interactive GUI.

* * * * *